US009272670B2

(12) United States Patent
Ito

(10) Patent No.: US 9,272,670 B2
(45) Date of Patent: Mar. 1, 2016

(54) IN-VEHICLE AUDIO APPARATUS

(75) Inventor: Hideki Ito, Tokyo (JP)

(73) Assignee: Sony Corporation (JP)

(*) Notice: Subject to any disclaimer, the term of this patent is extended or adjusted under 35 U.S.C. 154(b) by 1018 days.

(21) Appl. No.: 13/423,601

(22) Filed: Mar. 19, 2012

(65) Prior Publication Data

US 2012/0250878 A1    Oct. 4, 2012

(30) Foreign Application Priority Data

Mar. 25, 2011    (JP) ................. 2011-068159

(51) Int. Cl.
| H04B 1/00 | (2006.01) |
| B60R 11/02 | (2006.01) |
| H04B 1/08 | (2006.01) |
| B60R 11/00 | (2006.01) |

(52) U.S. Cl.
CPC ......... *B60R 11/0205* (2013.01); *B60R 11/0241* (2013.01); *B60R 11/0252* (2013.01); *H04B 1/082* (2013.01); *B60R 2011/0005* (2013.01); *B60R 2011/0045* (2013.01); *B60R 2011/0071* (2013.01); *B60R 2011/0082* (2013.01); *B60R 2011/0084* (2013.01)

(58) Field of Classification Search
CPC ............ B60R 11/0205; B60R 11/0241; B60R 11/0252; B60R 2011/0005; B60R 2011/0071; B60R 2011/0082; B60R 2011/0084; B60R 2011/0045; H04B 1/082
USPC .......................................................... 381/86
See application file for complete search history.

(56) References Cited

U.S. PATENT DOCUMENTS

2006/0277555 A1* 12/2006 Howard et al. ............... 720/600

FOREIGN PATENT DOCUMENTS

| EP | 0839689 B1 | 6/2002 |
| JP | 2000-332433 A | 11/2000 |
| JP | 2000332433 A * | 11/2000 |
| JP | 2002283905 A * | 10/2002 |
| JP | 2004196090 A | 7/2004 |
| JP | 2005228463 A | 8/2005 |
| JP | 2006351100 A | 12/2006 |
| JP | 2007122778 A | 5/2007 |
| JP | 2008024259 A | 2/2008 |
| JP | 04072563 B2 | 4/2008 |
| JP | 2008189031 A | 8/2008 |

(Continued)

OTHER PUBLICATIONS

Japanese Office Action for JP Application No. 2011068159, dated Dec. 16, 2015.

(Continued)

*Primary Examiner* — Paul S Kim
(74) *Attorney, Agent, or Firm* — Lerner, David, Littenberg, Krumholz & Mentlik, LLP

(57) ABSTRACT

An in-vehicle audio apparatus includes: a base body that is arranged in a fixed state; a storage tray that is moved between a drawing-out position and a storing position with respect to the base body and inserts and takes out a music reproducing device at the drawing-out position; a pressing body that is moved in accordance with a moving position of the storage tray in a direction perpendicular to a moving direction of the storage tray and presses the music reproducing device that is inserted into the storage tray when the pressing body is moved to one side; and a bias spring that presses the pressing body to the one side.

13 Claims, 48 Drawing Sheets

(56) References Cited

FOREIGN PATENT DOCUMENTS

| | | | |
|---|---|---|---|
| JP | 2008290522 A | * | 12/2008 |
| JP | 2009179097 A | | 8/2009 |

OTHER PUBLICATIONS

European Search Report EP 12158208, dated Jun. 28, 2012.
Japanese Office Action for JP Applicaiton No. 2011068159, dated Jun. 23, 2015.

* cited by examiner

IN-VEHICLE AUDIO APPARATUS

CROSS-REFERENCE TO RELATED APPLICATION

The present application claims priority from Japanese Patent Application No. JP 2011-068159 filed in the Japanese Patent Office on Mar. 25, 2011, the entire content of which is incorporated herein by reference.

FIELD

The present technology relates to a technology relating to an in-vehicle audio apparatus, and more particularly, to a technology in which a pressing body moving in accordance with the moving position of a storage tray is arranged so as to stabilize the holding state of a music reproduction device inserted into the storage tray.

BACKGROUND

As an in-vehicle audio apparatus, there is an apparatus in which a mobile music reproducing device is inserted and housed in a storage tray, and music recorded in the music reproducing device is reproduced so as to be output from a speaker or the like arranged inside the vehicle in accordance with an operation performed from the outside.

In such an in-vehicle audio apparatus, since vibration occurs during the driving of the vehicle, it is necessary to suppress the effect of the vibration by holding the inserted music reproducing device in a stable state.

Thus, there is an in-vehicle audio apparatus in the related art in which a music reproducing device inserted into the inside of a casing is held by pressing it by using a rotatable pressing lever (for example, see JP-A-2000-332433, FIG. 17).

In the in-vehicle audio apparatus disclosed in JP-A-2000-332433, a casing is formed in the shape of a box open on the front side, and a first roller is supported at an upper portion of the front end of the casing, and a rotatable pressing lever is arranged inside the casing. The pressing lever is supported by the casing with its rear end portion configured as a point of support for rotation and can be rotatable so as to approximately vertically move the front end portion. In the front end portion of the pressing lever, a second roller is supported, and the pressing lever is maintained to be in a state in which the front side is lowered and is biased by a spring in a direction in which the front end portion is moved to the approximately lower side.

In the in-vehicle audio apparatus, a music reproducing device that has a main body and a lid body that is opened or closed by being rotated with respect to the main body is inserted and housed in the storage tray. As the music reproducing device is inserted into the casing from the front side in accordance with the movement of the storage tray, first, the first roller is slid in the lid body so as to rotate in a direction for closing the lid body. Thereafter, when the storage tray is moved further to the rear side, the music reproducing device is brought into contact with the second roller, and, by moving the music reproducing device so as to dive into the lower side of the pressing lever, the second roller is slid in the lid body, and the pressing lever is rotated in a direction opposite to the biased direction so as to close the lid body. The music reproducing device is pressed from the upper side by the second roller that is supported by the pressing lever having the front end portion biased in a direction for moving to the approximately lower side so as to be held inside the casing.

SUMMARY

However, the in-vehicle audio apparatus disclosed in JP-A-2000-332433 is configured such that, as the music reproducing device inserted into the inside of the lid body is brought into contact with the pressing lever in accordance with the movement of the storage tray, the music reproducing device is rotated in a direction opposite to the direction in which the pressing lever is biased, and the music reproducing device is pressed by the pressing lever.

Accordingly, there are problems in that only a music reproducing device having a size (thickness) that can be brought into contact with the pressing lever and being formed in the shape that can be allowed to dive into the lower side of the pressing lever can be pressed, there is tight restriction on the size and the shape of the music reproducing device that can be held, and the in-vehicle audio apparatus lacks versatility.

In addition, the music reproducing device is pressed by the second roller that can rotate, and thus, when the second roller rotates when vibration occurs, there is a concern that the state of holding the music reproducing device may be unstable.

Thus, it is desirable to increase the range of music reproducing devices that can be inserted into the storage tray so as to improve the versatility and stabilize the state of holding the music reproducing device.

An embodiment of the present technology is directed to an in-vehicle audio apparatus including: a base body that is arranged in a fixed state; a storage tray that is moved between a drawing-out position and a storing position with respect to the base body and inserts and takes out a music reproducing device at the drawing-out position; a pressing body that is moved in accordance with a moving position of the storage tray in a direction perpendicular to a moving direction of the storage tray and presses the music reproducing device that is inserted into the storage tray when the pressing body is moved to one side; and a bias spring that presses the pressing body to the one side.

Accordingly, in the in-vehicle audio apparatus, the pressing body is moved in accordance with the moving position of the storage tray, and the pressed state is maintained by the pressing body that is biased by the bias spring.

In the above-described in-vehicle audio apparatus, it is preferable that a plurality of arm members that are positioned between the base body and the pressing body so as to connect the base body and the pressing body and are operated for the base member are further disposed, the pressing body is moved in the direction perpendicular to the moving direction of the storage tray in accordance with operations of the plurality of arm members, and the plurality of arm members are positioned so as to be separated from each other in the moving direction of the storage tray.

In such a case, the pressing body is moved in the direction perpendicular to the moving direction of the storage tray in accordance with the operation of the plurality of arm members, and the plurality of arm members are positioned so as to be separated from each other in the moving direction of the storage tray, whereby the movement of the pressing body is stabilized.

In the above-described in-vehicle audio apparatus, it is preferable that the plurality of arm members are supported so as to be rotatable together with the base member and the pressing body, and the bias spring is supported between the base body and the plurality of arm members.

In such a case, the plurality of arm members are supported so to be rotatable together with the base member and the pressing body, and the bias spring is supported between the base body and the plurality of arm members respectively, whereby the pressing force of the pressing body for the music reproducing device is stabilized.

In the above-described in-vehicle audio apparatus, it is preferable that the pressing body includes a connection plate that is connected to the base body through the plurality of arm members and a slide plate that can slide in the connection plate in the same direction as the moving direction of the storage tray, the slide plate is brought into contact with the music reproducing device so as to press the music reproducing device when the storage tray is moved, and the slide plate is slid while being integrated with the storage tray that is moved so as to be slid in a state in which the music reproducing device is pressed by the slide plate.

In such a case, in the state in which the music reproducing device is pressed by the slide plate, the slide plate is slid integrally with the storage tray that is moved, whereby the slide plate is not slid with respect to the music reproducing device.

In the above-described in-vehicle audio apparatus, it is preferable that the spring member is supported between the slide plate and the connection plate, and the slide plate is biased by the spring member in a direction toward the drawing-out position in the moving direction of the storage tray.

In such a case, the spring member is supported between the slide plate and the connection plate, and the slide plate is biased by the spring member in a direction toward the drawing-out position in the moving direction of the storage tray, whereby, when a contact between the slide plate and the music reproducing device is released, the slide plate is moved in a direction toward the drawing-out position in accordance with the biasing force of the spring member.

In the above-described in-vehicle audio apparatus, it is preferable that a pressing protruded portion that presses the pressing body at the drawing-out position is disposed in the storage tray.

In such a case, a pressing protruded portion that presses the pressing body at the drawing-out position is disposed in the storage tray, whereby the pressing body can be pressed by a part of the storage tray moved to the drawing-out position.

In the above-described in-vehicle audio apparatus, it is preferable that a cam engaging portion is disposed in the pressing body, and a sliding cam portion that is engaged with the cam engaging portion so as to be slidable and determines a moving position of the pressing body when being moved between the storing position and the drawing-out position is disposed in the storage tray.

In such a case, a sliding cam portion that is engaged with the cam engaging portion so as to be slidable and determines a moving position of the pressing body when being moved between the storing position and the drawing-out position is disposed in the storage tray, whereby the cam engaging portion is engaged with the sliding cam portion so as to determine the moving position of the pressing body.

In the above-described in-vehicle audio apparatus, it is preferable that the storage tray includes a bottom face part in which the music reproducing device is inserted and placed and one pair of side face parts that protrude from both edges of the bottom face part, and the sliding cam portion is disposed in the side face part of the storage tray.

In such a case, the storage tray includes a bottom face part in which the music reproducing device is inserted and placed and one pair of side face parts that protrude from both edges of the bottom face part, and the sliding cam portion is disposed in the side face part of the storage tray, whereby the sliding cam portion does not interfere with the music reproducing device that is inserted into the storage tray.

In the above-described in-vehicle audio apparatus, it is preferable that the cam engaging portion is pressed to the sliding cam portion by the bias spring.

In such a case, the cam engaging portion is pressed to the sliding cam portion by the bias spring, whereby the cam engaging portion is pressed to the sliding cam portion in accordance with the biasing force of the bias spring.

In the above-described in-vehicle audio apparatus, it is preferable that a roller that is rotated in a state of being pressed to the sliding cam portion is disposed as the cam engaging portion.

In such a case, the roller that is rotated in a state of being pressed to the sliding cam portion is disposed as the cam engaging portion, whereby the roller is rotated on the sliding cam portion so as to determine the moving position of the pressing body.

In the above-described in-vehicle audio apparatus, it is preferable that the storage tray is moved in forward and backward directions between the drawing-out position and the storing position, and the storage tray is maintained in a state of lowering a front side at the drawing-out position.

In such a case, the storage tray is moved in forward and backward directions between the drawing-out position and the storing position, and the storage tray is maintained in a state of lowering a front side at the drawing-out position, whereby the music reproducing device can be easily inserted into the storage tray.

In the above-described in-vehicle audio apparatus, it is preferable that a regulating face is formed in the base body, and a regulation face that is brought into facial contact with the regulating face at the drawing-out position is formed in the storage tray.

In such a case, the regulating face is formed in the base body, and a regulation face that is brought into facial contact with the regulating face at the drawing-out position is formed in the storage tray, whereby a contact area between the base body and the storage tray at the drawing-out position is large.

In the above-described in-vehicle audio apparatus, it is preferable that a regulating shaft that maintains the storage tray at the drawing-out position is disposed, and the storage tray is turned with the regulating shaft used as a point of support and is maintained in the state of lowering the front side at the drawing-out position.

In such a case, the regulating shaft that maintains the storage tray at the drawing-out position is disposed, and the storage tray is turned with the regulating shaft used as a point of support and is maintained in a state of lowering a front side at the drawing-out position, whereby the storage tray is maintained at the drawing-out position by the regulating shaft and is turned with the regulating shaft used as a point of support.

In the above-described in-vehicle audio apparatus, it is preferable that the storage tray includes a bottom face part in which the music reproducing device is inserted and placed and one pair of side face parts that protrude from both edges of the bottom face part, one pair of regulating faces is formed in the base body, and the regulation faces are formed in the one pair of the side face parts respectively.

In such a case, the one pair of regulating faces is formed in the base body, and the regulation faces are formed in the one pair of the side face parts respectively, whereby the regulating faces and the regulation faces are brought into contact with each other at two places.

The in-vehicle audio apparatus according to the embodiment of the present technology includes: a base body that is arranged in a fixed state; a storage tray that is moved between a drawing-out position and a storing position with respect to the base body and inserts and takes out a music reproducing device at the drawing-out position; a pressing body that is moved in accordance with a moving position of the storage tray in a direction perpendicular to a moving direction of the storage tray and presses the music reproducing device that is inserted into the storage tray when the pressing body is moved to one side; and a bias spring that presses the pressing body to the one side.

Accordingly, the range of music reproducing devices that can be inserted into the storage tray is wide so as to improve the versatility, and the pressing body is moved in the direction perpendicular to the moving direction of the storage tray so as to press the music reproducing device, whereby the holding state of the music reproducing device can be stabilized.

In one embodiment of the present technology, a plurality of arm members that are positioned between the base body and the pressing body so as to connect the base body and the pressing body and are operated for the base member are further disposed, the pressing body is moved in the direction perpendicular to the moving direction of the storage tray in accordance with operations of the plurality of arm members, and the plurality of arm members are positioned so as to be separated from each other in the moving direction of the storage tray.

Accordingly, the movement of the pressing body is performed in a stable manner, and the pressing body can be pressed to the music reproducing device with uniform balance, whereby the holding state of the music reproducing device can be stabilized.

In one embodiment of the present technology, the plurality of arm members are supported so to be rotatable together with the base member and the pressing body, and the bias spring is supported between the base body and the plurality of arm members.

Accordingly, the pressing force of the pressing body for the music reproducing device is stable, and therefore, the holding state of the music reproducing device can be stabilized.

In one embodiment of the present technology, the pressing body includes a connection plate that is connected to the base body through the plurality of arm members and a slide plate that can slide in the connection plate in the same direction as the moving direction of the storage tray, the slide plate is brought into contact with the music reproducing device so as to press the music reproducing device when the storage tray is moved, and the slide plate is slid while being integrated with the storage tray that is moved so as to be slid in a state in which the music reproducing device is pressed by the slide plate.

Accordingly, the slide plate is not slid in the music reproducing device, and scratches or damages of the music reproducing device can be prevented.

In one embodiment of the present technology, the spring member is supported between the slide plate and the connection plate, and the slide plate is biased by the spring member in a direction toward the drawing-out position in the moving direction of the storage tray.

Accordingly, when the storage tray into which the music reproducing device is inserted is moved from the drawing-out position toward the storing position, the slide plate is slid in the state in which the music reproducing device inserted into the storage tray is constantly pressed, whereby the music reproducing device can be constantly held in a stable manner.

In one embodiment of the present technology, a pressing protruded portion that presses the pressing body at the drawing-out position is disposed in the storage tray.

Accordingly, at the drawing-out position, the pressing body can be maintained in a stable state without any backlash.

In one embodiment of the present technology, a cam engaging portion is disposed in the pressing body, and a sliding cam portion that is engaged with the cam engaging portion so as to be slidable so as to determine a moving position of the pressing body when being moved between the storing position and the drawing-out position.

Accordingly, the position of the pressing body with respect to the storage tray can be accurately determined by using a simple mechanism.

In one embodiment of the present technology, the storage tray includes a bottom face part in which the music reproducing device is inserted and placed and one pair of side face parts that protrude from both edges of the bottom face part, and the sliding cam portion is disposed in the side face part of the storage tray.

Accordingly, the sliding cam portion does not interfere with the music reproducing device inserted into the storage ray, and the operation at the time of moving the storage tray can be appropriately performed.

In one embodiment of the present technology, the cam engaging portion is pressed to the sliding cam portion by the bias spring.

Accordingly, a spring dedicated for pressing the cam engaging portion to the sliding cam portion is not necessarily disposed, and the number of components is decreased, whereby an appropriate operation of the pressing body can be secured.

In one embodiment of the present technology, a roller that is rotated in a state of being pressed to the sliding cam portion is disposed as the cam engaging portion.

Accordingly, smooth operations of the storage tray and the pressing body can be secured.

In one embodiment of the present technology, the storage tray is moved in forward and backward directions between the drawing-out position and the storing position, and the storage tray is maintained in a state of lowering a front side at the drawing-out position.

Accordingly, it is easy for a user to insert the music reproducing device into the storage tray, and the convenience of the in-vehicle audio apparatus is improved.

In one embodiment of the present technology, a regulating face is formed in the base body, and a regulation face that is brought into facial contact with the regulating face at the drawing-out position is formed in the storage tray.

Accordingly, a large contact area between the base body and the storage tray is secured, and a stable holding state of the storage tray at the drawing-out position can be secured.

In one embodiment of the present technology, a regulating shaft that maintains the storage tray at the drawing-out position is disposed, and the storage tray is turned with the regulating shaft used as a point of support and is maintained in a state of lowering a front side at the drawing-out position.

Accordingly, the regulating shaft has two functions including a function of regulating the movement of the storage tray and a function as a point of support for turning the storage tray, whereby the mechanism can be simplified due to a decrease in the number of components.

In one embodiment of the present technology, the storage tray includes a bottom face part in which the music reproducing device is inserted and placed and one pair of side face parts that protrude from both edges of the bottom face part, one pair of regulating faces is formed in the base body, and the regulation faces are formed in the one pair of side face parts respectively.

Accordingly, the regulation faces and the regulating face are brought into contact with each other in two places, whereby a more stable holding state of the storage tray at the drawing-out position can be secured.

DETAILED DESCRIPTION

Hereinafter, preferred embodiments according to the present technology will be described with reference to the accompanying drawings.

An in-vehicle audio apparatus according to an embodiment of the present technology, for example, is arranged in a concave portion that is formed in a front cabinet inside a vehicle.

In the description present below, for convenience of the description, a driver side in the vehicle is set as the front side, and a front cabinet side with respect to a driver is set as the rear side.

In addition, the upward direction, the downward direction, the leftward direction, and the rightward direction illustrated below are represented for convenience of the description, and the present technology can be applied without being limited thereto.

[Configuration of In-Vehicle Audio Apparatus]

Figure 1:
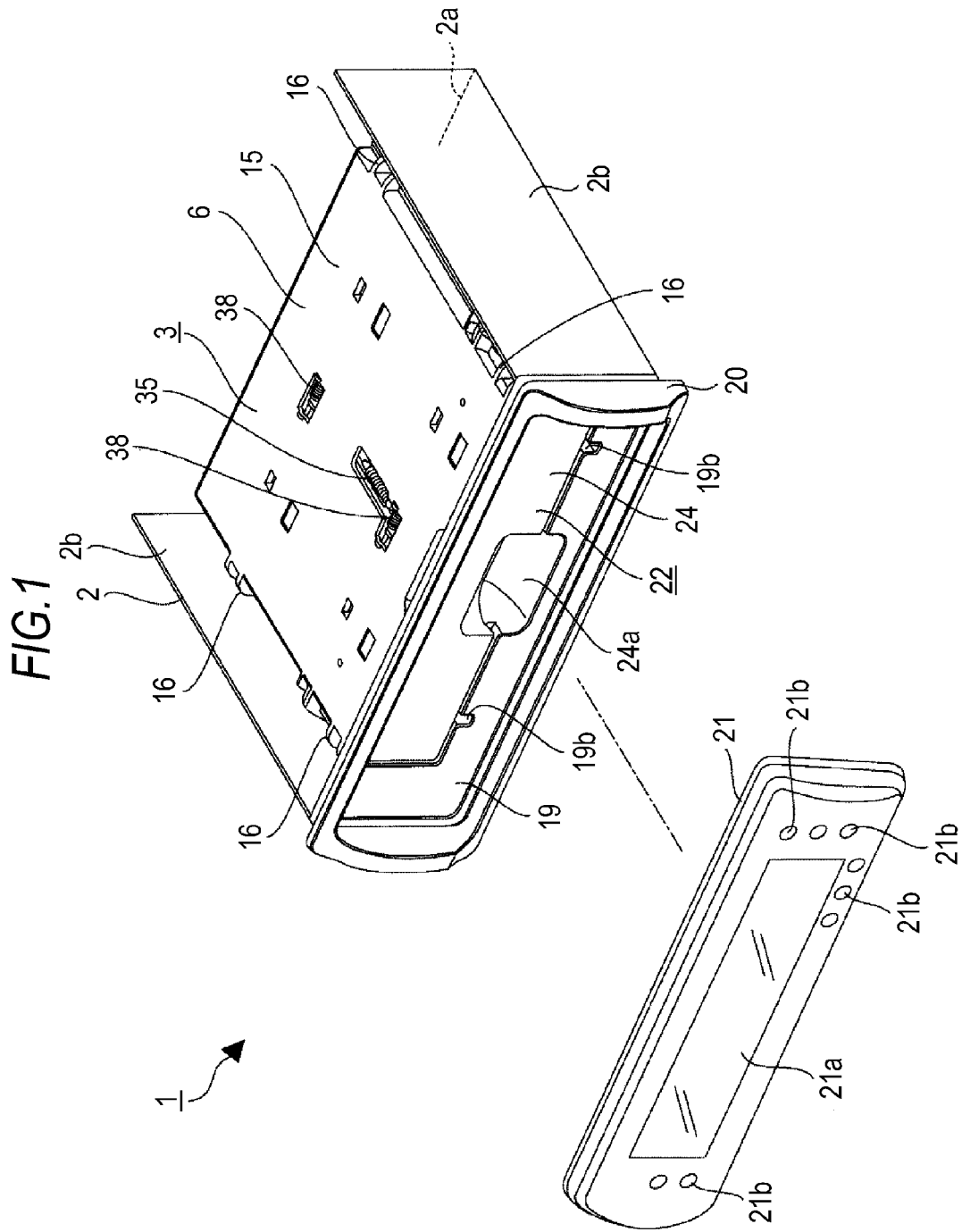
FIG. 1 illustrates a preferred embodiment of the present technology together with FIGS. 2 to 48 and is a perspective view of an in-vehicle audio apparatus illustrated in a state in which an operation panel is removed.
Figure 2:
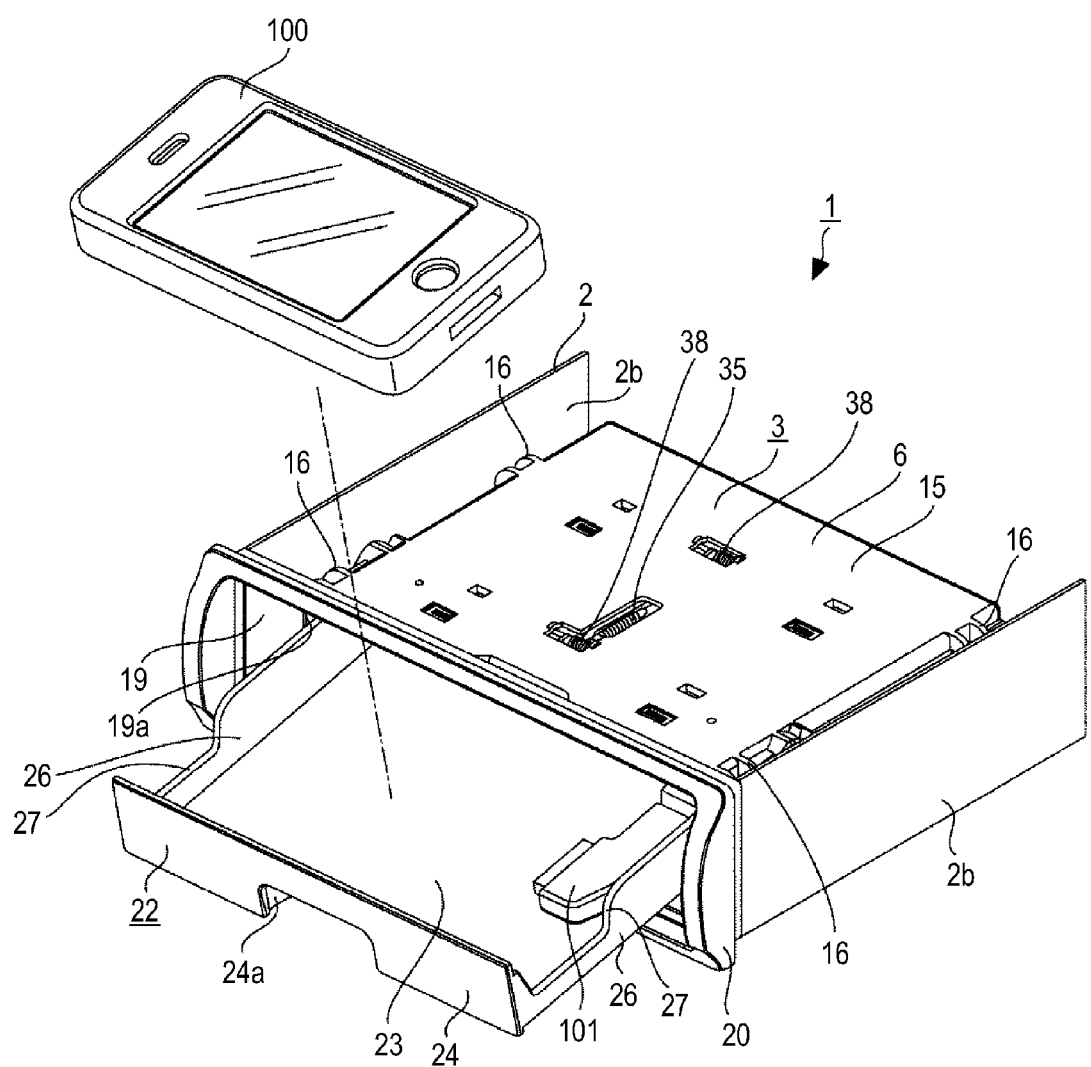
FIG. 2 is a perspective view of the in-vehicle audio apparatus illustrating a state in which a storage tray is located at a drawing-out position together with a music reproducing device.
Figure 3:
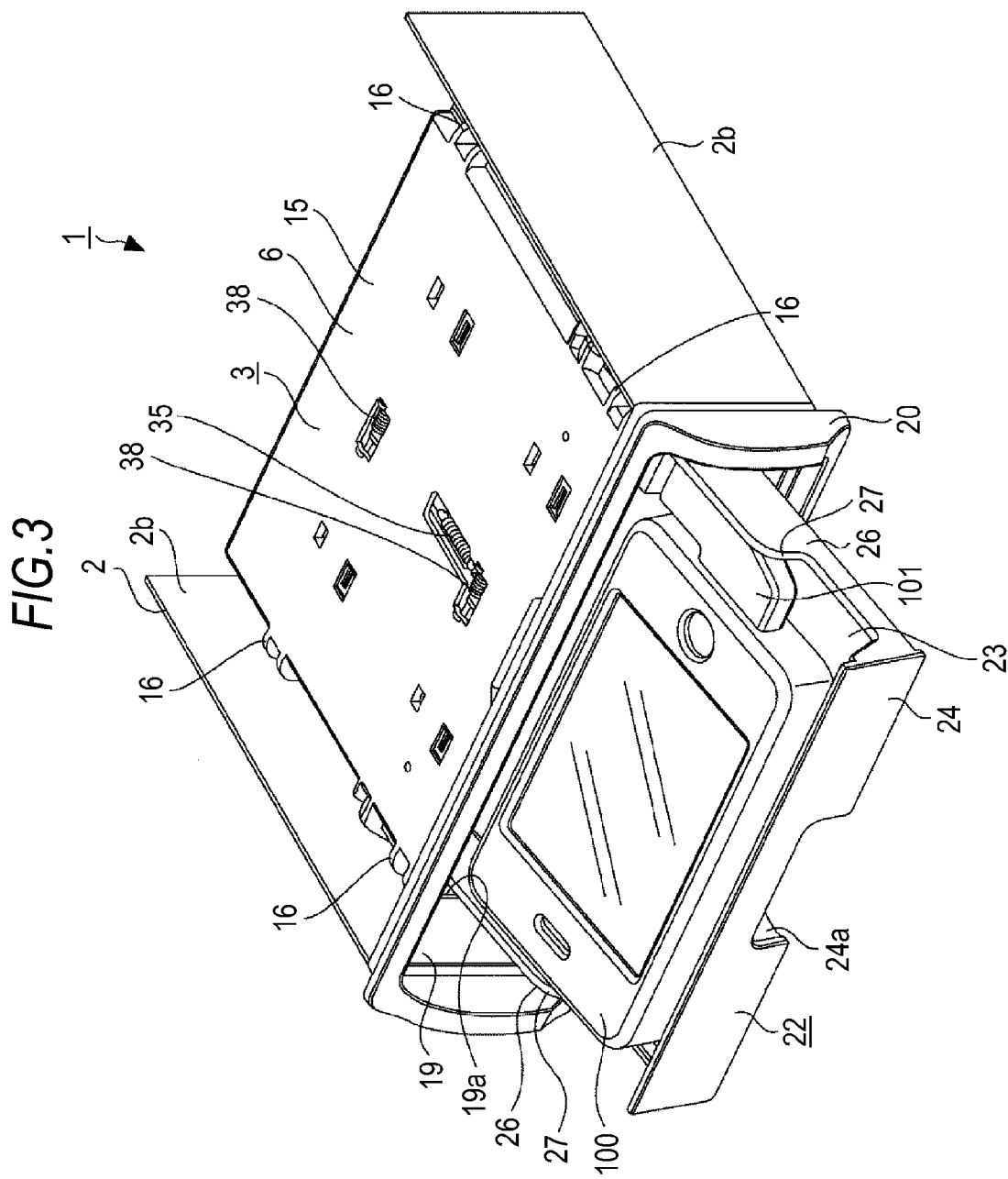
FIG. 3 is a perspective view of the in-vehicle audio apparatus illustrated in a state in which the music reproducing device is inserted into the storage tray located at the drawing-out position.
Figure 4:
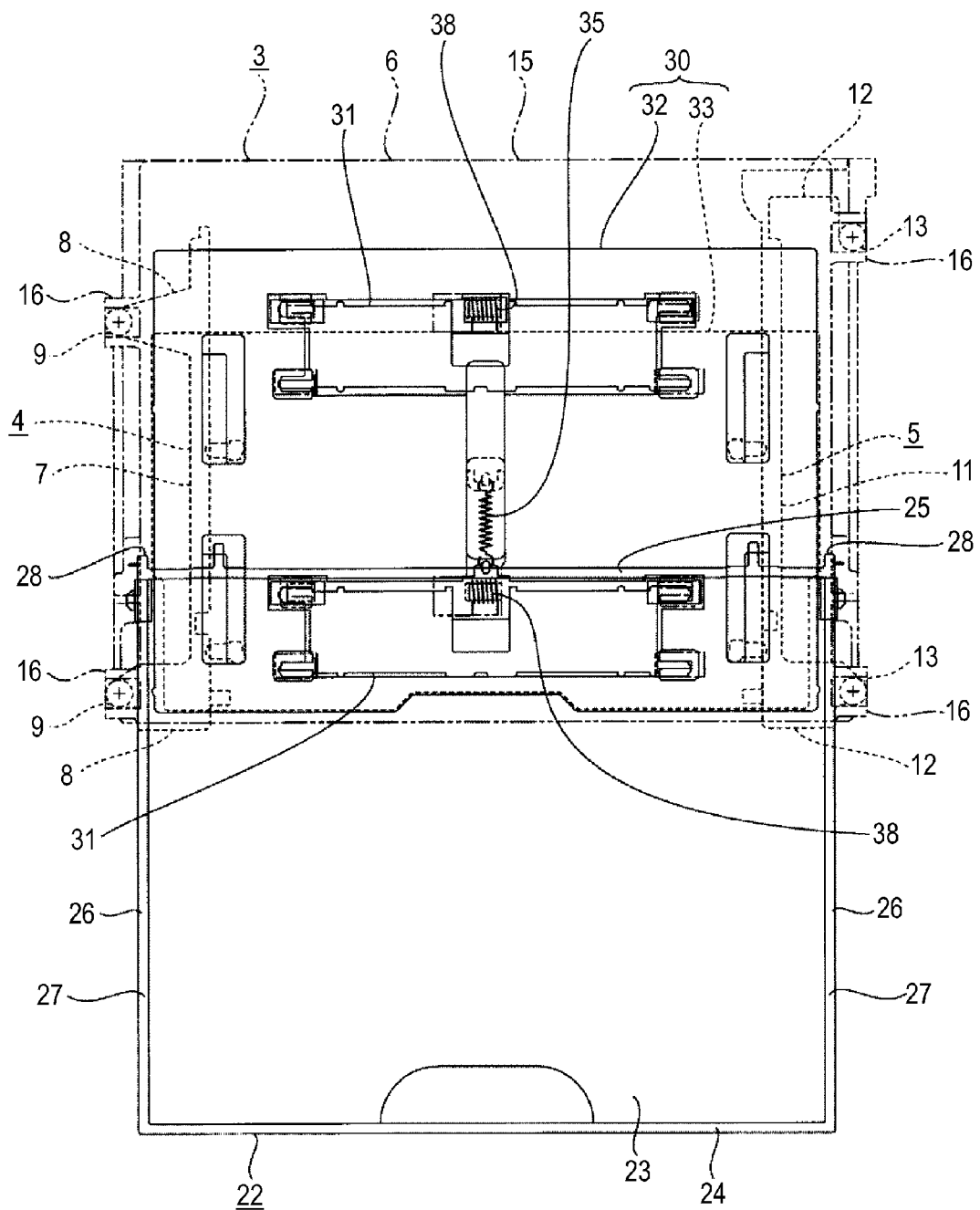
FIG. 4 is a schematic plan view of the in-vehicle audio apparatus.

The in-vehicle audio apparatus 1 is formed by arranging necessary parts in a chassis 2 (see FIGS. 1 to 3).

The chassis 2 includes a bottom plate part 2a and side plate parts 2b and 2b that protrude upward from both left and right side edges of the bottom plate part 2a.

In the chassis 2, a base body 3 is arranged. The base body 3 includes guide rails 4 and 5 that are arranged on the left and right sides so as to be separated from each other and an upper panel 6 that is positioned on the upper side of the guide rails 4 and 5 (see FIGS. 1 to 5).

Figure 5:
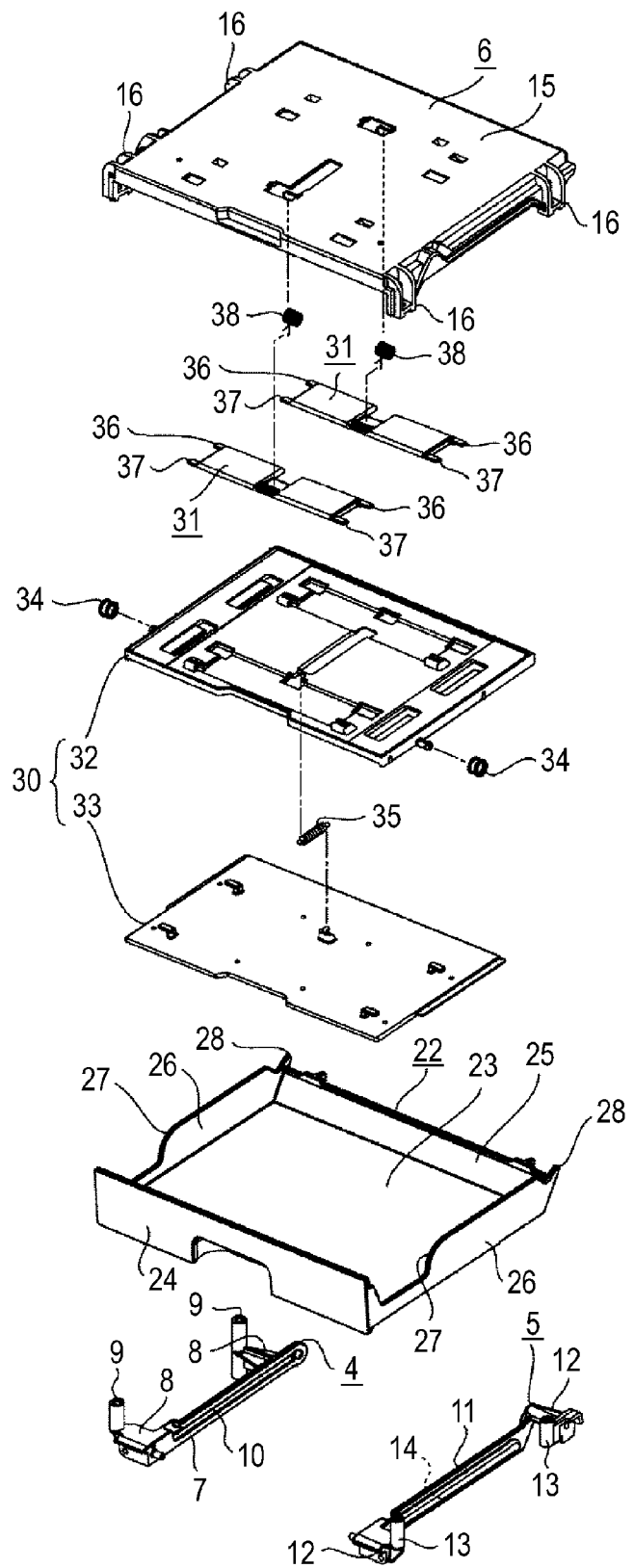
FIG. 5 is an exploded perspective view of the in-vehicle audio apparatus.
Figure 6:
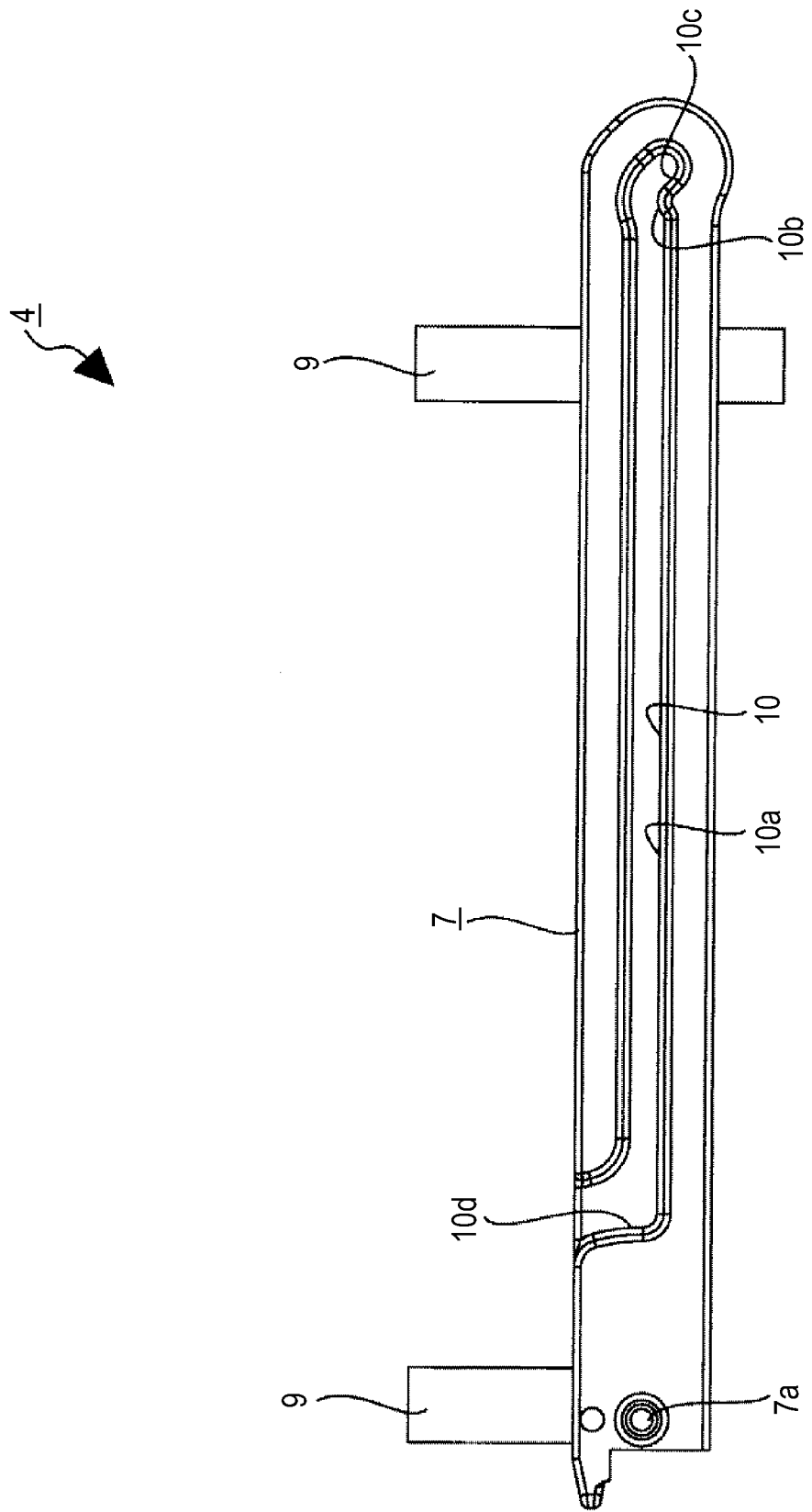
FIG. 6 is a side view of one guide rail.

The guide rail 4, as illustrated in FIGS. 5 and 6, is configured by a guide portion 7 that extends to the front and rear sides, protruded portions 8 and 8 that protrude from both front and rear end portions of the guide portion 7 to the left side, and attachment shafts 9 and 9 that are disposed in tip end portions of the protruded portions 8 and 8.

In the guide portion 7, a guide groove 10 that is open to the right side is formed. The guide groove 10 is formed as a guide portion 10a that extends to the front and rear sides except for both front and rear end portions thereof. In the guide groove 10, a displacement portion 10b that is continuous from the rear end of the guide portion 10a, a holding portion 10c that is continuous from the displacement portion 10b, and a runoff portion 10d that is continuous from the front end of the guide portion 10a are formed. The displacement portion 10b is separated from the guide portion 10a to be inclined so as to be displaced upward, the holding portion 10c is separated from the displacement portion 10b to be inclined so as to be displaced downward, and a runoff portion 10d extends from the guide portion 10a to the approximately upper side.

In a front end portion of the guide portion 7, a regulating shaft 7a that protrudes to the right side is disposed.

The attachment shafts 9 and 9 of the guide rail 4 are installed to the bottom plate part 2a of the chassis 2 and the upper panel 6.

Figure 7:
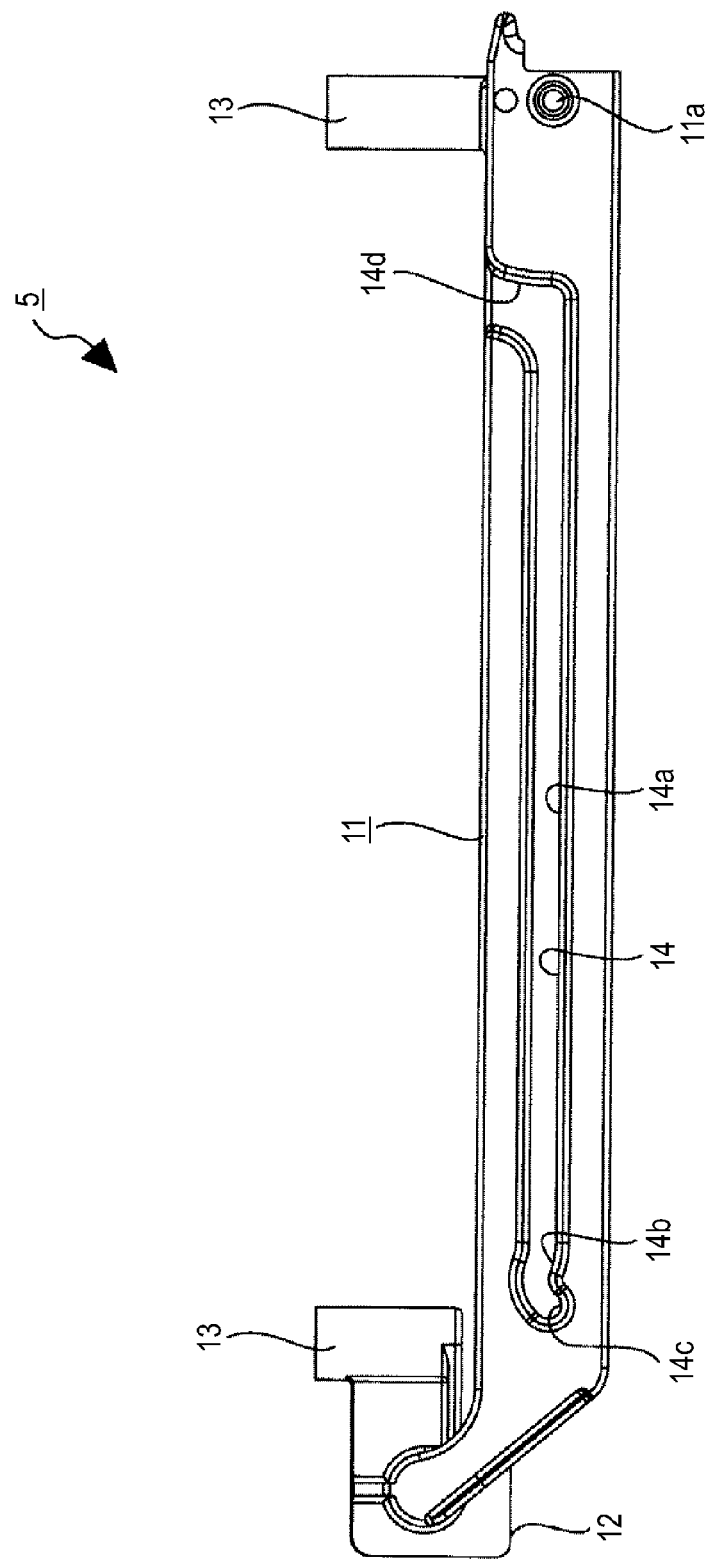
FIG. 7 is a side view of the other guide rail.

The guide rail 5, as illustrated in FIGS. 5 and 7, is formed by a guide portion 11 that extends to the front and rear sides, protruded portions 12 and 12 that protrude from both front and rear end portions of the guide portion 11 to the right side, and attachment shafts 13 and 13 that are disposed at the front end portions of the protruded portions 12 and 12.

In the guide portion 11, a guide groove 14 that is open to the left side is formed. The guide groove 14 is formed as a guide portion 14a that extends to the front and rear sides except for both front and rear end portions thereof. In the guide groove 14, a displacement portion 14b that is continuous from the rear end of the guide portion 14a, a holding portion 14c that is continuous from the displacement portion 14b, and a runoff portion 14d that is continuous from the front end of the guide portion 14a are formed. The displacement portion 14b is separated from the guide portion 14a to be inclined so as to be displaced upward, the holding portion 14c is separated from the displacement portion 14b to be inclined so as to be displaced downward, and a runoff portion 14d extends from the guide portion 14a to the approximately upper side.

In a front end portion of the guide portion 11, a regulating shaft 11a that protrudes to the left side is disposed.

The attachment shafts 13 and 13 of the guide rail 5 are installed to the bottom plate part 2a of the chassis 2 and the upper panel 6.

Figure 8:
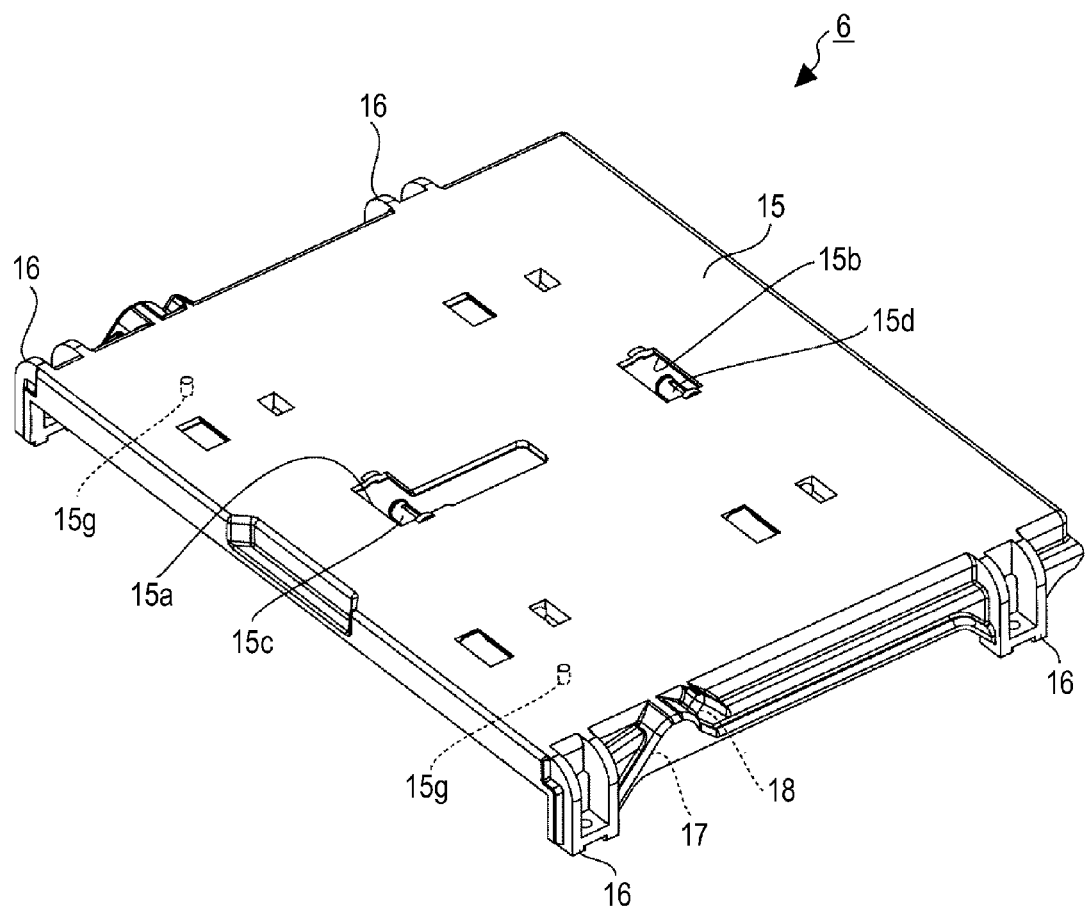
FIG. 8 is a perspective view of an upper panel.

The upper panel 6, as illustrated in FIGS. 5 and 8, is formed by a base face portion 15 that has a rectangular shape facing the upper and lower sides and attaching protruded portions 16, 16, . . . that are disposed on both left and right end portions of the base face portion 15.

In the center portion of the base face portion 15 in the leftward and rightward directions, a first spring arranging hole 15a and a second spring arranging hole 15b are formed on the front and rear sides so as to be separated from each other.

On the lower face side of the base face portion 15, a first spring supporting shaft 15c and a second spring supporting shaft 15d are disposed on the front and rear sides so as to be separated from each other, the first spring supporting shaft 15c is positioned at the first spring arranging hole 15a, and the second spring supporting shaft 15d is positioned at the second spring arranging hole 15b.

Figure 9:
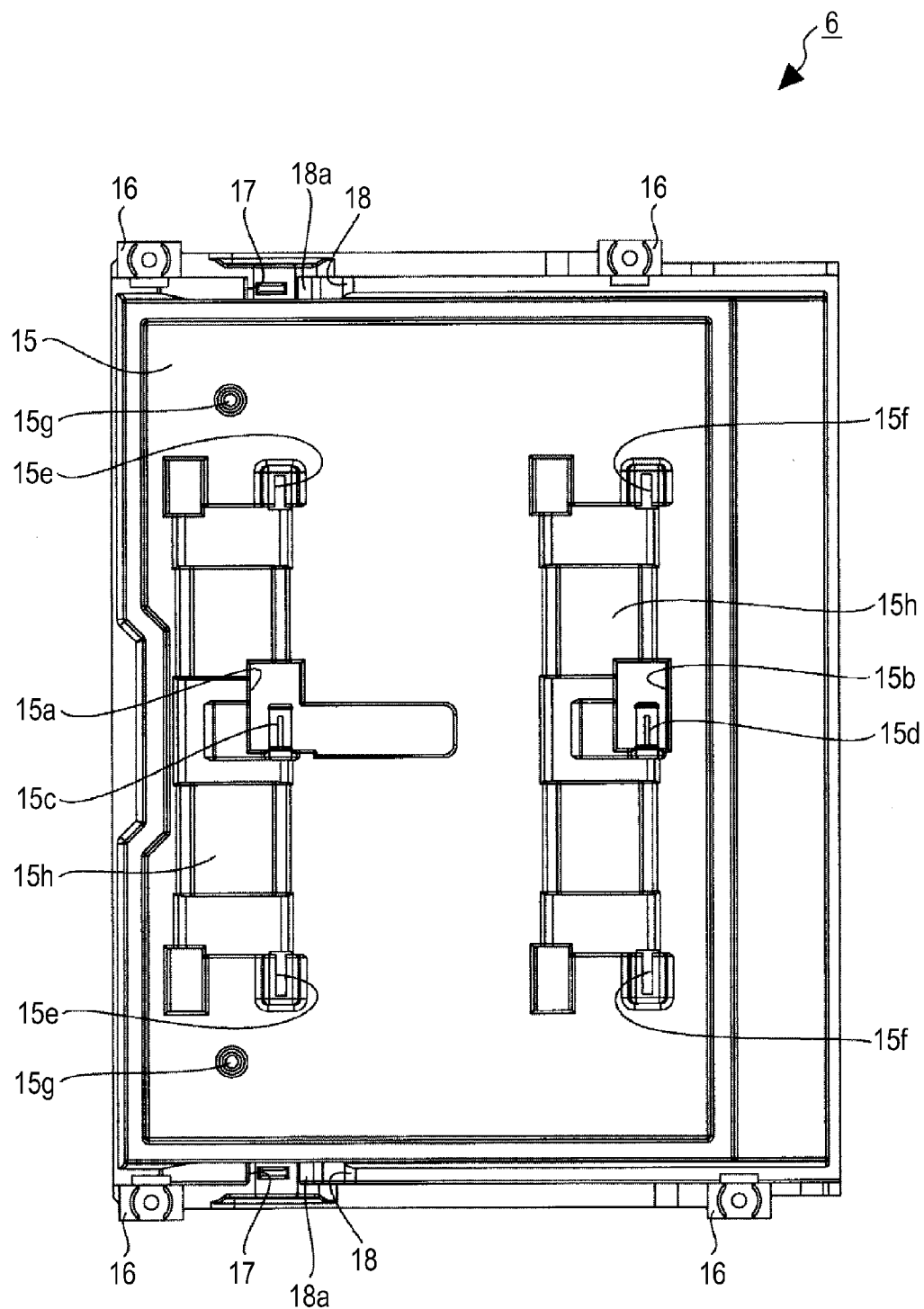
FIG. 9 is a bottom view of the upper panel.

On the front end side of the lower face side of the base face portion 15, first connection grooves 15e and 15e are formed on the left and right sides so as to be separated from each other (see FIG. 9). The first connection grooves 15e and 15e are open to the lower side and the inner side and are formed to have mutually different lengths in the leftward and rightward directions.

On the rear end side of the lower face side of the base face portion 15, second connection grooves 15f and 15f are formed on the left and right sides so as to be separated from each other. The second connection grooves 15f and 15f are open to the lower side and the inner side and are formed to have mutually different lengths in the leftward and rightward directions.

Figure 10:
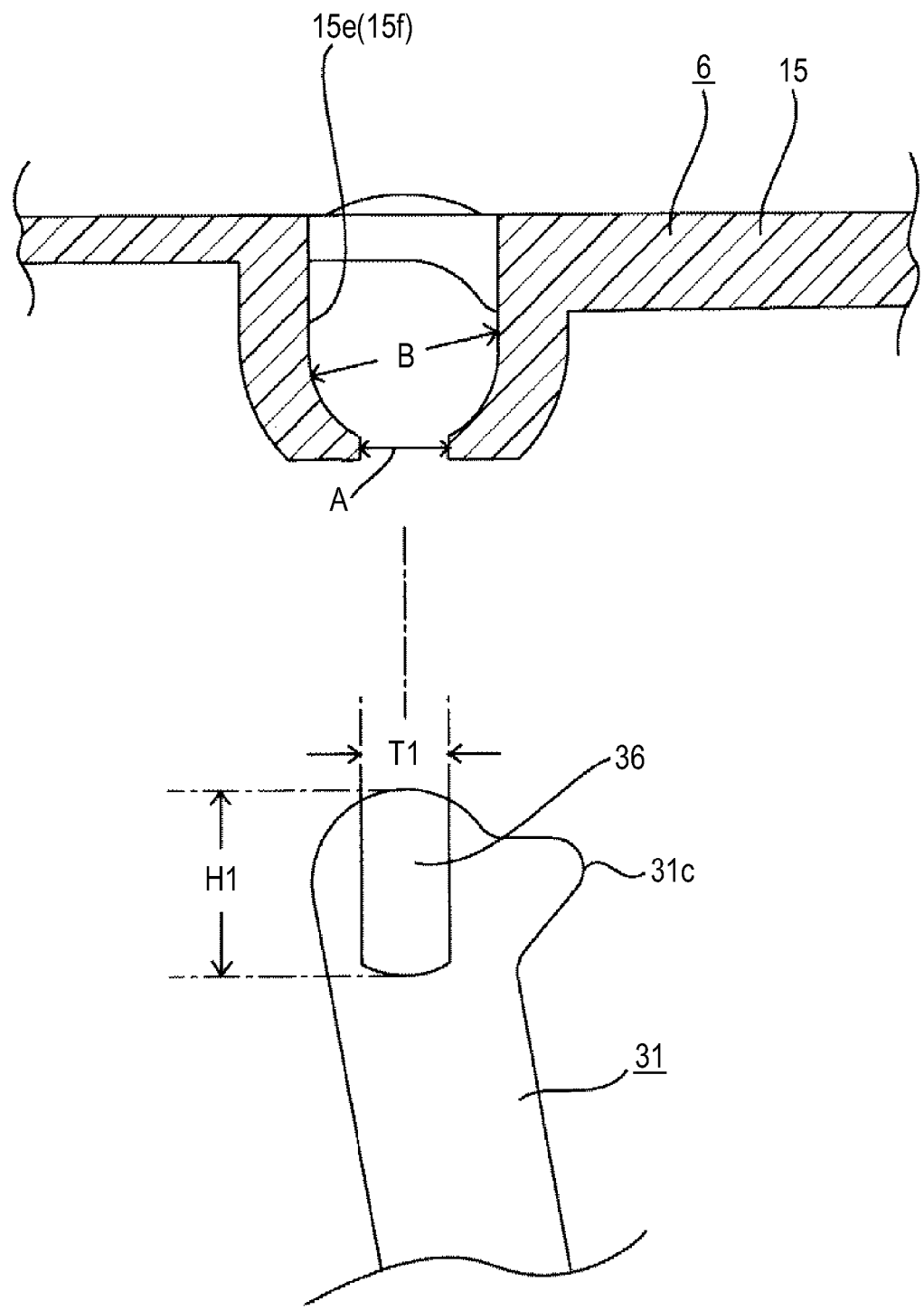
FIG. 10 is an enlarged side view illustrating parts of a connection groove and an arm member that are connected to the upper panel with a part thereof illustrated as a cross-section.

In the first connection grooves 15e and 15e and the second connection grooves 15f and 15f, as illustrated in FIG. 10, the lower-side widths A, A, . . . are formed to be smaller than the inner diameters B, B, . . . .

On the lower face of the base face portion 15, regulating protruded portions 15g and 15g are disposed at positions near the first connection grooves 15*e* and 15*e* (see FIG. 8). The regulating protruded portions 15*g* and 15*g* protrude to the lower side and are disposed on the left and right sides so as to be separated from each other.

In addition, on the lower face of the base face portion 15, shallow groove portions 15*h* and 15*h*, which are open to the lower side and formed in a predetermined shape, are formed on the front and rear sides so as to be separated from each other (see FIG. 9).

Figure 11:
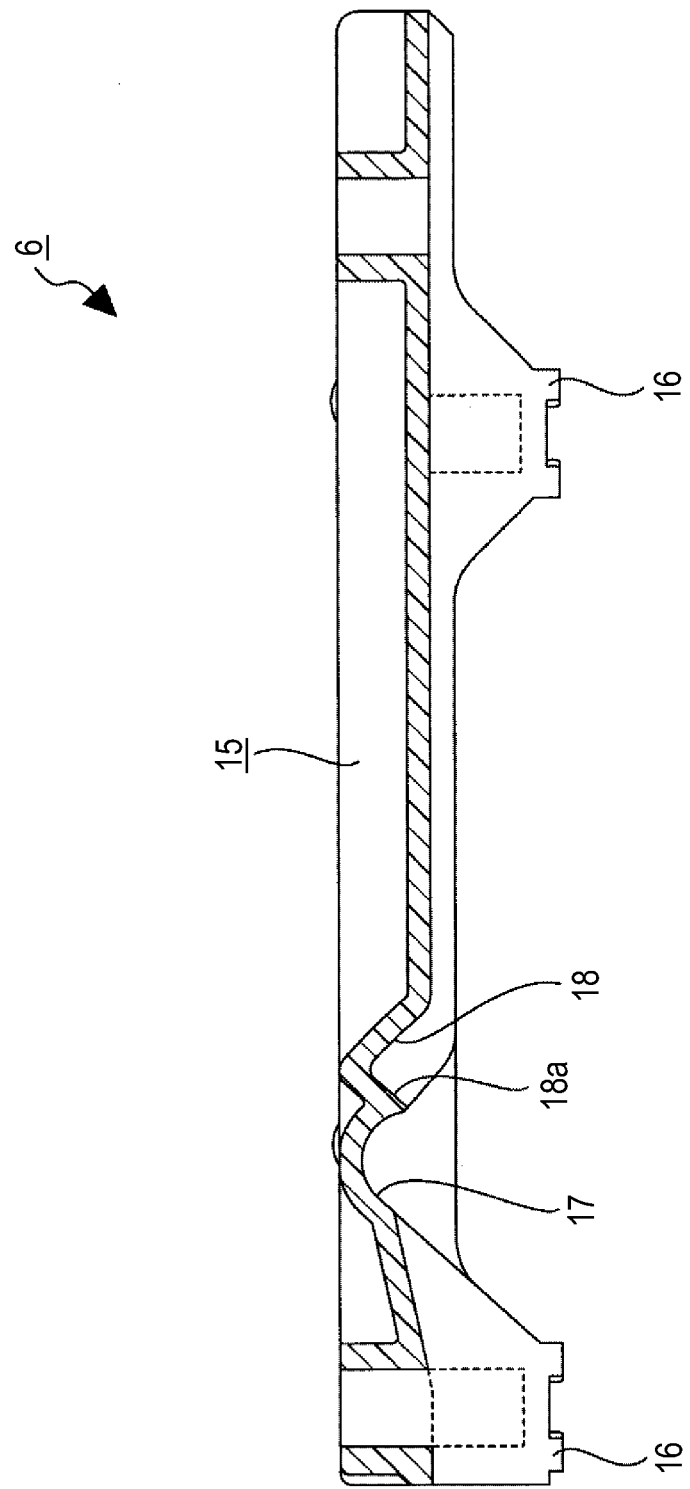
FIG. 11 is a cross-sectional view of the upper panel that represents an insertion groove and a regulating groove.

In both left and right end portions of the base face portion 15, insertion grooves 17 and 17 that are open to the lower side are formed (see FIG. 11). The insertion grooves 17 and 17 are formed at positions close to the front end of the base face portion 15 of the insertion grooves 17 and 17.

In both left and right end portions of the base face portion 15, regulating grooves 18 and 18 that are open to the lower side are formed. The insertion grooves 18 and 18 are formed to be continuous from the rear sides of the insertion grooves 17 and 17 and include regulating faces 18*a* and 18*a* that face obliquely downward to the rear.

The attaching protruded portions 16 and 16, . . . are disposed at a position located at the front end portion and a position close to the rear end in both left and right end portions of the base face portion 15 (see FIG. 8). At the attaching protruded portions 16, 16, the attachment shafts 9, 9, 13, and 13 of the guide rails 4 and 5 are attached from the lower side through screw stopping.

At the front end portion of the chassis 2, a front panel 19 is attached (see FIGS. 1 to 3). In the front panel 19, a horizontally long opening 19*a* is formed, and a connector portion not illustrated in the figure is disposed at a predetermined position. At the lower opening edge of the opening portion 19*a* of the front panel 19, guide grooves 19*b* and 19*b* that are open to the upper side are formed on the left and right sides so as to be separated from each other.

At the front panel 19, a horizontally-long frame 20 is attached. The frame 20 serves as a decorative frame arranged in the front cabinet located inside the vehicle.

An operation panel 21 is detachably attached to the front panel 19. The operation panel 21 is inserted into the inside of the frame 20 so as to be attached to the front panel 19, and a terminal portion, which is not illustrated in the figure, is connected to a connector portion of the front panel 19 in the state in which the operation panel 21 is attached to the front panel 19.

In the operation panel 21, a display unit 21*a* and a plurality of operation sections 21*b*, 21*b*, . . . are disposed. By operating the operation sections 21*b*, 21*b*, . . . of the operation panel 21, a predetermined operation according to the operation, for example, reproduction or stop of music, selection of a musical piece, a desired display on the display unit 21*a*, or the like is performed.

In addition, the operation for the reproduction of music or the like may be configured to be externally performed by using a remote control device not illustrated in the figure.

In the base body 3, the storage tray 22 is supported in the state of being movable to the forward and backward directions (see FIGS. 1 to 4). The storage tray 22, for example, is manually moved between a drawing-out position that is a movement end located on the front side and a storing position that is a movement end located on the rear side.

Figure 12:
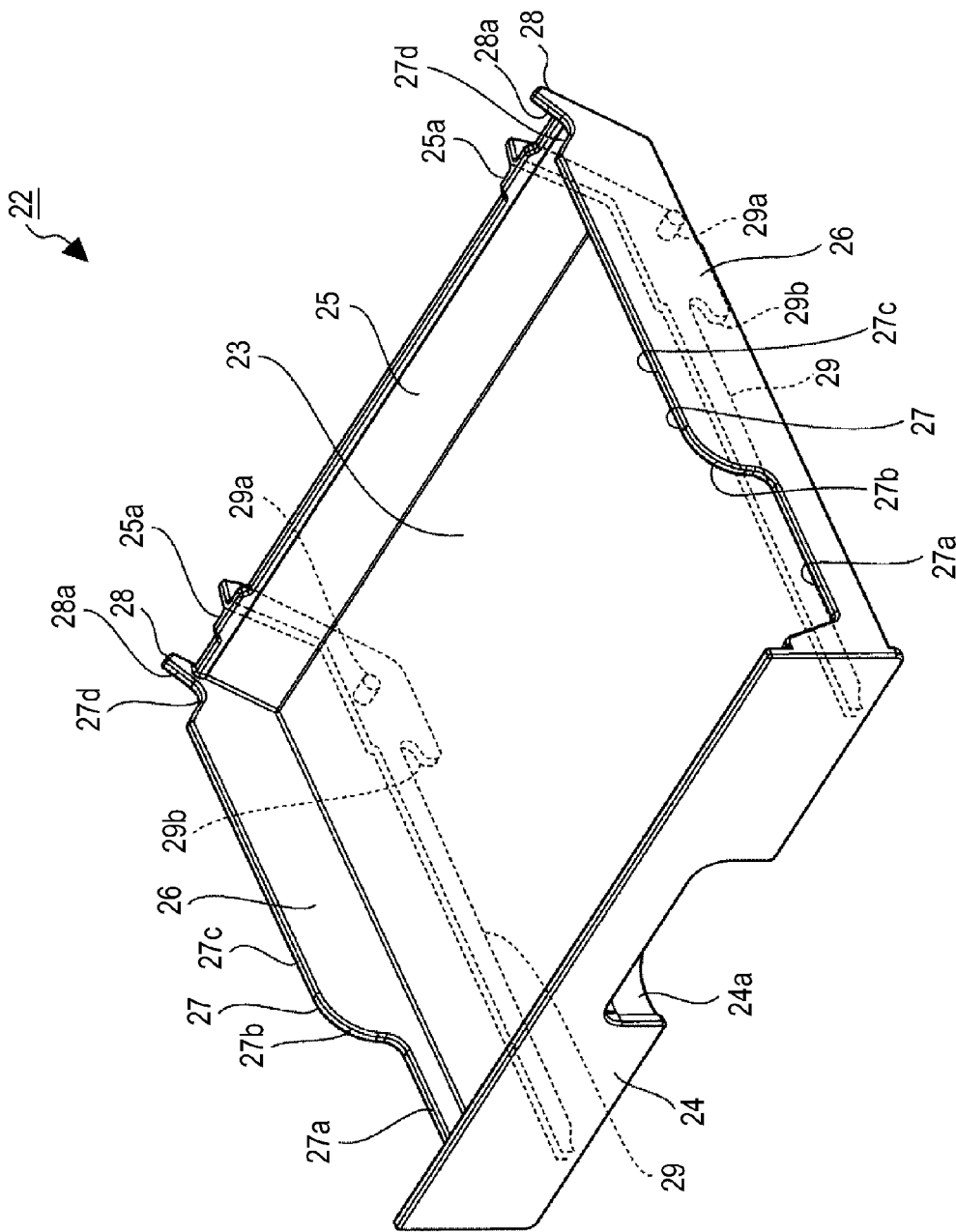
FIG. 12 is a perspective view of the storage tray.

The storage tray 22, as illustrated in FIGS. 5 and 12, includes a bottom face portion 23 formed in a rectangular shape, a front face portion 24 that protrudes to the upper side from the front edge of the bottom face portion 23, a rear face portion 25 that protrudes from the rear edge of the bottom face portion 23 to the upper side, and side face portions 26 and 26 that protrude from both left and right edges of the bottom face portion 23 to the upper side.

A cushion may be attached to the upper face of the bottom face portion 23.

In the center portion of the front face portion 24 in the leftward and rightward directions, a gripping concave portion 24*a* that is open to the front and lower sides is formed.

On the upper face of the rear face portion 25, pressing protruded portions 25*a* and 25*a* protruding to the upper side are disposed on the left and right sides so as to be separated from each other.

The upper edges of the side face portions 26 and 26 are formed as sliding cam portions 27 and 27. The sliding cam portion 27 is formed by a descending portion 27*a* that is positioned on the front side and extends to the front and rear sides, an elevation portion 27*b* that is continuous from the rear end of the descending portion 27*a* and is formed in the shape of a curve surface that is displaced to the further upper side toward the rear side, an elevation portion 27*c* that is continuous from the rear end of the elevation portion 27*b* and extends to the front and rear sides, and a position regulating portion 27*d* that is continuous from the rear end of the elevation portion 27*c*. The position regulating portion 27*d* is formed in a letter "V" shape that is open to the upper side.

Upper end portions of the rear end portions of the side face portions 26 and 26 are arranged as regulation portions 28 and 28, and the regulation portions 28 and 28 include regulation faces 28*a* and 28*a* that face obliquely upward to the front. The regulation faces 28*a* and 28*a* are faces that configure parts of the position regulating portions 27*d* to 27*d* of the sliding cam portions 27 and 27.

Figure 13:
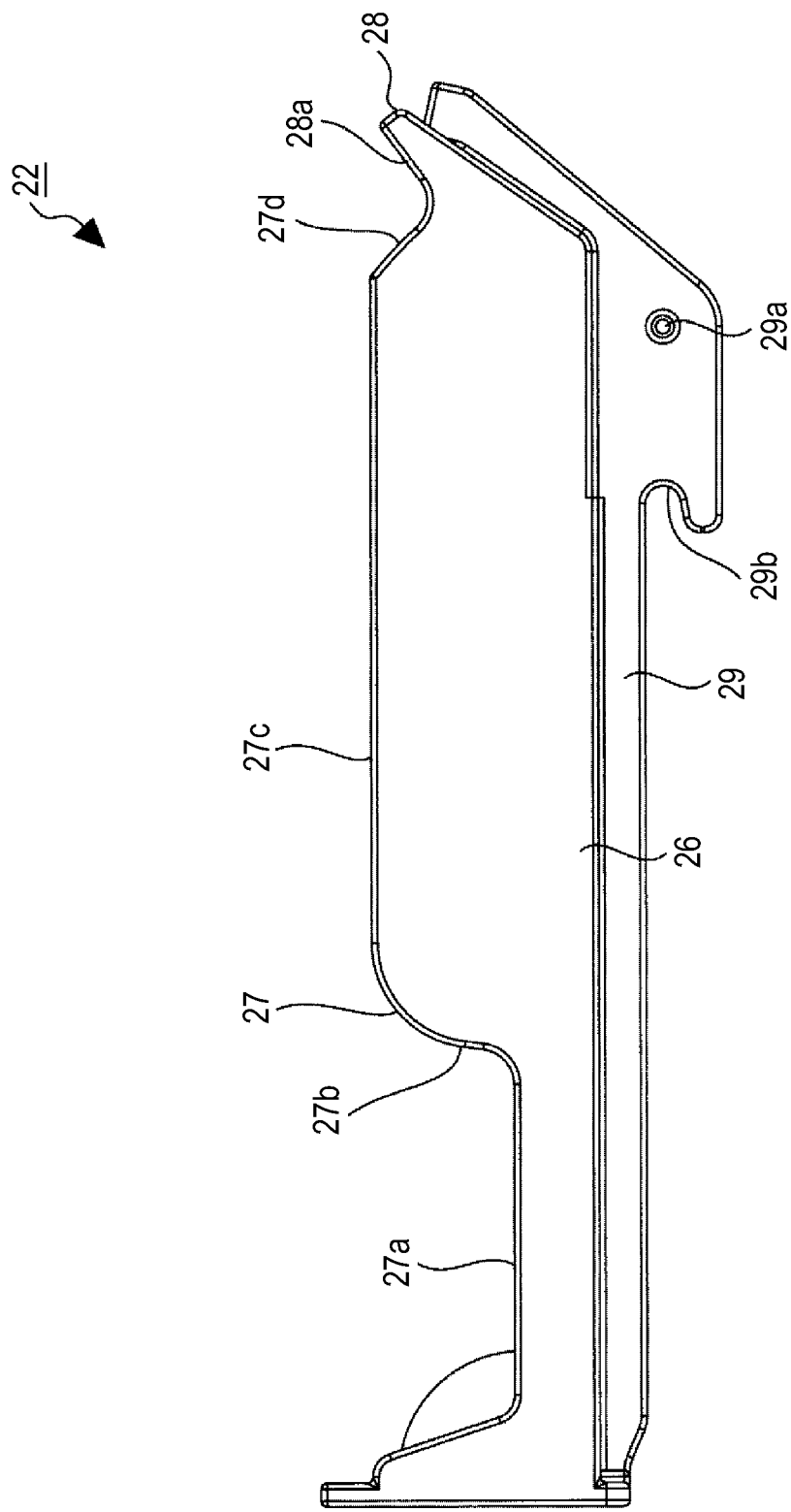
FIG. 13 is a side view of the storage tray.
Figure 14:
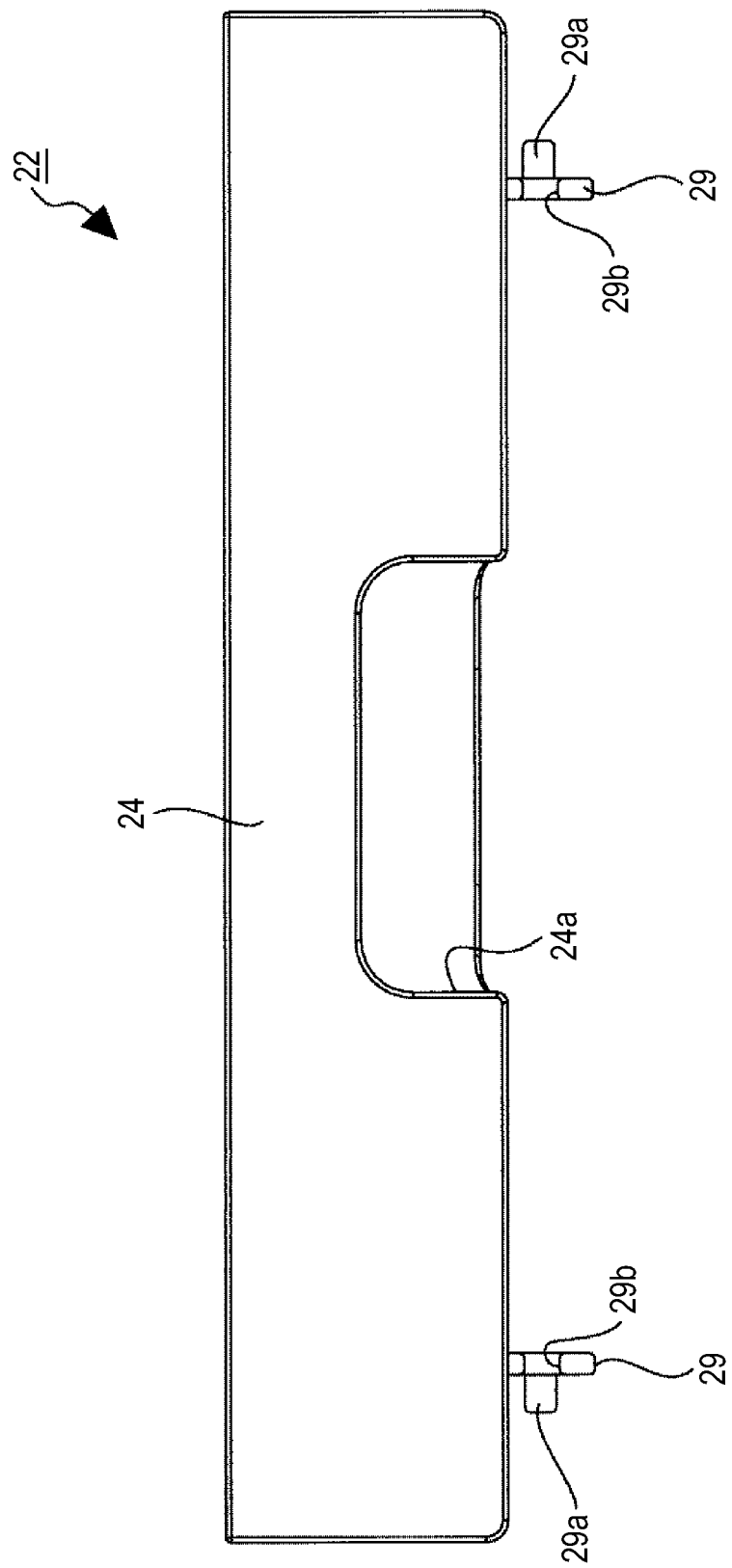
FIG. 14 is a front view of the storage tray.

At positions located over the lower face of the bottom face portion 23 and the rear face of the rear face portion 25 of the storage tray 22, guide pieces 29 and 29 are disposed on the left and right sides so as to be separated from each other (see FIGS. 12 to 14). In the guide pieces 29 and 29, guide pins 29*a* and 29*a* protruding to the outer sides (lateral sides) are disposed, the guide pins 29*a* and 29*a* are disposed at positions close to the rear ends of portions of the guide pieces 29 and 29 that are disposed in the bottom face portion 23. In the guide pieces 29 and 29, regulation grooves 29*b* and 29*b* that are open to the front side are formed at positions located on the front sides of the guide pins 29*a* and 29*a*.

The storage tray 22 has the guide pins 29*a* and 29*a* being engaged with the guide grooves 10 and 14 of the guide rails 4 and 5 so as to be slidable and is supported by the base body 3 in a movable state. The storage tray 22 is inserted into or taken out from the opening 19*a* of the front panel 19, and, at this time, the guide pieces 29 and 29 are guided into the guide grooves 19*b* and 19*b*. In addition, the guide pins 29*a* and 29*a* are guided by the guide portions 10 and 14 of the guide rails 4 and 5, and the storage tray 22 is moved between a storing position and a drawing-out position.

The pressing body 30 is connected to the upper panel 6 through arm members 31 and 31 (see FIG. 5). The pressing body 30 is formed by vertically combining a connection plate 32 and a slide plate 33.

Figure 15:
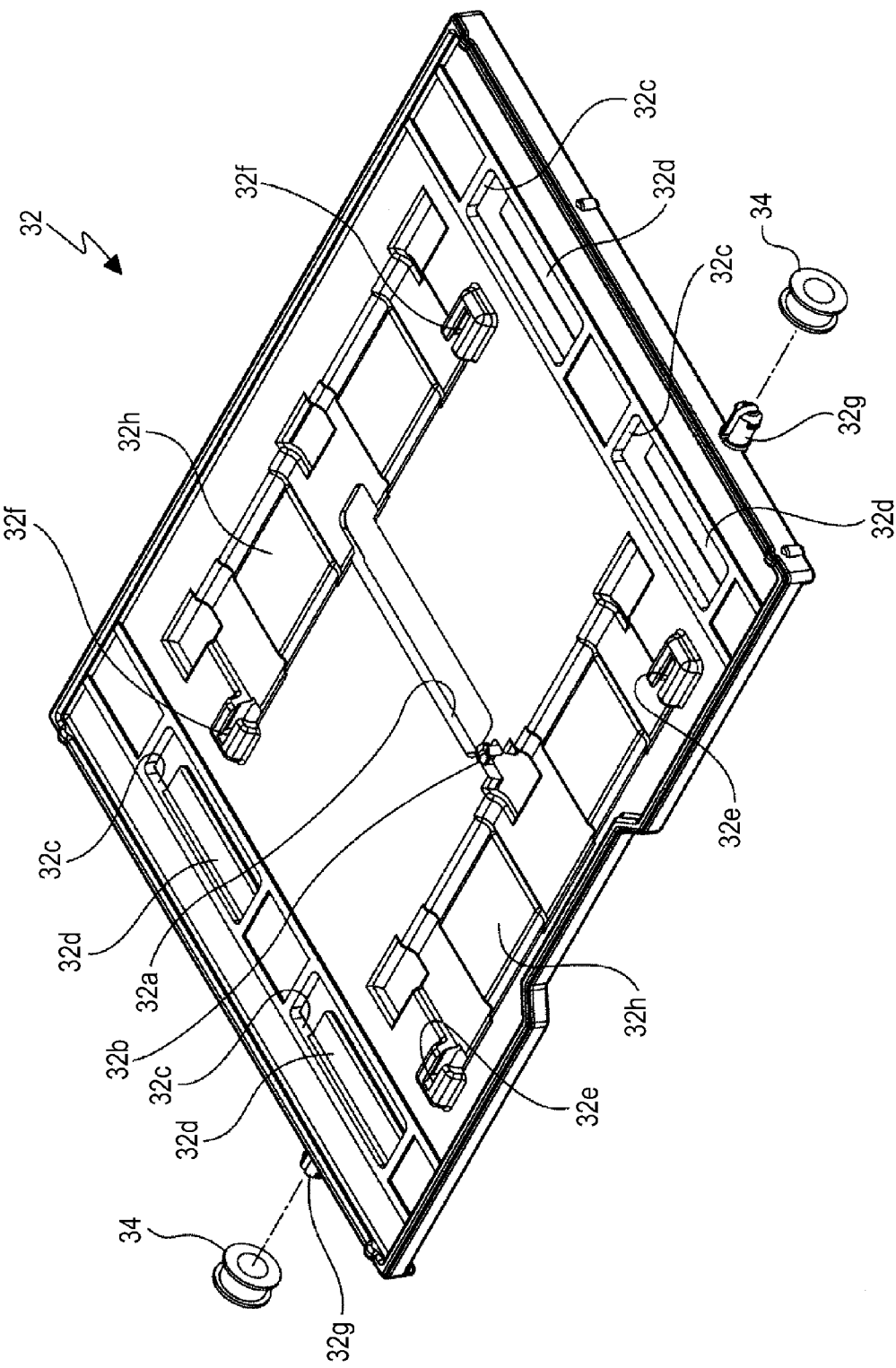
FIG. 15 is a perspective view illustrating a connection plate and rollers.

The connection plate 32 is formed in a rectangular shape, and, as illustrated in FIG. 15, in the connection plate 32, a spring arranging hole 32*a* that extends to the front and rear sides is formed at the center portion in the leftward and rightward directions. On the front side of the spring arranging hole 32*a* of the connection plate 32, a spring engaging protruded portion 32*b* is disposed.

In both left and right ends portions of the connection plate 32, horizontally-long insertion holes 32*c*, 32*c*, . . . are formed on the front and rear sides so as to be separated from each other. In the connection plate 32, plate-shaped support pieces 32d, 32d, . . . extending to the front and rear sides are disposed, and the support pieces 32d, 32d, . . . are positioned at the insertion holes 32c, 32c, . . . . The support pieces 32d, 32d, . . . have front edges and one side edge that are continuous from the opening edge of the insertion holes 32c, 32c, . . . .

On the front end side of the upper face side of the connection plate 32, first connection grooves 32e and 32e are formed on the left and right sides so as to be separated from each other. The first connection grooves 32e and 32e are open to the upper side and the inner side and are formed so as to have mutually different lengths in the leftward and rightward directions.

On the rear end side of the upper face side of the connection plate 32, second connection grooves 32f and 32f are formed on the left and right sides so as to be separated from each other. The second connection grooves 32f and 32f are open to the upper side and the inner side and are formed so as to have mutually different lengths in the leftward and rightward directions.

Figure 16:
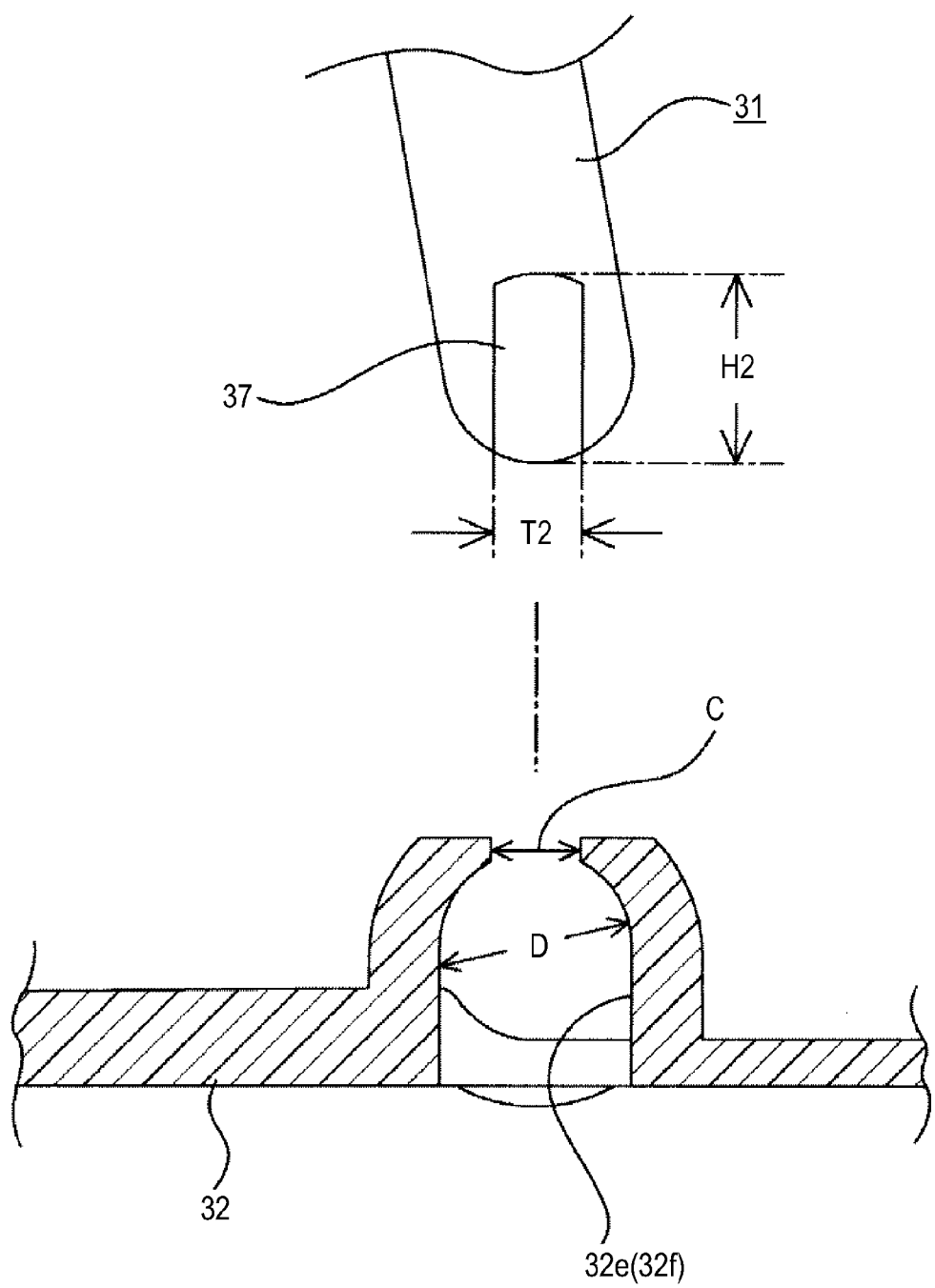
FIG. 16 is an enlarged side view illustrating parts of a connection groove and an arm member that are formed in the connection plate with a part thereof illustrated as a cross-section.

In the first connection grooves 32e and 32e and the second connection grooves 32f and 32f, as illustrated in FIG. 16, the widths C, C, . . . of the opening portions positioned on the upper side are formed to be smaller than the inner diameters D, D, . . . .

On both left and right side faces of the connection plate 32, supporting shafts 32g and 32g that protrude to the outer side (lateral side) are disposed (see FIG. 15). The supporting shafts 32g and 32g are disposed at positions close to the front end of the connection plate 32. At the supporting shafts 32g and 32g, rollers 34 and 34 serving as cam engaging portions are supported so as to be rotatable.

In the lower face of the connection plate 32, shallow groove portions 32h and 32h that are open to the upper side and formed in a predetermined shape are formed on the front and rear sides so as to be separated from each other.

The slide plate 33 is formed in a rectangular shape, and the length thereof in the forward and backward directions is formed to be slightly shorter than that length of the connection plate 32 in the forward and backward directions. To the lower face of the slide plate 33, a cushion may be attached.

Figure 17:
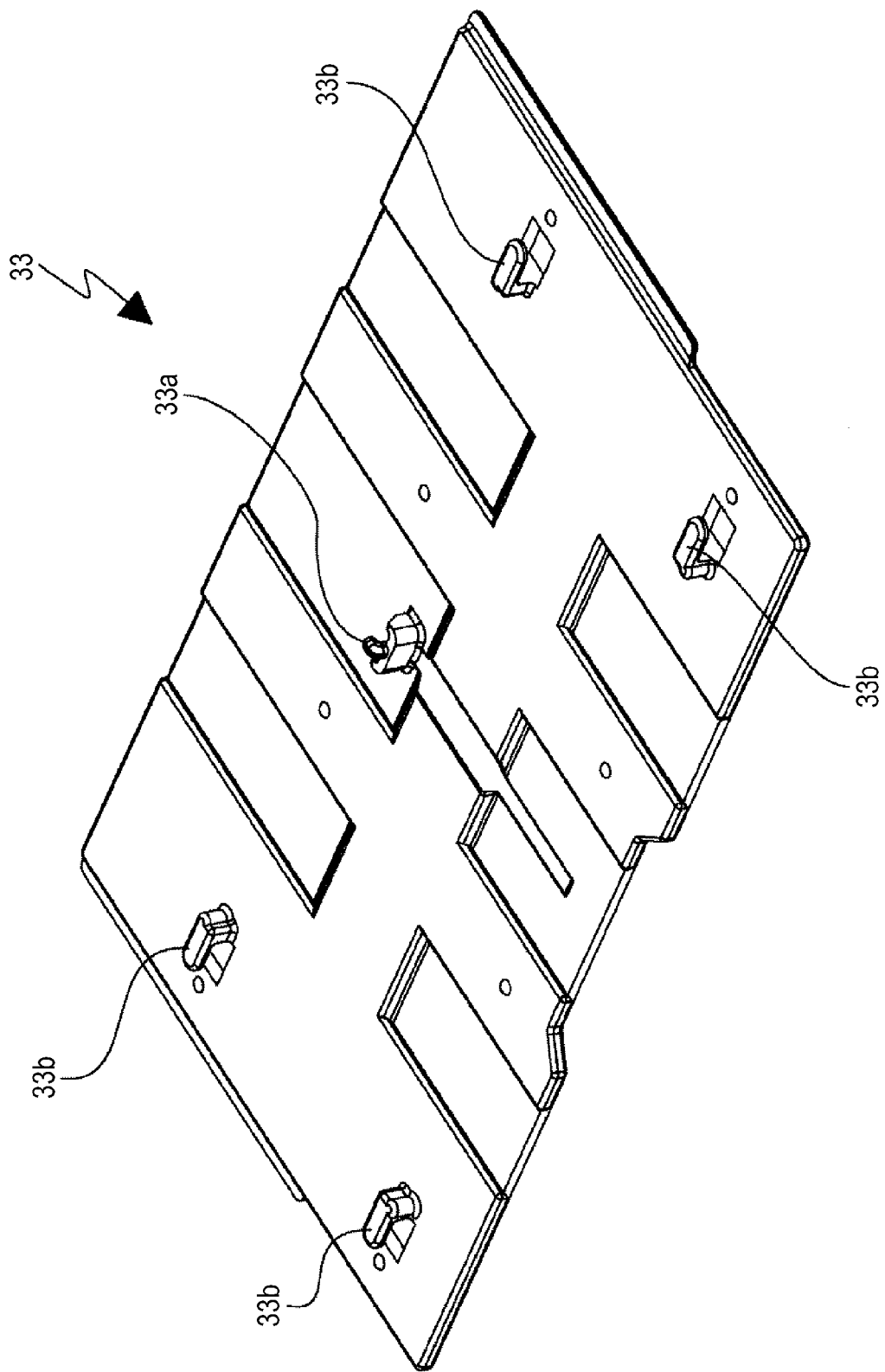
FIG. 17 is a perspective view of a slide plate.

In the slide plate 33, as illustrated in FIG. 17, a spring supporting protruded portion 33a is disposed in an approximately center portion of the upper face.

In the slide plate 33, support pieces 33b, 33b, . . . that protrude to the upper side are disposed on both left and right end portions so as to be separated from each other. The support pieces 33b, 33b, . . . are formed in a letter "L" when viewed from the forward and backward directions.

The slide plate 33 has the support pieces 33b, 33b, . . . supported by the support pieces 32d, 32d, . . . and is configured to be slidable in the forward and backward directions with respect to the connection plate 32.

Figure 18:
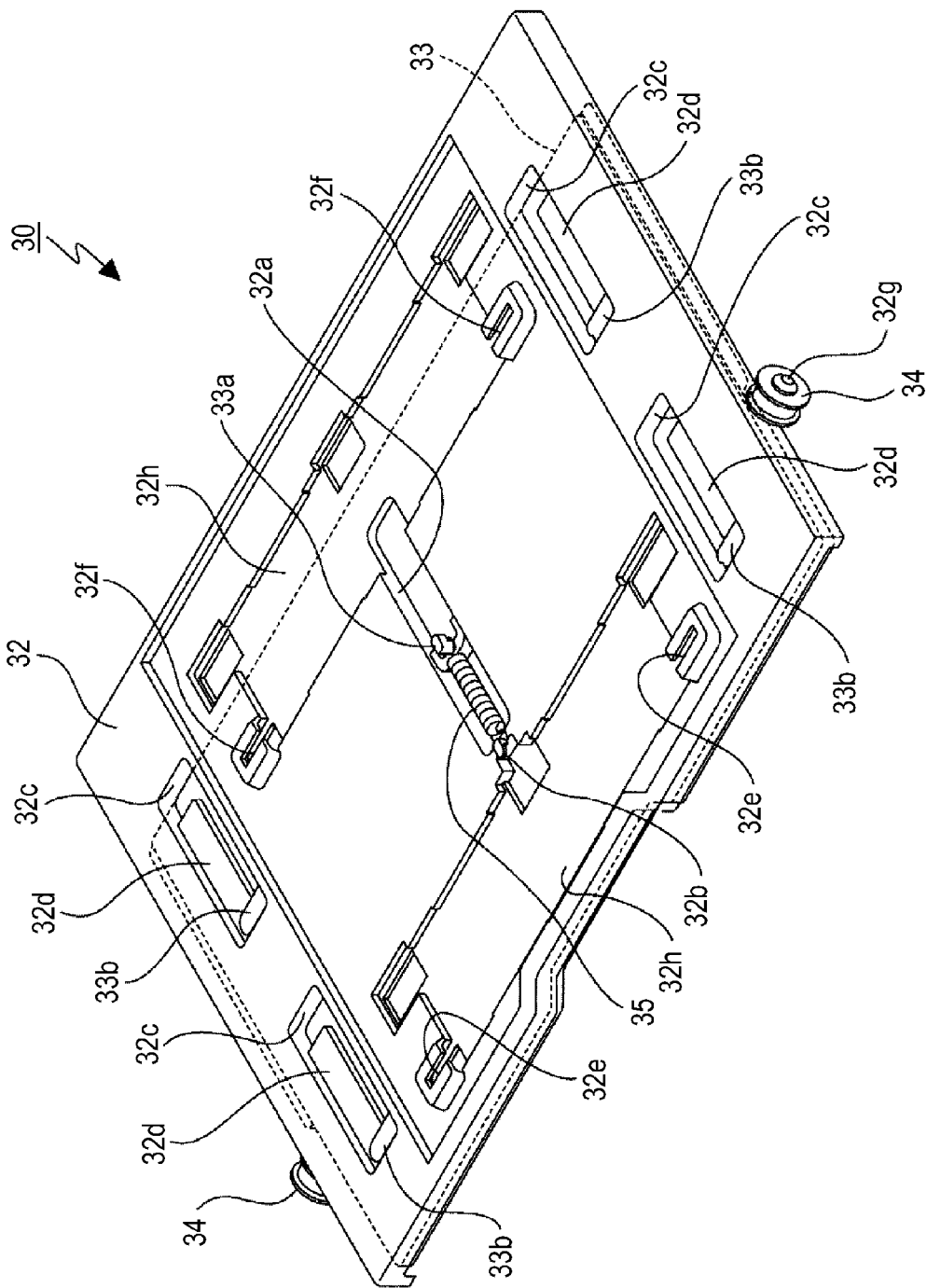
FIG. 18 is a perspective view of a pressing body.

Between the spring supporting protruded portion 33a of the slide plate 33 and the spring engaging protruded portion 32b of the connection plate 32, a spring member 35 is supported (see FIG. 18). The slide plate 33 is biased to the front side with respect to the connection plate 32 by the spring member 35. The spring member 35 is arranged in the spring arranging hole 32a that is formed in the connection plate 32.

The arm members 31 and 31 arranged on the front and rear sides so as to be separated from each other between the upper panel 6 and the connection plate 32. Here, the number of the arm members 31 is arbitrary, and one arm member or three or more arm members may be arranged.

Figure 19:
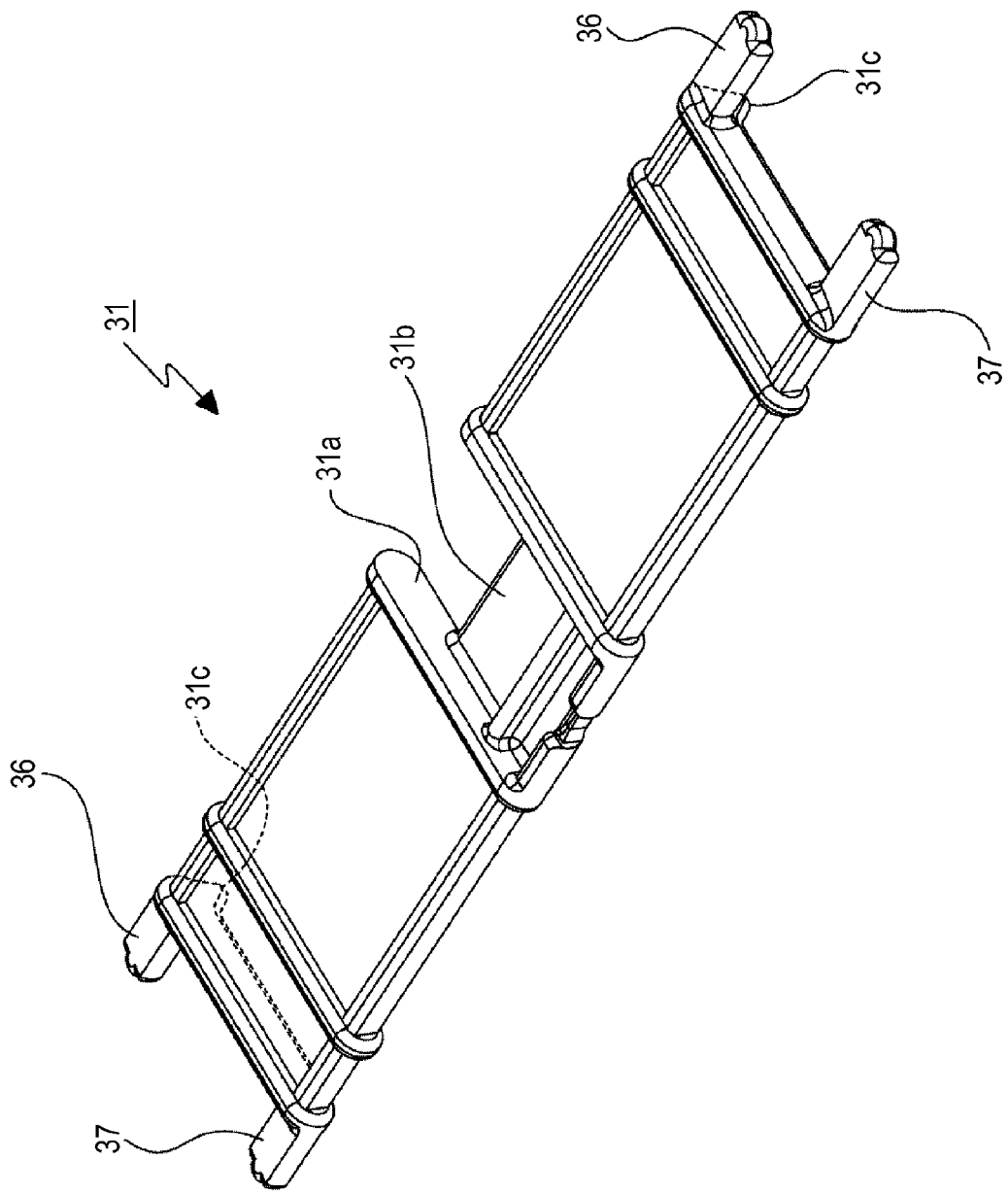
FIG. 19 is an enlarged perspective view of an arm member.

The arm member 31 is formed in a horizontally-long approximately rectangular shape, and, as illustrated in FIG. 19, includes a notch portion 31a that is open to the rear side in the center portion in the leftward and rightward directions. A center portion of the arm member 31 in the leftward and rightward directions is disposed as a spring receiving portion 31b.

In the rear end portion of both left and right end portions of the arm member 31, first connecting protruded portions 36 and 36 are disposed, and the first connecting protruded portions 36 and 36 protrudes to the outer side (lateral side). In addition, in the front end portion of both left and right end portions of the arm member 31, second connecting protruded portions 37 and 37 are disposed, and the second connecting protruded portions 37 and 37 protrude to the outer side (lateral side).

Figure 20:
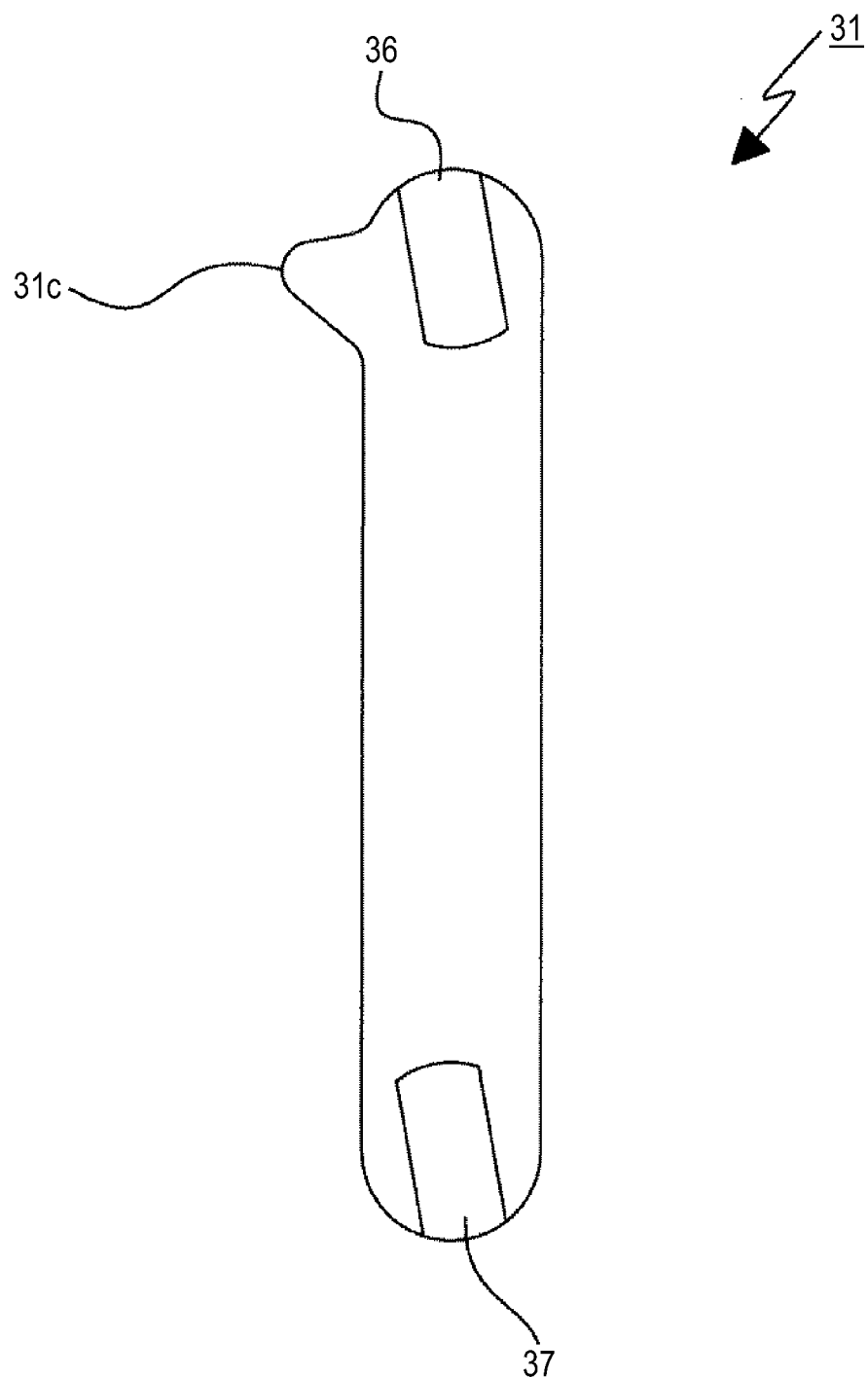
FIG. 20 is an enlarged side view of the arm member.

The first connecting protruded portions 36 and 36 and the second connecting protruded portions 37 and 37 are formed to have an approximately oval-shape horizontal cross-section (see FIG. 20). The first connecting protruded portions 36 and 36, as illustrated in FIG. 16 have thicknesses T1 and T1 that are slightly smaller than the widths A, A, . . . of the first connection grooves 15e and 15e and the second connection grooves 15f and 15f of the upper panel 6, and the widths H1 and H1 thereof are formed to be larger than the widths A, A, . . . and slightly smaller than the diameters B and B. In addition, the second connecting protruded portions 37 and 37 have thicknesses T2 and T2 that are slightly smaller than the widths C, C, . . . of the first connection grooves 32e and 32e and the second connection grooves 32f and 32f of the connection plate 32, and the widths H2 and H2 are formed to be larger than the widths C, C, . . . and slightly smaller than the diameters D and D.

The first connecting protruded portions 36 and 36 are formed so as to have mutually different lengths in the leftward and rightward directions, and the second connecting protruded portions 37 and 37 are formed so as to have mutually different lengths in the leftward and rightward directions.

In the arm members 31 and 31, protruded portions 31c and 31c for standing are disposed at positions near the first connecting protruded portions 36 and 36 (see FIGS. 19 and 20).

The first connecting protruded portions 36 and 36 of one arm member 31 are inserted into the first connection grooves 15e and 15e of the upper panel 6, and the second connecting protruded portions 37 and 37 thereof are inserted into the first connection grooves 32e and 32e of the connection plate 32, whereby they are assembled with the upper panel 6 and the connection plate 32. In addition, the first connecting protruded portions 36 and 36 of the other arm member 31 are inserted into the second connection grooves 15f and 15f of the upper panel 6, and the second connecting protruded portions 37 and 37 thereof are inserted into the second connection grooves 32f and 32f of the connection plate 32, whereby they are assembled with the upper panel 6 and the connection plate 32.

At this time, as described above, the length of the first connecting protruded portions 36 and 36 and the length of the second connecting protruded portions 37 and 37 in the leftward and rightward directions are formed to be different from each other, and the lengths of the first connection grooves 15e and 15e, the lengths of the second connection grooves 15f and 15f, the lengths of the first connection grooves 32e and 32e, and the lengths of the second connection grooves 32f and 32f in the leftward and rightward directions are formed to be different from each other. Accordingly, attachment directions of the arm members 31 and 31 with respect to the upper panel 6 and the connection plate 32 are mistaken, and the attachment of the arm members 31 and 31 to the upper panel 6 and the connection plate 32 can be performed easily and appropriately.

In addition, the widths H1, H1, . . . of the first connecting protruded portions 36, 36, . . . are formed to be larger than the widths A, A, . . . of the first connection grooves 15e and 15e and the second connection grooves 15f and 15f. Accordingly, the first connecting protruded portions 36 and 36 can be inserted into the first connection grooves 15e and 15e and the second connection grooves 15f and 15f only in a predetermined direction (see FIG. 21).

Figure 21:
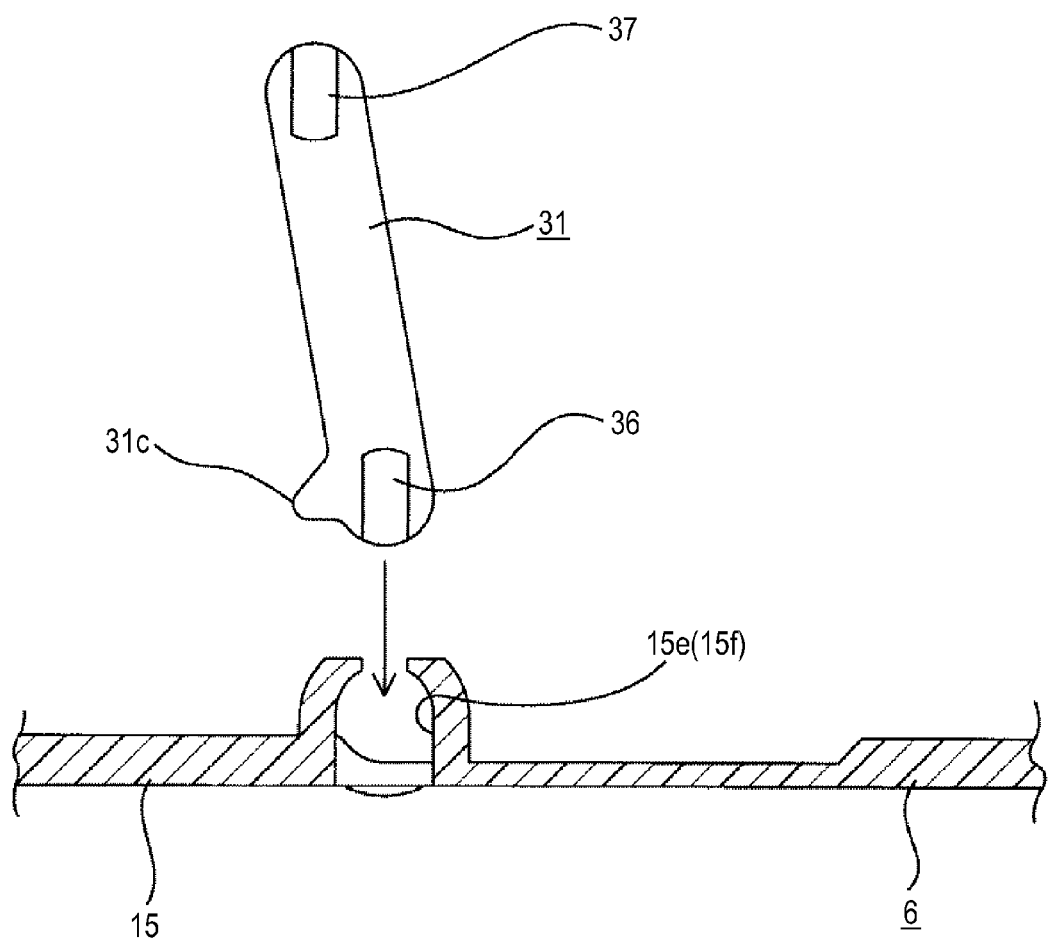
FIG. 21 is an enlarged side view illustrating a state when an arm member is inserted into a connection groove of the upper panel with a part thereof illustrated as a cross-section.

Furthermore, as illustrated in FIG. 21, the assembly of the arm members 31 and 31 into the upper panel 6 is performed in a state in which the upper panel 6 is vertically reversed, and the upper panel 6 is located on the lower side of the arm members 31 and 31.

Figure 22:
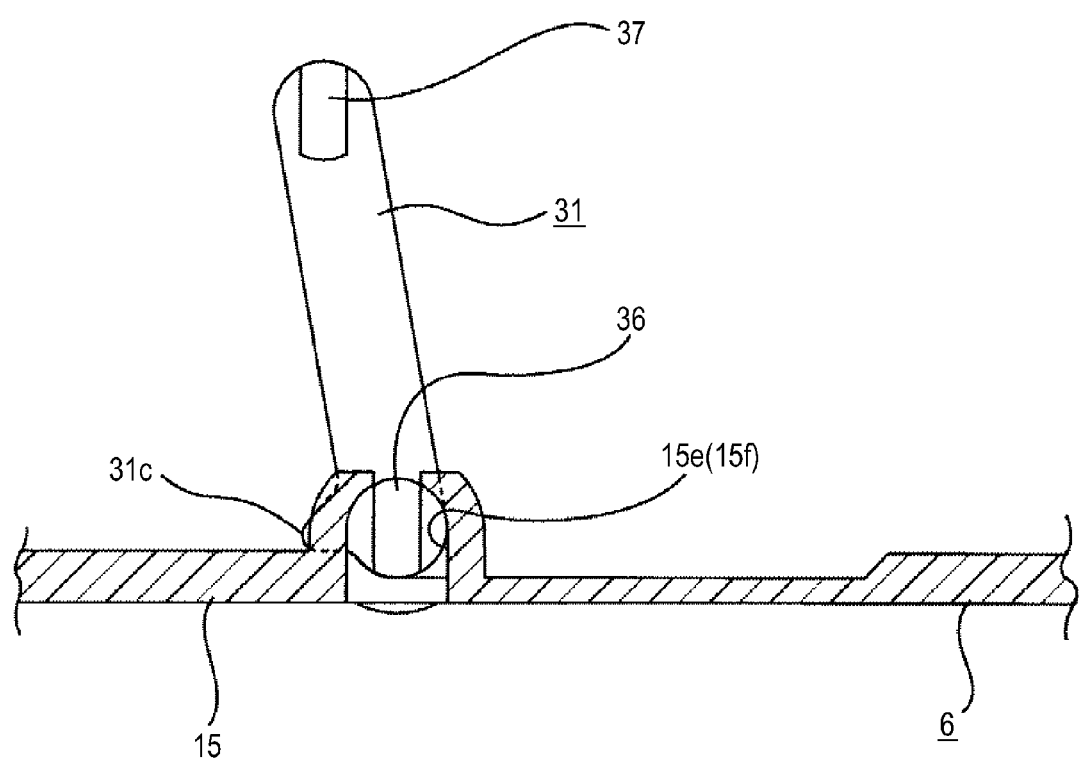
FIG. 22 is an enlarged side view illustrating a state in which the arm member is inserted into the connection groove of the upper panel with a part thereof illustrated as a cross-section.

When the first connecting protruded portions 36, 36, . . . of the arm members 31 and 31 are inserted into the first connection grooves 15e and 15e and the second connection grooves 15f and 15f, the arm members 31 and 31 are in the state of being slightly inclined with respect to the vertical direction, and the protruded portions 31c and 31c for standing are brought into contact with the lower face of the upper panel 6 so as to allow the arm members 31 and 31 to stand (see FIG. 22).

Accordingly, the operation of inserting the second connecting protruded portions 37, 37, . . . into the first connection grooves 32e and 32e and the second connection grooves 32f and 32f of the connection plate 32 can be performed in an easy manner.

At this time, the widths H2, H2, . . . of the second connecting protruded portions 37, 37, . . . are formed to be larger than the widths C, C, . . . of the first connection grooves 32e and 32e and the second connection grooves 32f and 32f. Accordingly, the second connecting protruded portions 37 and 37 can be inserted into the first connection grooves 32e and 32e and the second connection grooves 32f and 32f only in a predetermined direction (see FIG. 23).

Figure 23:
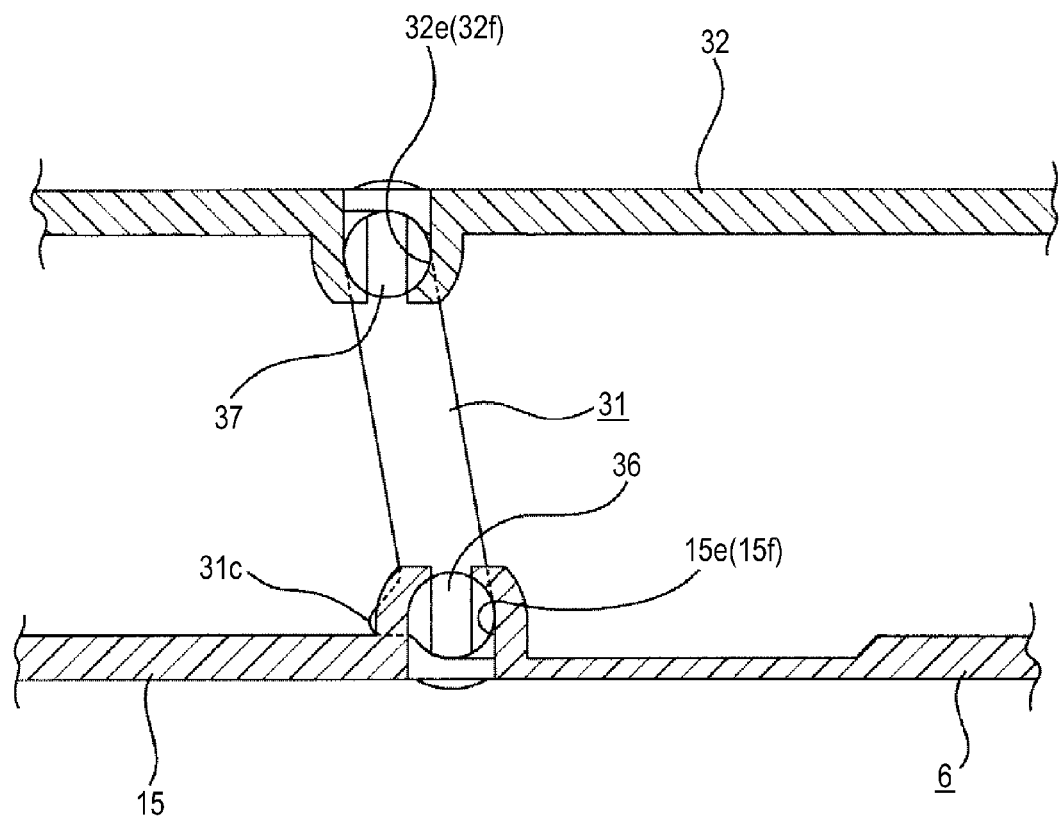
FIG. 23 is an enlarged side view illustrating a state in which the arm member is inserted into the connection groove of the upper panel and a connection groove of the connection plate with a part thereof illustrated as a cross-section.

Furthermore, as illustrated in FIG. 23, the assembly of the arm members 31 and 31 into the connection plate 32 is performed in a state in which the connection plate is vertically reversed, and the connection plate 32 is located on the upper side of the arm members 31 and 31.

Figure 24:
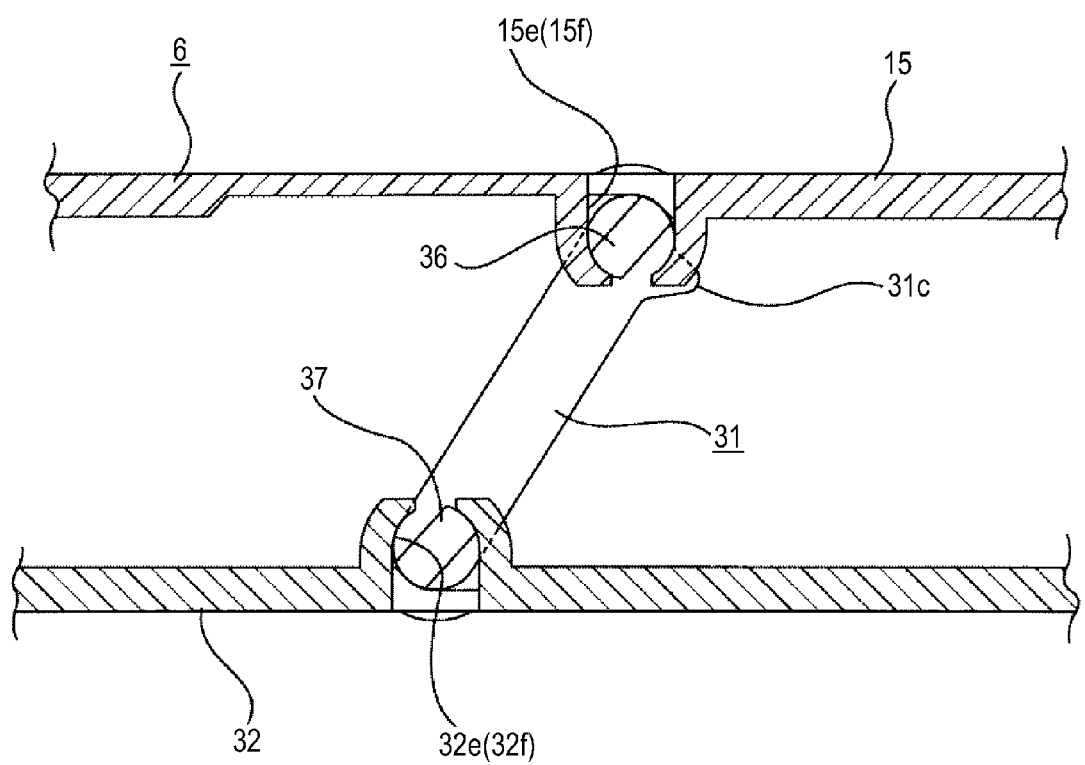
FIG. 24 is an enlarged side view illustrating a state in which the arm member is rotated with respect to the upper panel and the connection plate with a part thereof illustrated as a cross-section.

In the state in which the upper panel 6 and the connection plate 32 are connected to each other through the arm members 31 and 31, the arm members 31 and 31 are rotated in a predetermined angle range. In other words, the arm members 31 and 31 are rotated in an inclining angle range θ (see FIG. 24) that is smaller than the angle at the time of being assembled into the upper panel 6 and the connection plate 32. In the range θ, the thickness T1, T1, . . . of the first connecting protruded portions 36, 36, . . . do not coincide with the widths A, A, . . . of the first connection grooves 15e and 15e and the second connection grooves 15f and 15f, and the thickness T2, T2, . . . of the second connecting protruded portions 37, 37, . . . do not coincide with the widths C, C, . . . of the first connection grooves 32e and 32e and the second connection grooves 32f and 32f. Accordingly, the arm members 31 and 31 are not dropped out of the upper panel 6 or the connection plate 32, and the operation of the in-vehicle audio apparatus 1 can be appropriately performed.

In the state in which the upper panel 6 and the connection plate 32 are connected to each other through the arm members 31 and 31, bias springs 38 and 38 are supported between the upper panel 6 and the arm members 31 and 31. Here, the number of the bias springs 38 is arbitrary, and one bias spring may be supported between the upper panel 6 and one arm member 31, or three or more bias springs may be disposed in a case where three or more arm members 31 are arranged.

The bias springs 38 and 38, for example, are torsion coil springs, coil parts 38a and 38a are supported by the first spring supporting shafts 15c and 15d of the upper panel 6, one end portions 38b and 38b are engaged with the lower face of the upper panel 6, and the other end portions 38b and 38b are engaged with the spring receiving portions 31b and 31b of the arm members 31 and 31.

Accordingly, a biasing force is applied to the arm members 31 and 31 by the bias springs 38 and 38 in a rotation direction for moving the front end portions to the approximately lower side, and the pressing body 30 is biased to be moved to the lower side of the upper panel 6 through the arm members 31 and 31.

One bias spring 38, in the state of being supported between the upper panel 6 and the arm member 31, is arranged at the first spring arranging hole 15a of the upper panel 6 and the notch portion 31a of the arm member 31. The other bias spring 38, in the state of being supported between the upper panel 6 and the arm member 31, is arranged at the second spring arranging hole 15b of the upper panel 6 and the notch portion 31a of the arm member 31.

Inside the in-vehicle audio apparatus 1 configured as described above, a music reproducing device 100 is housed. The music reproducing device 100 is inserted into the storage tray 22 or is taken out from the storage tray 22 in the state in which the storage tray 22 is positioned at the drawing-out position (see FIG. 2). The insertion of the music reproducing device 100 into the storage tray 22 is performed in a state in which a connector 101 is connected to the music reproducing device 100 (see FIG. 3).

When the music reproducing device 100 is inserted into the storage tray 22, and the storage tray 22 is moved up to the storing position, music recorded by the music reproducing device 100 can be reproduced so as to be output from a speaker or the like that is arranged inside the vehicle.

In addition, in a state in which the music reproducing device 100 is housed inside the in-vehicle audio apparatus 1, it may be configured such that, when the engine of the vehicle is stopped, light is emitted from a light emitting unit, which is not illustrated in the figure, disposed in the operation panel 21 as warning light, and a sound is output from a sound output unit, which is not illustrated in the figure, as a warning sound. Based on the emission of the warning light and the output of the warning sound, the music reproducing device 100 can be prevented from being forgotten to be taken out from the inside of the in-vehicle audio apparatus 1.

[Operation of In-Vehicle Audio Apparatus]

Hereinafter, the operation of the in-vehicle audio apparatus 1 performed when the storage tray 22 is moved will be described (see FIGS. 25 to 48). The storage tray 22 is moved between the drawing-out position (see FIGS. 2 and 3) located at a front-side moving end and the storing position (see FIG. 1) located at a rear-side moving end.

Figure 25:
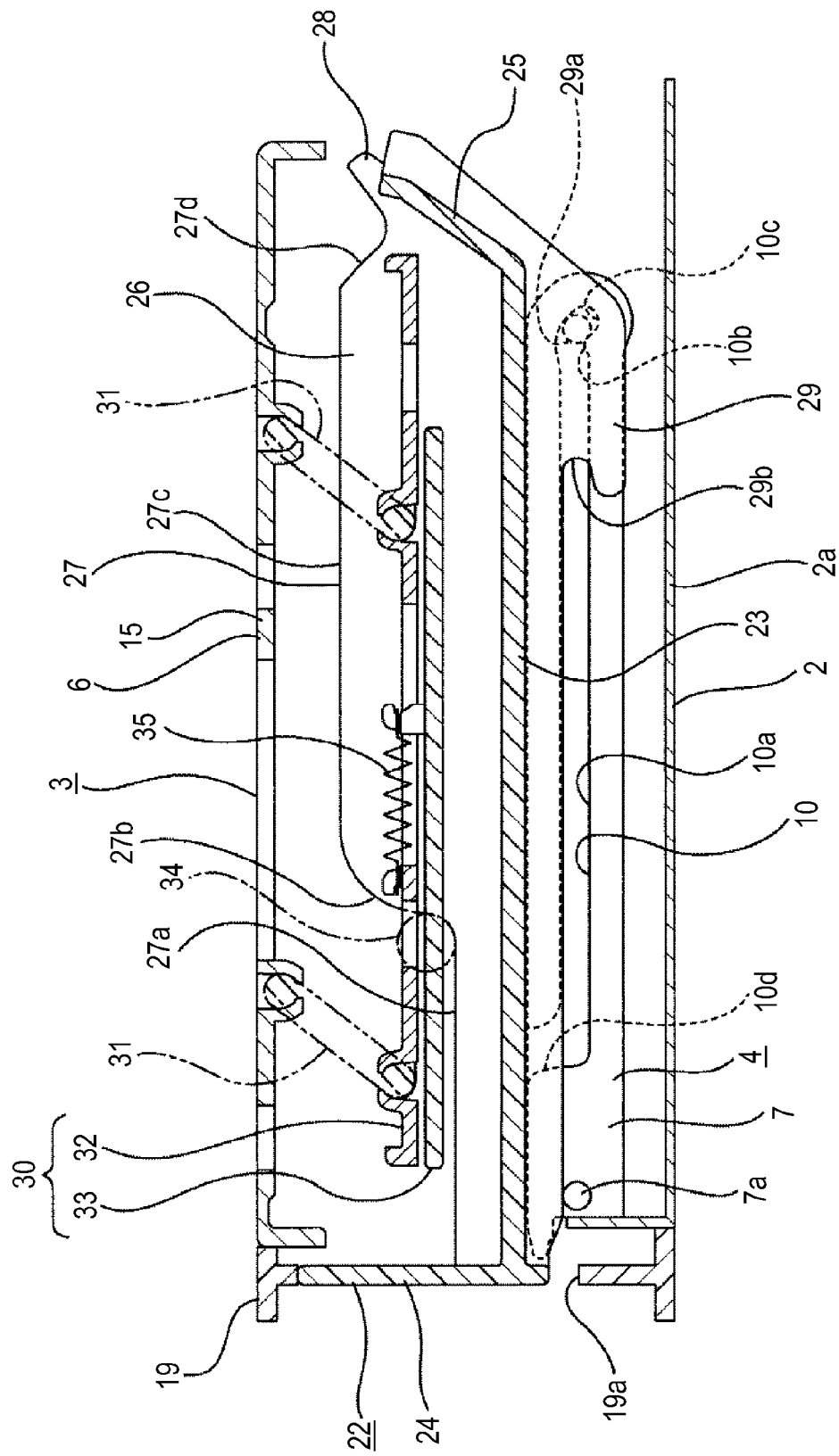
FIG. 25 illustrates an operation of the in-vehicle audio apparatus when the storage tray is moved together with FIGS. 26 to 48 and is a side view illustrating a state in which the storage tray is located at the storing position with a part thereof illustrated as a cross-section.
Figure 26:
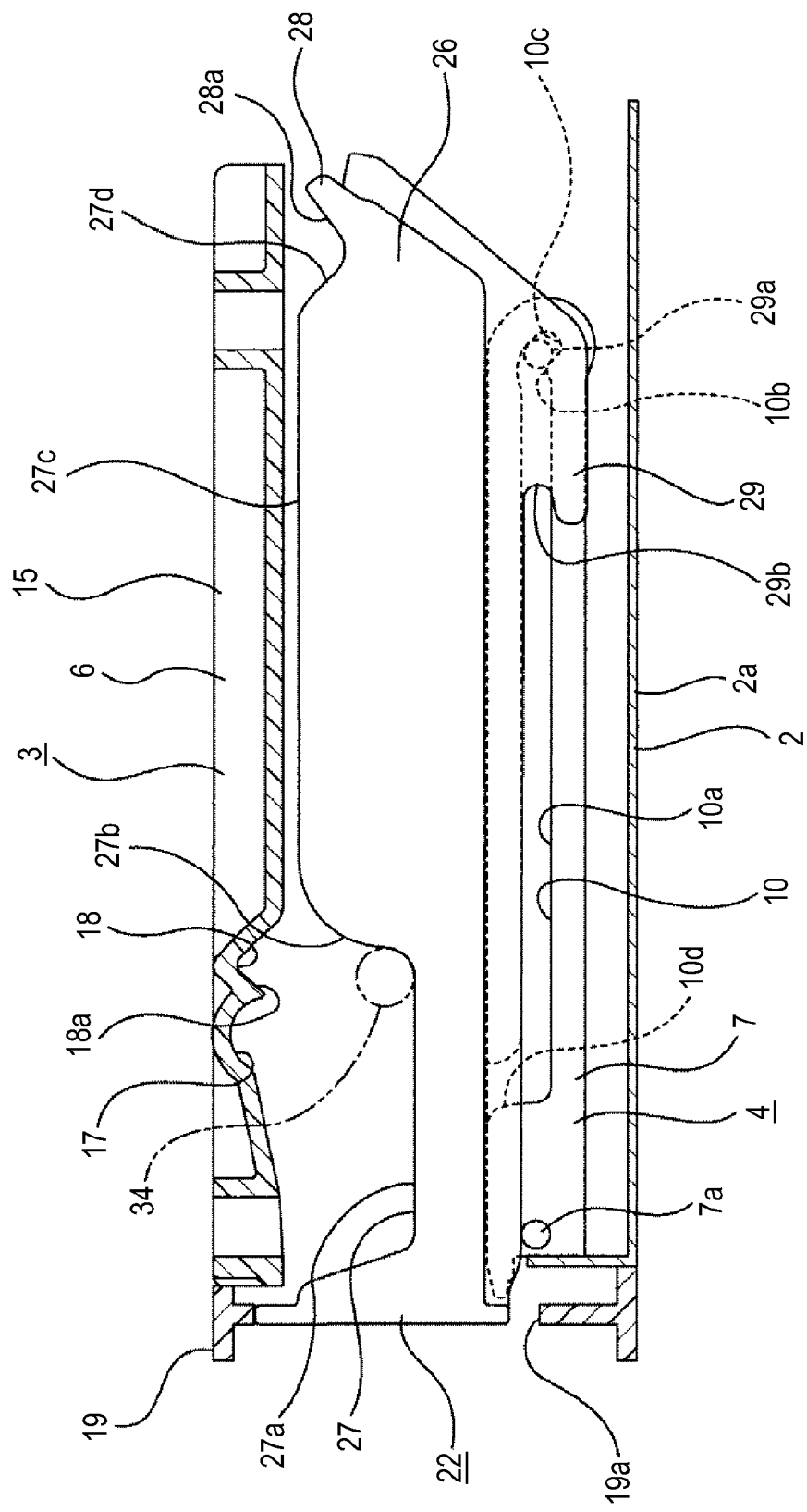
FIG. 26 is a side view illustrating a state in which the storage tray is located at the storing position.

First, a state in which the storage tray 22 is located at the storing position will be described (see FIGS. 25 and 26).

When the storage tray 22 is located at the storing position, the guide pins 29a and 29a of the storage tray 22 are engaged with the holding portion 10c of the guide groove 10 of the guide rail 4 and the holding portion 14c of the guide groove 14 of the guide rail 5. At this time, the opening 19a of the front panel 19 is blocked by the front face portion 24 of the storage tray 22.

At the storing position, the rollers 34 and 34 supported by the connection plate 32 are engaged with the rear end portions of the descending portions 27a and 27a of the sliding cam portions 27 and 27 of the storage tray 22. Accordingly, the arm members 31 and 31 has the largest rotation angle with respect to the upper panel 6 and the connection plate 32 and is maintained at the moving end located on the lower side of the pressing body 30. At this time, the slide plate 33 is maintained at the moving end located on the front side by the biasing force of the spring member 35.

Figure 27:
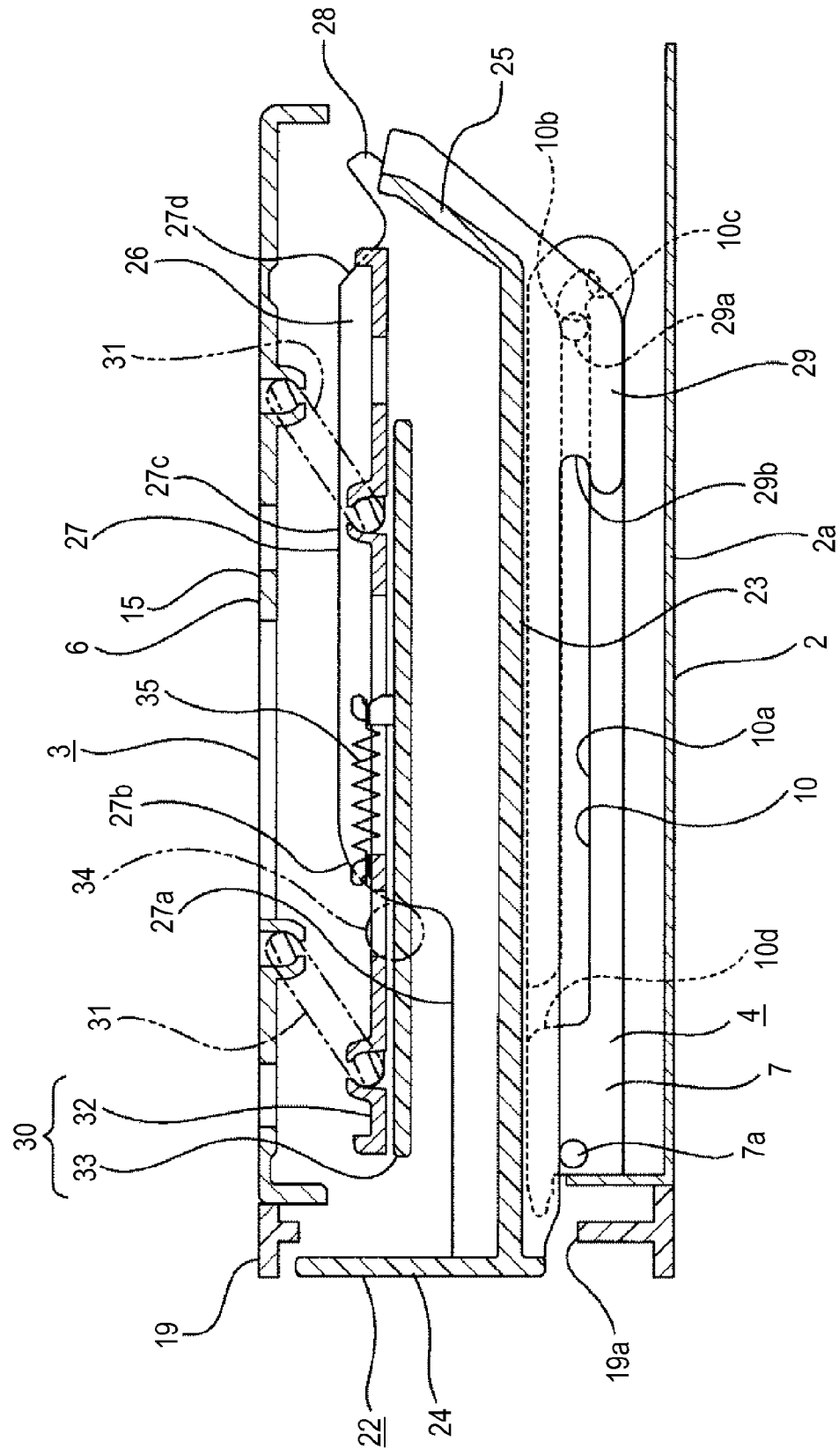
FIG. 27 is a side view illustrating a state immediately after the storage tray is moved from the storing position toward a drawing-out position with a part thereof illustrated as a cross-section.
Figure 28:
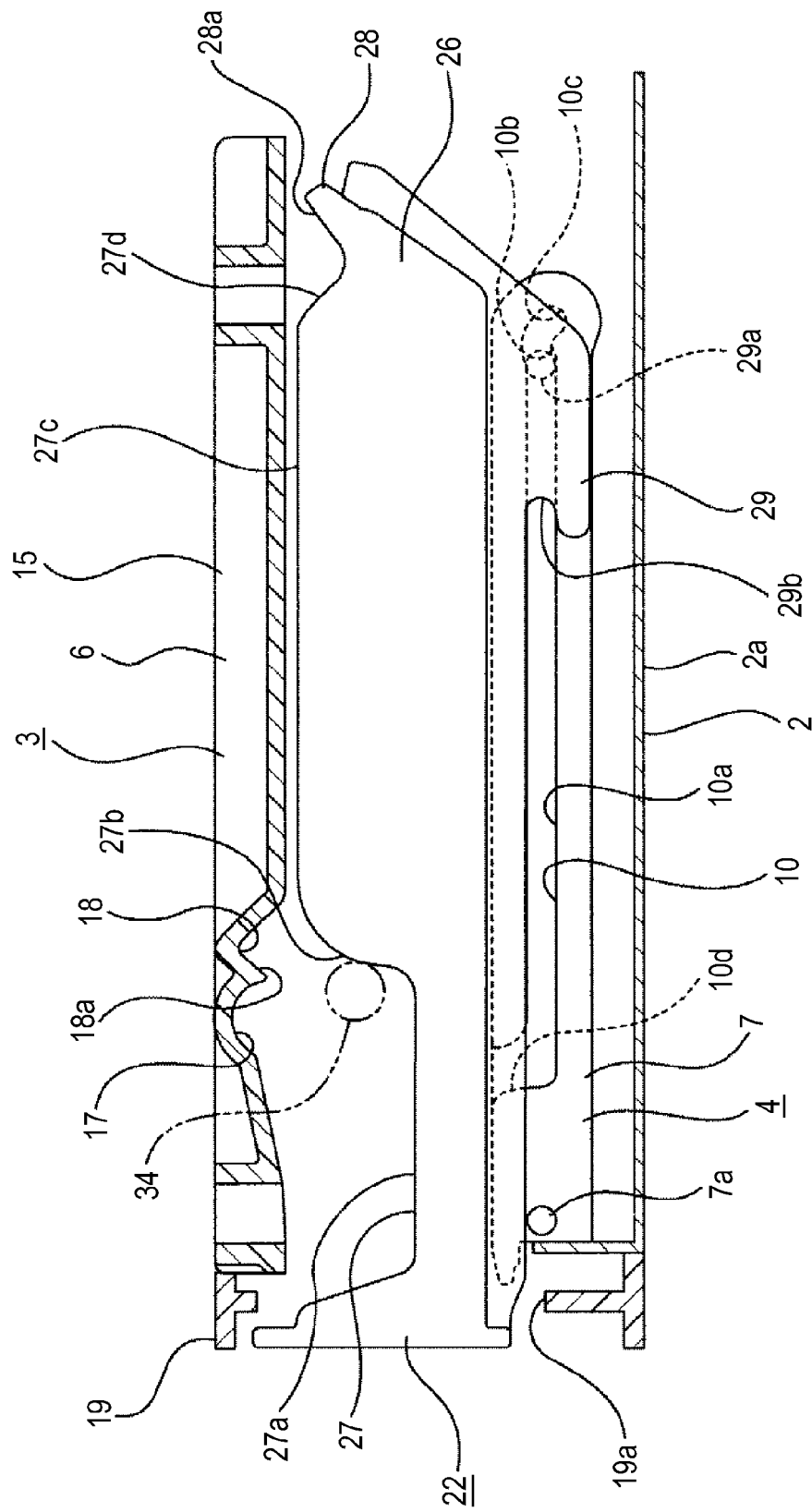
FIG. 28 is a side view illustrating a state immediately after the storage tray is moved from the storing position toward the drawing-out position.

As the storage tray 22 is drawn out from the base body 3 and is moved toward the drawing-out position, the moving operation is started (see FIGS. 27 and 28).

In addition, the drawing-out of the storage tray 22 is performed by taking out the operation panel 21, for example, from the front panel 19 and gripping the gripping concave portion 24a formed in the front face portion 24. As above, since the gripping concave portion 24a is formed in the storage tray 22, the drawing-out of the storage tray 22 can be performed in an easy manner.

When the storage tray 22 is moved, the guide pins 29a and 29a pass the displacement portions 10b and 14b from the holding portions 10c and 14c of the guide grooves 10 and 14 and are engaged with the guiding portions 10a and 14a. At this time, since the guide pins 29a and 29a are engaged with the displacement portions 10b and 14b that are inclined with respect to the guiding portions 10a and 14a once, the feeling of the drawing-out of the storage tray 22 is delivered to a user's hand as a clicking feeling.

As the storage tray 22 is moved to the front side, the rollers 34 and 34 are rotated and are engaged with the ascending portions 27b and 27b from the descending portions 27a and 27a of the sliding cam portion 27. At this time, the rollers 34 and 34 are rotated with being pressed by the sliding cam portions 27 and 27 in accordance with the biasing forces of the bias springs 38 and 38 that are given through the connection plate 32.

Since the rollers 34 and 34 are engaged with the elevation portions 27b and 27b from the descending portions 27a and 27a, the pressing body 30 is moved to the upper side in resistance against the biasing forces of the bias springs 38 and 38, and the arm members 31 and 31 are rotated. At this time, since the pressing body 30 is moved in accompaniment with the rotation operations of the arm members 31 and 31, the pressing body 30 is moved to the upper side while being move to the front side to some extent.

Figure 29:
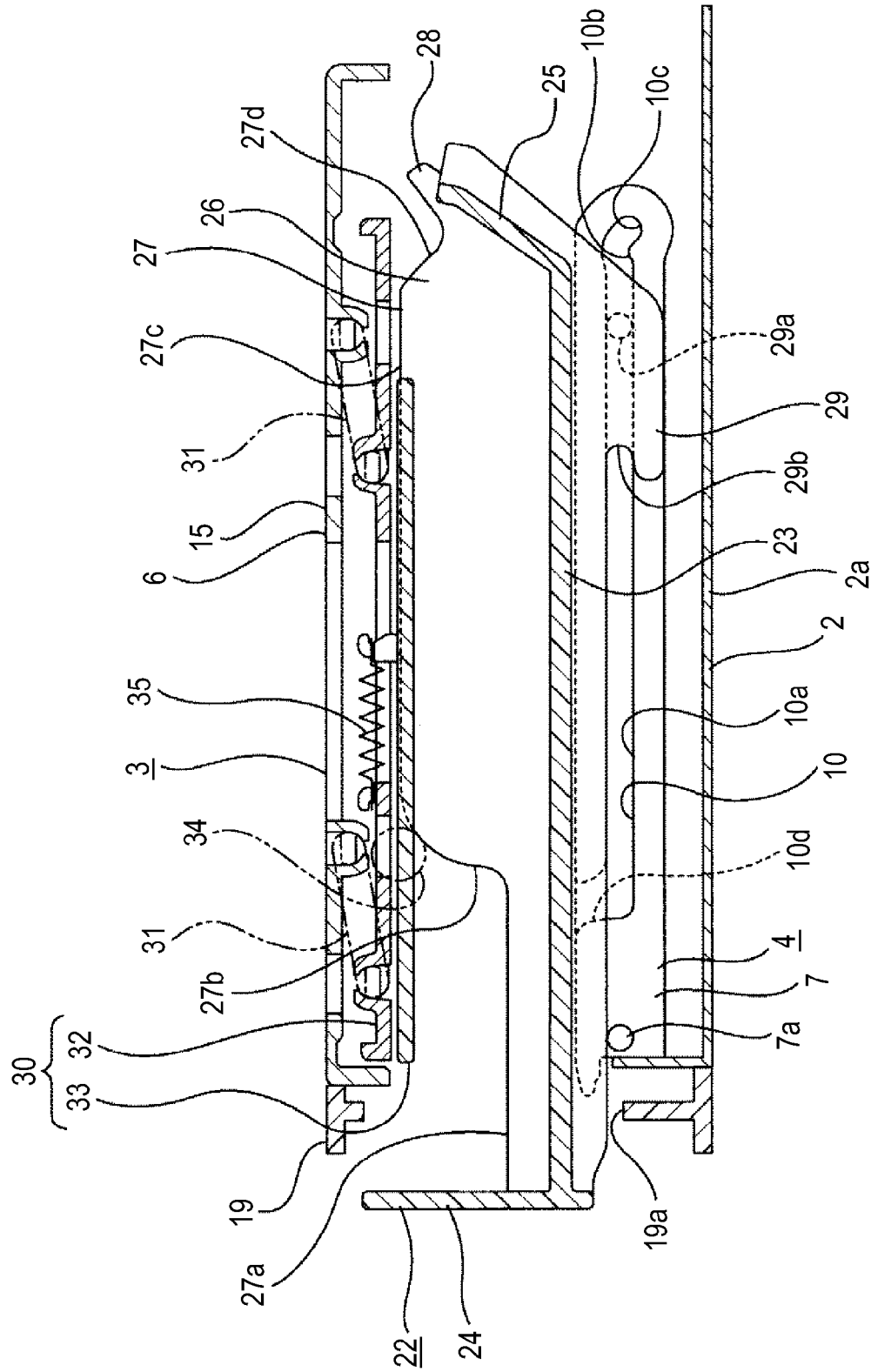
FIG. 29 is a side view illustrating a state in which the storage tray is subsequently moved toward the drawing-out position after the states illustrated in FIGS. 27 and 28 with a part thereof illustrated as a cross-section.
Figure 30:
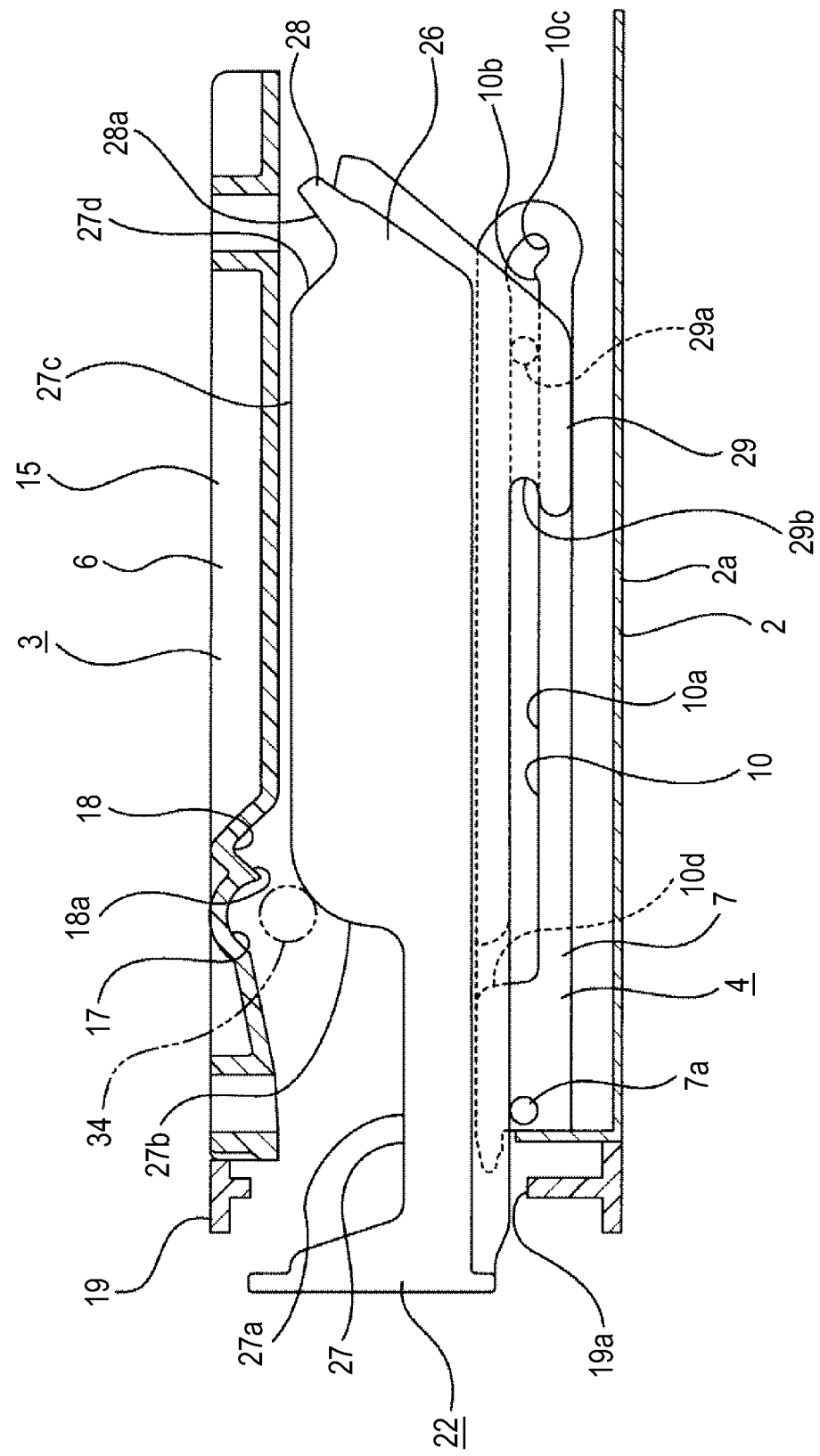
FIG. 30 is a side view illustrating a state in which the storage tray is subsequently moved toward the drawing-out position after the states illustrated in FIGS. 27 and 28.

When the storage tray 22 is further drawn out and moved to the front side, the rollers 34 and 34 are engaged with the upper end portions of the ascending portions 27b and 27b of the sliding cam portions 27 and 27 (see FIGS. 29 and 30). At this time, the guide pins 29a and 29a of the storage tray 22 are moved while facing the guiding portions 10a and 14a on the front side.

Since the roller 34 and 34 are engaged with the upper end portions of the ascending portions 27b and 27b, the pressing body 30 is moved further to the upper side in resistance against the biasing forces of the bias springs 38 and 38, and the arm members 31 and 31 are further rotated.

Figure 31:
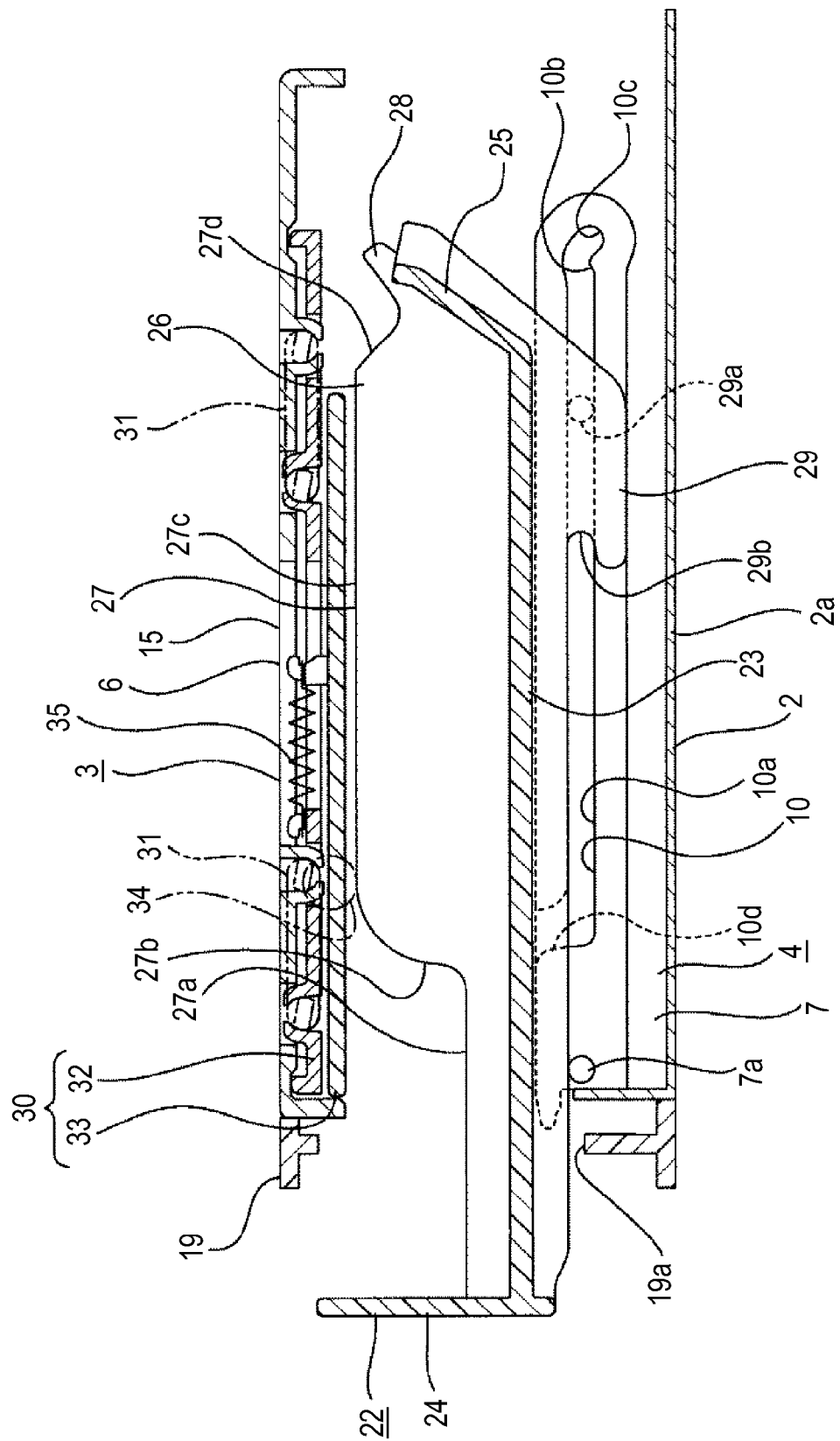
FIG. 31 is a side view illustrating a state in which the storage tray is subsequently moved toward the drawing-out position after the states illustrated in FIGS. 29 and 30, with a part thereof illustrated as a cross-section.
Figure 32:
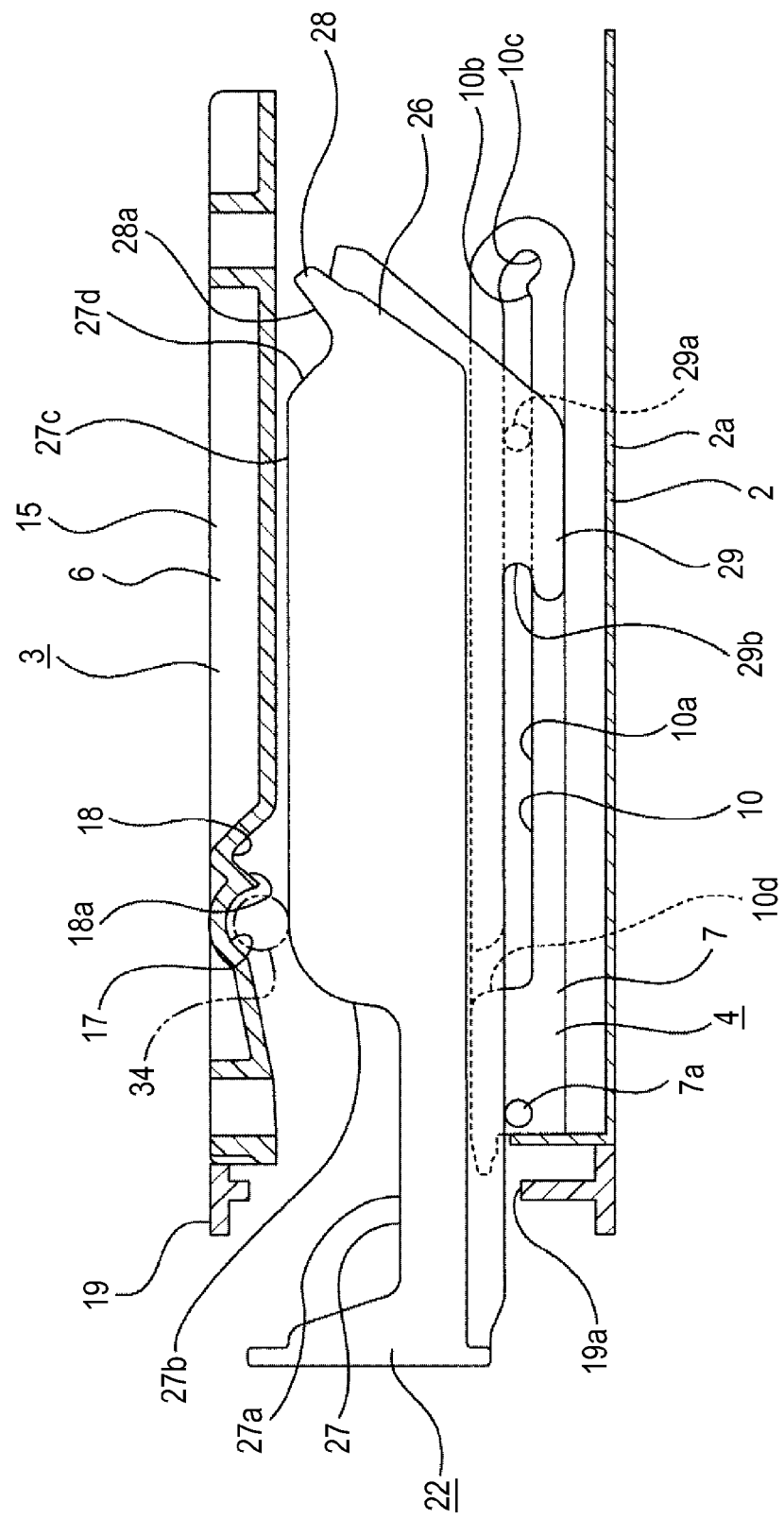
FIG. 32 is a side view illustrating a state in which the storage tray is subsequently moved toward the drawing-out position, and a pressing body is moved to an upper-side moving end after the states illustrated in FIGS. 29 and 30.

Subsequently, when the storage tray 22 is drawn out and moved to the front side, the rollers 34 and 34 are engaged with the front end portions of the elevation portions 27c and 27c from the ascending portions 27b and 27b of the sliding cam portions 27 and 27 (see FIGS. 31 and 32). At this time, the guide pins 29a and 29a of the storage tray 22 are moved while facing the guiding portions 10a and 14a on the front side.

Since the rollers 34 and 34 are engaged with the front end portions of the elevation portions 27c and 27c, the pressing body 30 is moved further to the upper side in resistance against the biasing forces of the bias springs 38 and 38 so as to arrive at the moving end located on the upper side, and the arm members 31 and 31 are rotated to be in an approximately horizontal state. At this time, the rollers 34 and 34 are inserted into and held by the insertion grooves 17 and 17 that are formed in the upper panel 6.

As the pressing body 30 is moved to the moving end located on the upper side, the rotation operations of the arm member 31 and 31 are stopped, and parts of the arm members 31 and 31 are inserted into the groove portions 15h and 15h formed in the upper panel 6 and the groove portions 32h and 32h formed in the connection plate 32. Accordingly, the arm members 31 and 31 do not interfere with the upper panel 6 and the connection plate 32, and the thickness of the in-vehicle audio apparatus 1 is decreased as that much.

Figure 33:
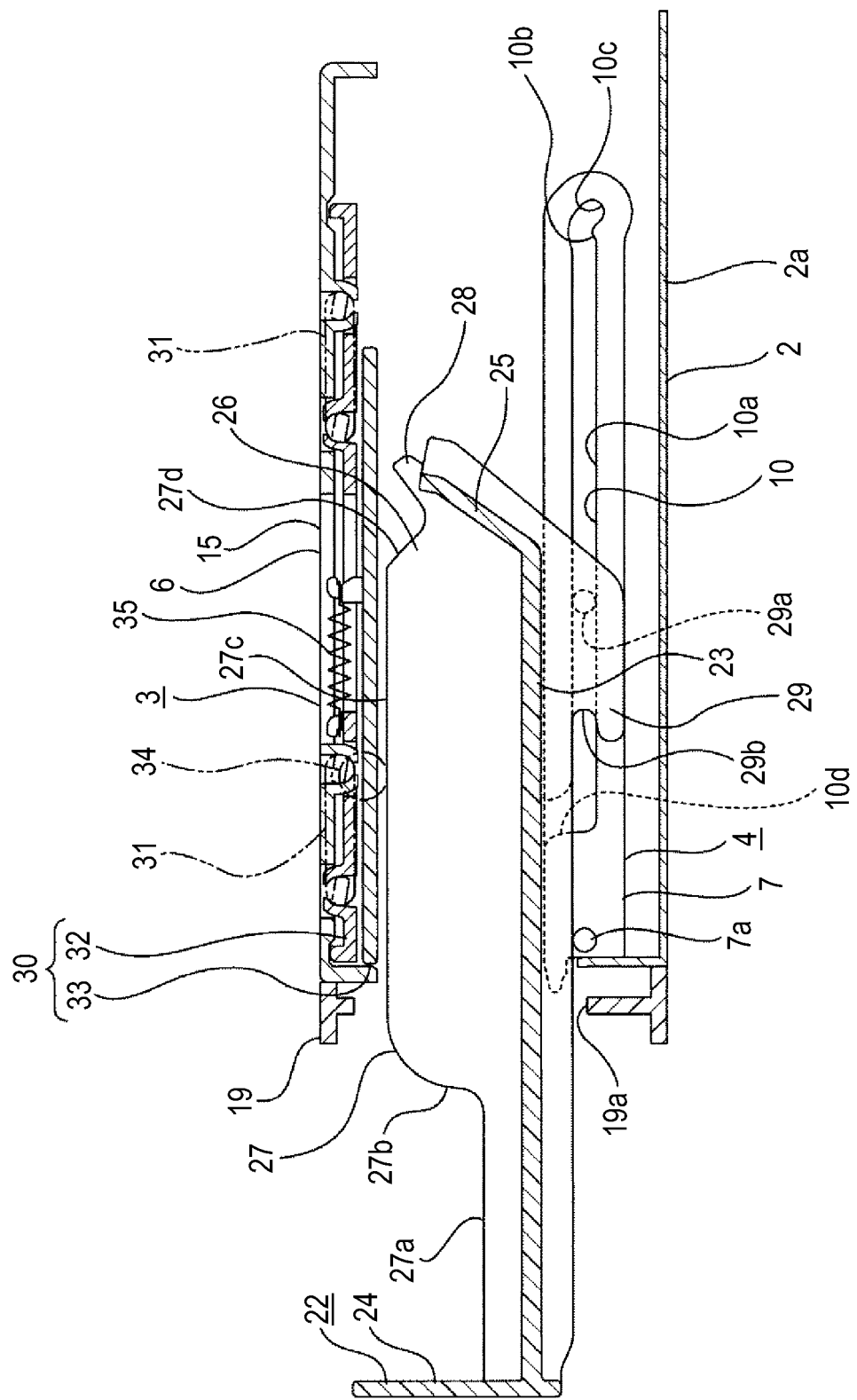
FIG. 33 is a side view illustrating a state in which the storage tray is subsequently moved toward the drawing-out position after the states illustrated in FIGS. 31 and 32, with a part thereof illustrated as a cross-section.
Figure 34:
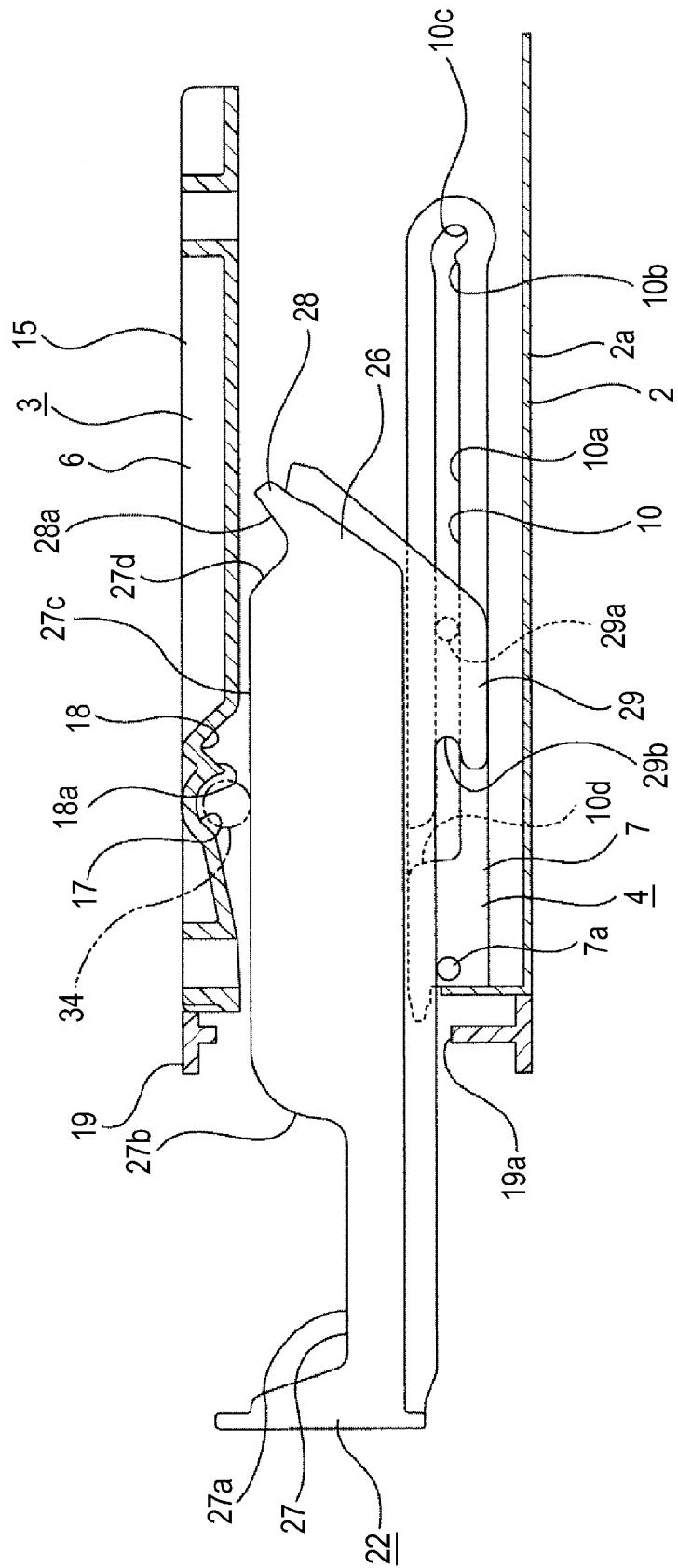
FIG. 34 is a side view illustrating a state in which the storage tray is subsequently moved toward the drawing-out position after the states illustrated in FIGS. 31 and 32.

When the storage tray 22 is further drawn out and moved to the front side, the rollers 34 and 34 are engaged with the center portions of the elevation portions 27c and 27c of the sliding cam portions 27 and 27 in the forward and backward directions (see FIGS. 33 and 34). At this time, the guide pins 29a and 29a of the storage tray 22 are moved while facing the guiding portions 10a and 14a on the front side.

Since the rollers 34 and 34 are engaged with the elevation portions 27c and 27c, the pressing body 30 is maintained at the upper-side moving end.

Figure 35:
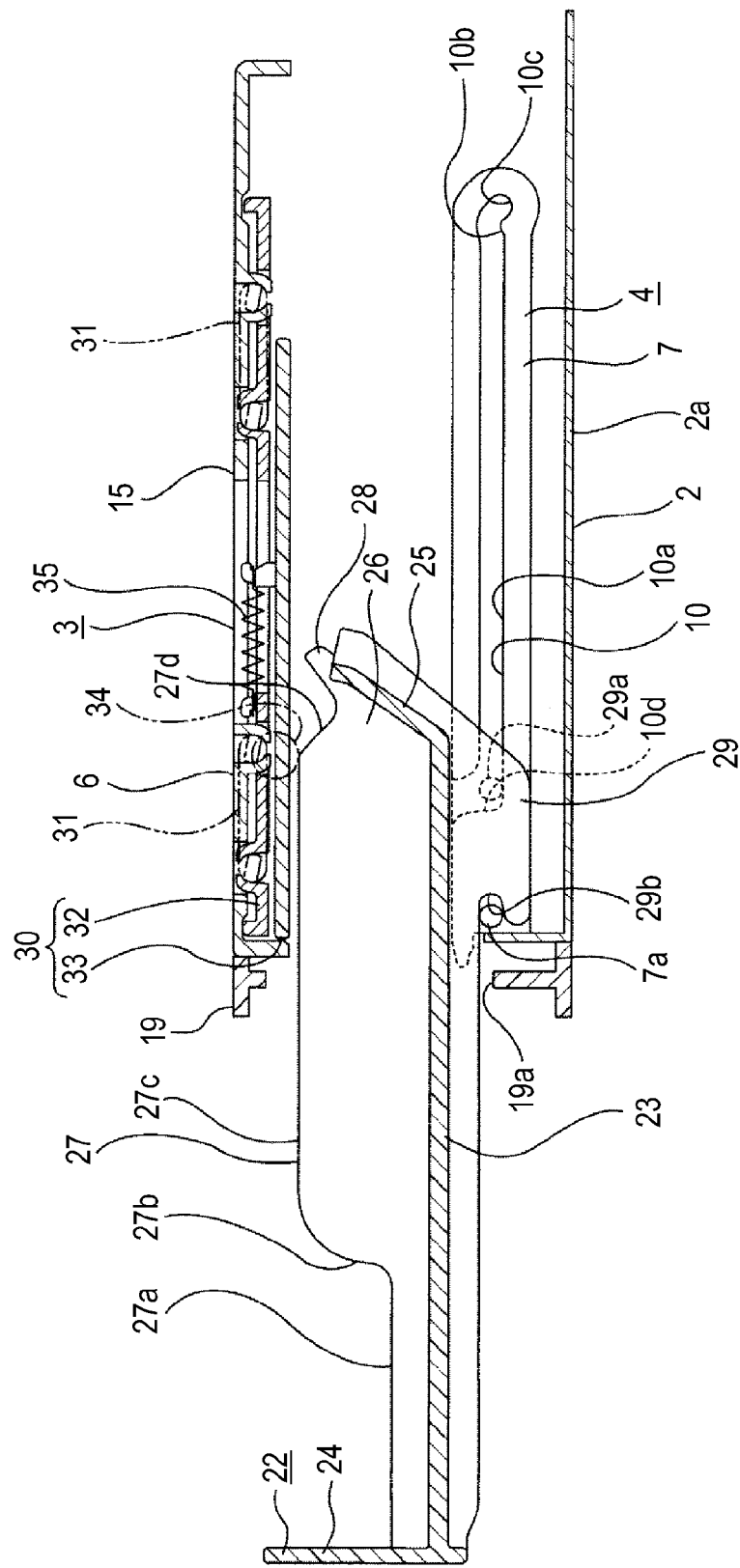
FIG. 35 is a side view illustrating a state in which the storage tray is subsequently moved toward the drawing-out position after the states illustrated in FIGS. 33 and 34, with a part thereof illustrated as a cross-section.
Figure 36:
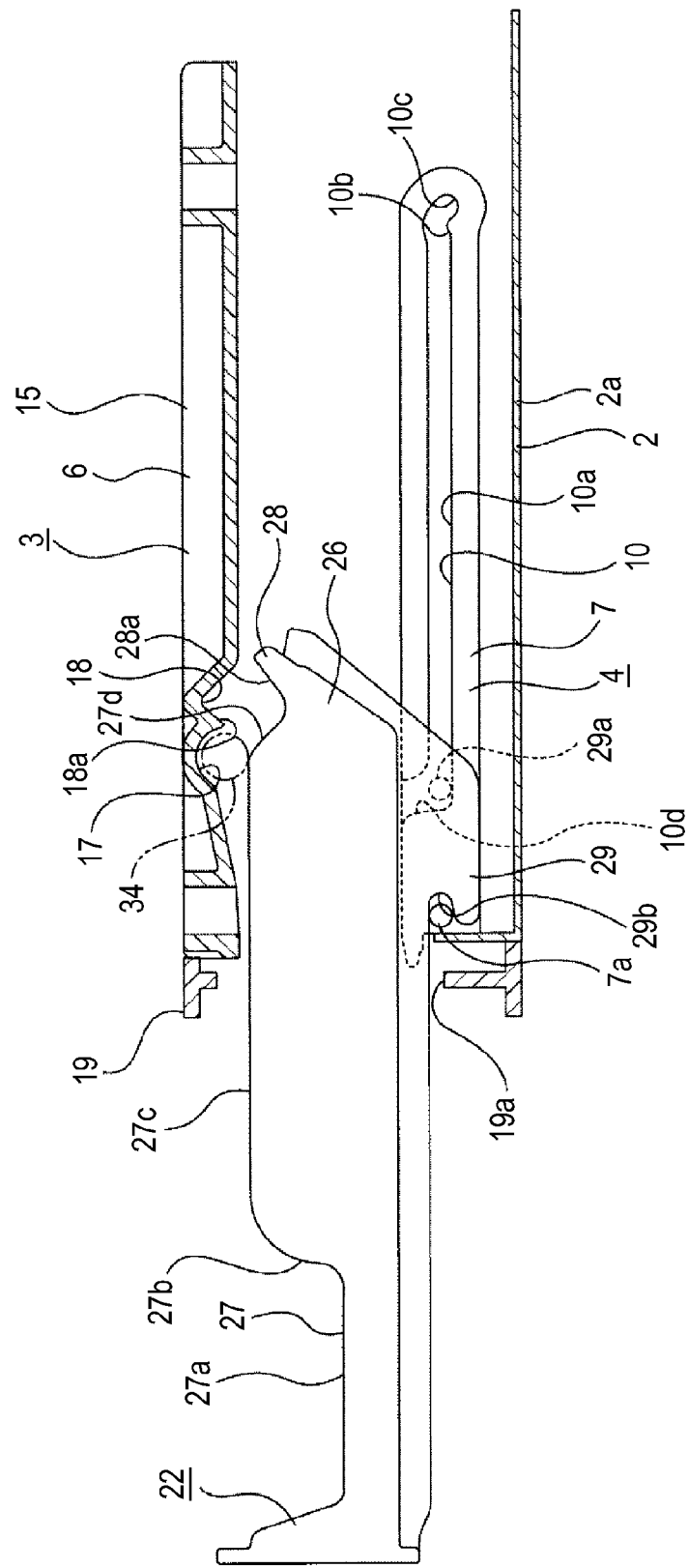
FIG. 36 is a side view illustrating a state in which the storage tray is subsequently moved toward the drawing-out position after the states illustrated in FIGS. 33 and 34.

When the storage tray 22 is further drawn out and moved to the front side, the rollers 34 and 34 are engaged with the rear end portions of the elevation portions 27c and 27c of the sliding cam portions 27 and 27 (see FIGS. 35 and 36). At this time, the guide pins 29a and 29a of the storage tray 22 are moved so as to face the guiding portions 10a and 14a on the front side so as to arrive at the front end portions of the guiding portions 10a and 14a, and the regulating shafts 7a and 11a disposed in the guide rails 4 and are inserted into the regulation grooves 29b and 29b. Accordingly, the movement of the storage tray 22 to the front side is regulated by the regulating shafts 7a and 11.

Figure 37:
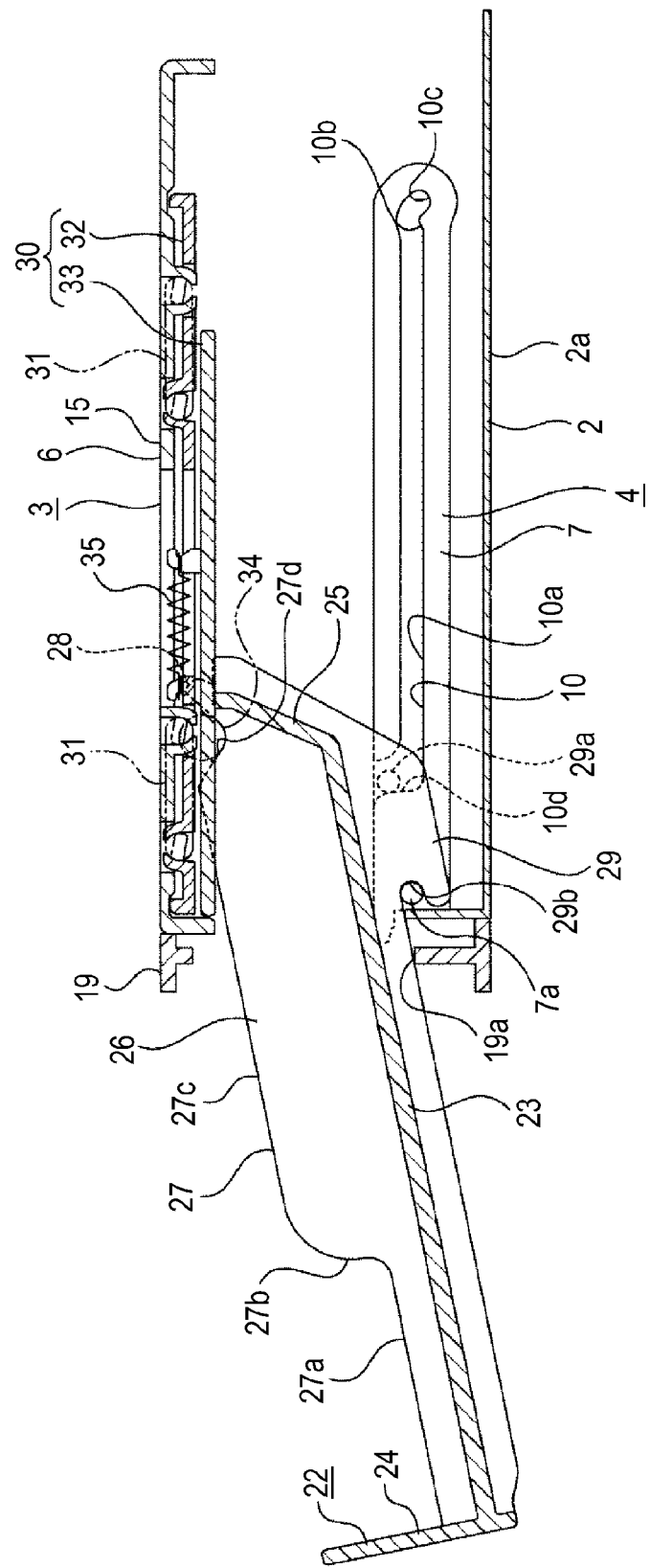
FIG. 37 is a side view illustrating a state in which the storage tray is moved up to the drawing-out position, with a part thereof illustrated as a cross-section.
Figure 38:
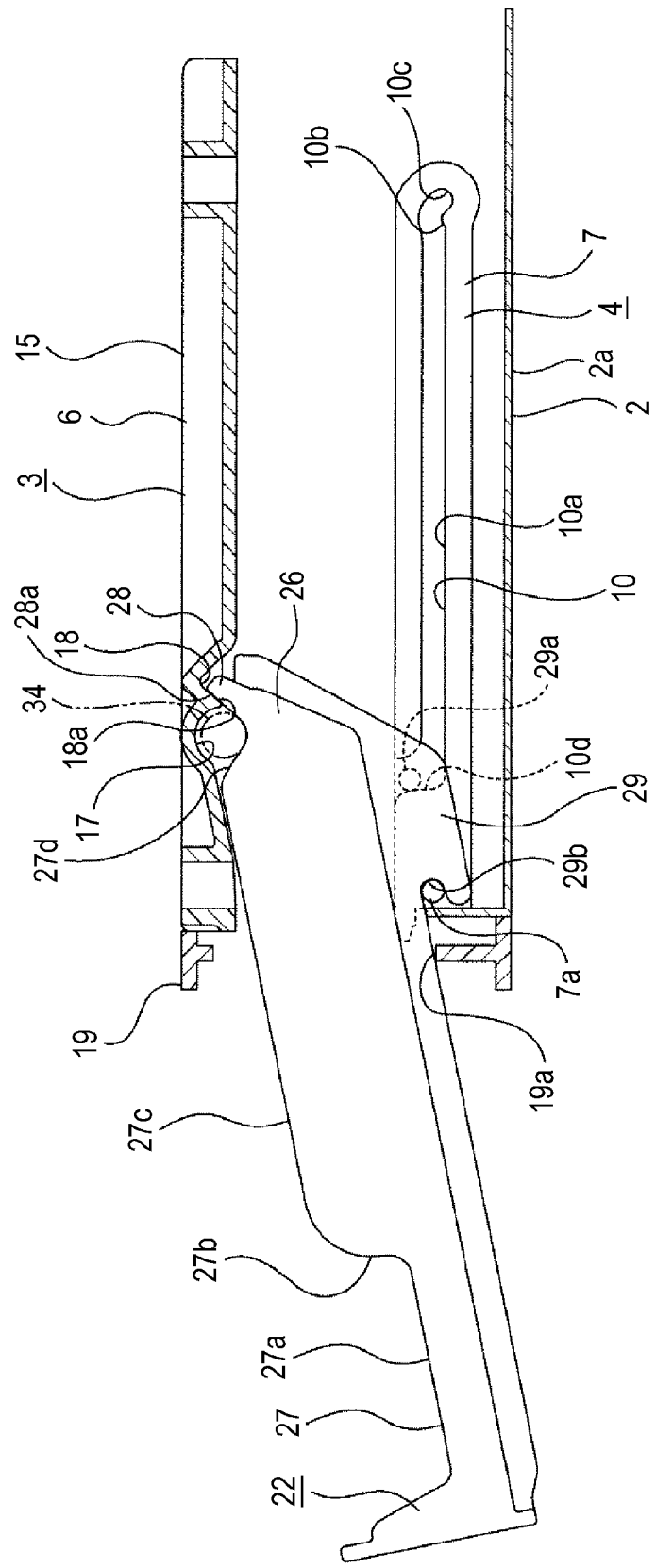
FIG. 38 is a side view illustrating a state in which the storage tray is moved up to the drawing-out position.

Subsequently, when a force is applied to the storage stray 22 in the drawing-out direction, the movement of the storage tray 22 to the front side is regulated by the regulating shafts 7a and 11, and the storage tray 22 is turned with the regulating shafts 7a and 11a used as points of supports and is inclined with the front side lowered (see FIGS. 37 and 38). At this time, the guide pins 29a and 29a of the storage tray 22 are inserted into the run-off portions 10d and 14d from the guiding portions 10a and 14a, and the rollers 34 and 34 are engaged with the position regulating portions 27d and 27d from the elevation portions 27c and 27c of the sliding cam portions 27 and 27.

As described above, the movement of the storage tray 22 to the front side is regulated by the regulating shafts 7a and 11 and is turned with the regulating shafts 7a and 11a used as points of supports 7a and 11a so as to be inclined with the front side lowered. Accordingly, the regulating shafts 7a and 11a has two functions including a function of regulating the movement of the storage tray 22 to the front side and a function as the point of supports of the storage tray 22, and therefore, the mechanism can be simplified due to a decrease in the number of components.

When the storage tray 22 is inclined with the front side lowered, the regulation portions 28 and 28 disposed in the rear end portion of the storage tray 22 are inserted into the regulating grooves 18 and 18 formed in the upper panel 6, and the regulation faces 28a and 28a are brought into facial contact with the regulating faces 18a and 18a, whereby the inclination of the storage tray 22 is regulated so as to be maintained at the drawing-out position.

As above, at the drawing-out position, since the regulation faces 28a and 28a are brought into facial contact with the regulating faces 18a and 18a, and the storage tray 22 is maintained in a predetermined inclined state, a large contact area between the regulating grooves 18 and 18 and the regulation portions 28 and 28 is secured, whereby the storage tray 22 at the drawing-out position can secure a stable holding state.

In addition, since the regulating faces 18a and 18a are formed on both left and right end portions of the upper shell 6 of the base body 3, and the regulation faces 28a and 28a are formed in one pair of the side face portions 26 and 26 of the storage tray 22, both parties are brought into contact with each other at two places located on the left and right sides so as to be separated from each other, whereby the holding state of the storage tray 22 at the drawing-out position can be more stably secured.

At the drawing-out position, when the storage tray 22 is tilted in the state of being inclined with the front side lowered, the pressing protruded portions 25a and 25a disposed in the rear face portion 25 are pressed to the lower face of the slide plate 33.

Accordingly, the pressing body 30 is pressed from the lower side by a part of the storage tray 22, and the pressing body 30 can be held in a stable state without any backlash.

In addition, at the drawing-out position, the slide plate 33 is maintained at the front-side moving end by the biasing force of the spring member 35, and at this time, two support pieces 33b and 33b located on the front side are engaged with the regulating protruded portions 15g and 15g of the upper panel 6 from the front side, and the movement of the slide plate 33 to the rear side is regulated by the regulating protruded portions 15g an 15g.

Accordingly, even when vibration is delivered to the slide plate 33 during the driving of the vehicle, the slide plate 33 is not moved to the rear side in resistance against the biasing force of the spring member 35, and the slide plate 33 is held in the front-side moving end in a stable state, whereby the operation can be appropriately performed.

In addition, at the drawing-out position, the storage stray 22 is drawn out munch from the base body 3, and there is a concern that a user's hand is erroneously in contact with the slide plate 33. However, even in such a case, the slide plate 33 is not moved to the rear side, whereby the operation can be appropriately performed.

Figure 39:
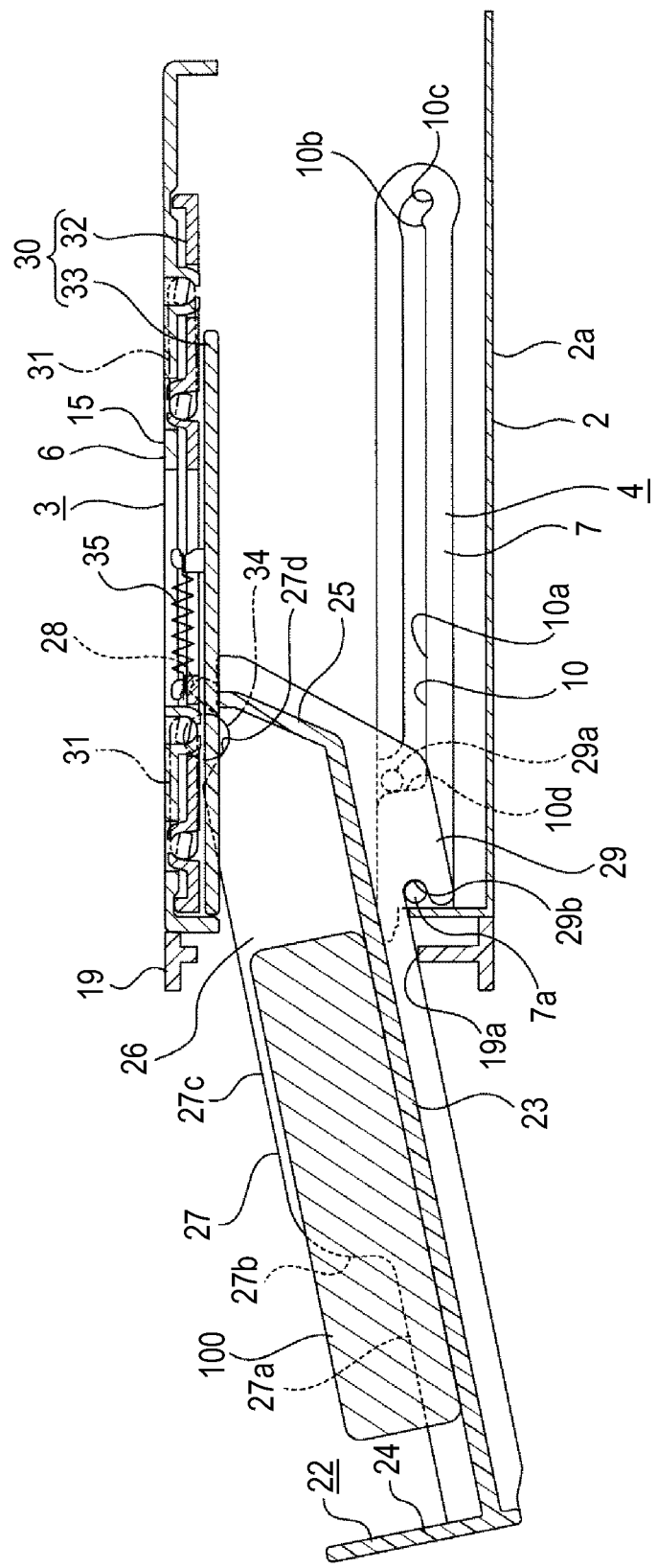
FIG. 39 is a side view illustrating a state in which the music reproducing device is inserted into the storage stay at the drawing-out position, with a part thereof illustrated as a cross-section.

As described above, when the storage tray 22 is moved to the drawing-out position, the music reproducing device 100 is inserted into the inside of the storage tray 22 (see FIGS. 3 and 39). The music reproducing device 100 is placed in the bottom face portion 23 of the storage tray 22.

At this time, as described above, since the storage tray 22 is in the state of being inclined with the front side lowered, a user can easily insert the music reproducing device 100 into the storage tray 22, and the convenience of the in-vehicle audio apparatus 1 can be improved.

Figure 40:
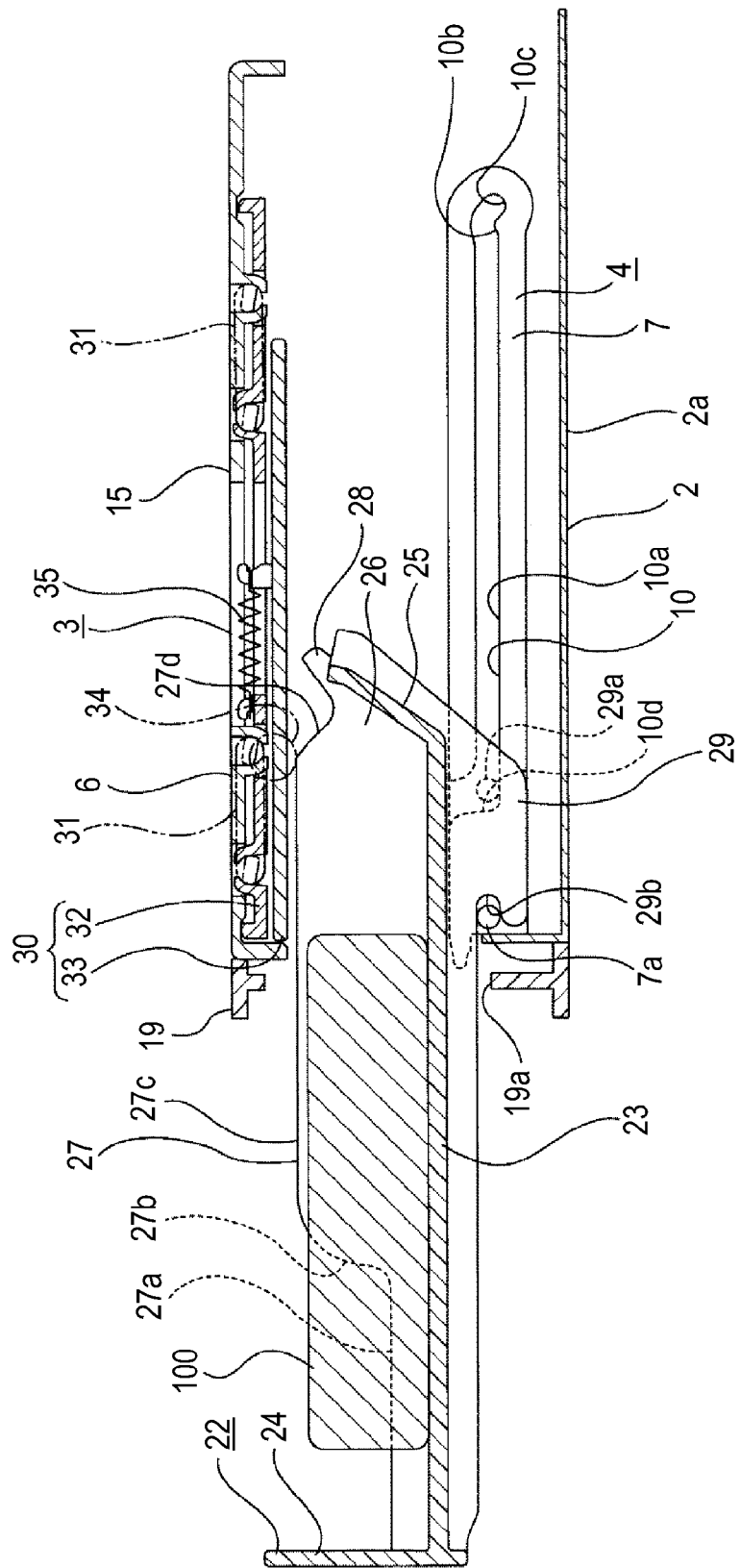
FIG. 40 is a side view illustrating a state in which the storage tray is formed in a horizontal state after the state illustrated in FIG. 39, with a part thereof illustrated as a cross-section.

As described above, when the music reproducing device 100 is inserted into the storage tray 22, the storage tray 22 can be lifted by a user so as to be in a horizontal state from the state of being inclined with the front side lowered (see FIG. 40).

At this time, the storage tray 22 is turned with the regulating shafts 7a and 11a of the guide rails 4 and 5 used as points of supports, and the guide pins 29a and 29a of the storage tray 22 are inserted into the guiding portions 10a and 14a from the run-off portions 10d and 14d.

In addition, the rollers 34 and 34 are engaged with the elevation portions 27c and 27c from the position regulating portions 27d and 27d of the sliding cam portions 27 and 27.

When the storage tray 22 is rotated to be in the horizontal state, the regulation portions 28 and 28 of the storage tray 22 are separated from the regulating faces 18a and 18a of the regulating grooves 18 and 18 formed in the upper panel 6, whereby contact between the regulation faces 28a and 28a and the regulating faces 18a and 18a is released.

At the same time, the pressing protruded portions 25a and 25a of the storage tray 22 are separated from the bottom face of the slide plate 33, and accordingly, the pressing body 30 is in a state of being movable to the lower side.

Figure 41:
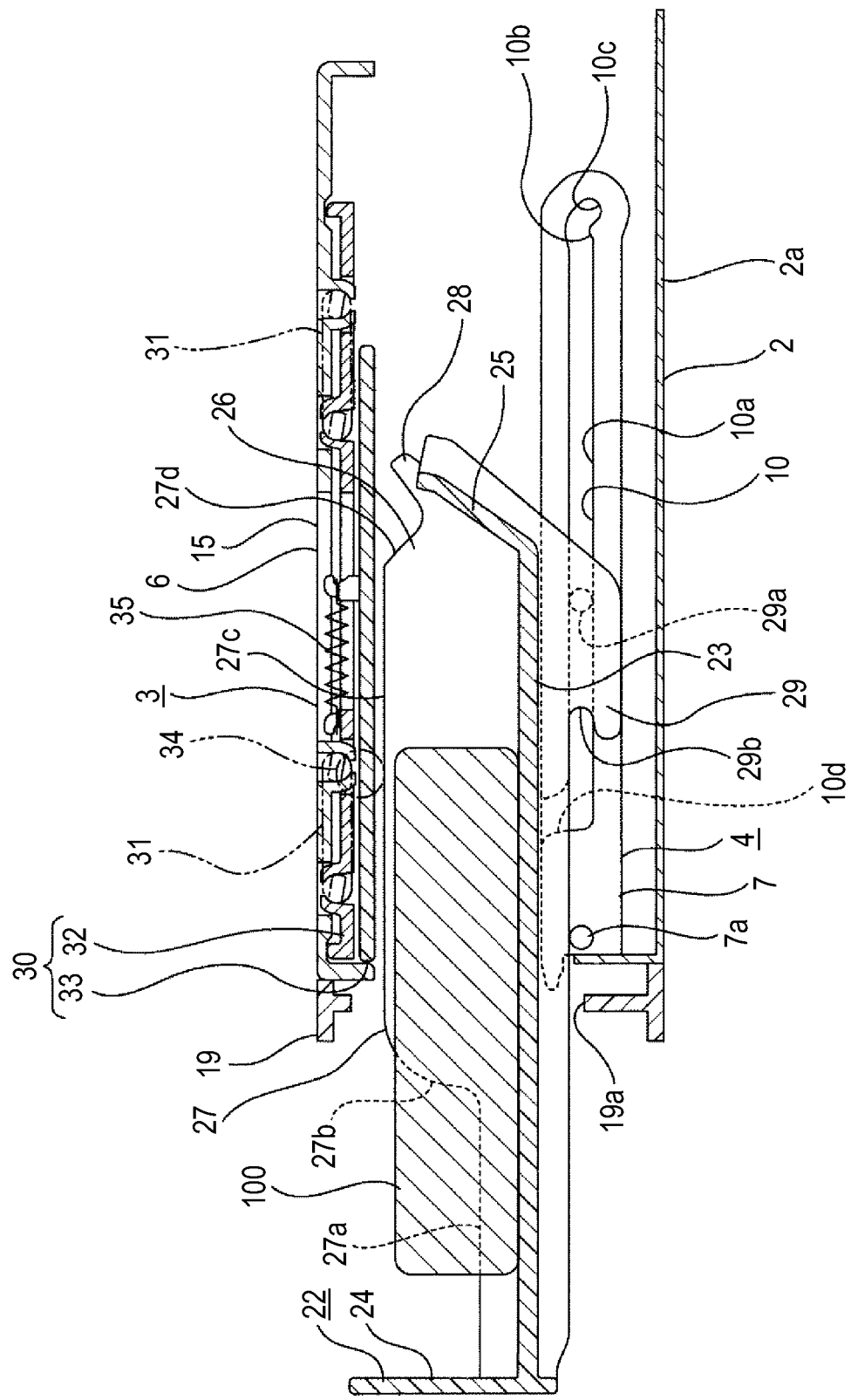
FIG. 41 is a side view illustrating a state in which the storage tray is subsequently moved toward the storing position after the state illustrated in FIG. 40, with a part thereof illustrated as a cross-section.

Subsequently, the storage tray 22 is pressed to the rear side and is moved to the rear side toward the storing position (see FIG. 41).

When the storage tray 22 is moved to the rear side, the rollers 34 and 34 are rotated above the elevation portions 27c and 27c of the sliding cam portions 27 and 27, and the guide pins 29a and 29a of the storage tray 22 are moved while facing the guiding portions 10a and 14a toward the rear side.

At this time, since the rollers 34 and 34 are engaged with the elevation portions 27c and 27c, the pressing body 30 is held at the upper-side moving end.

Figure 42:
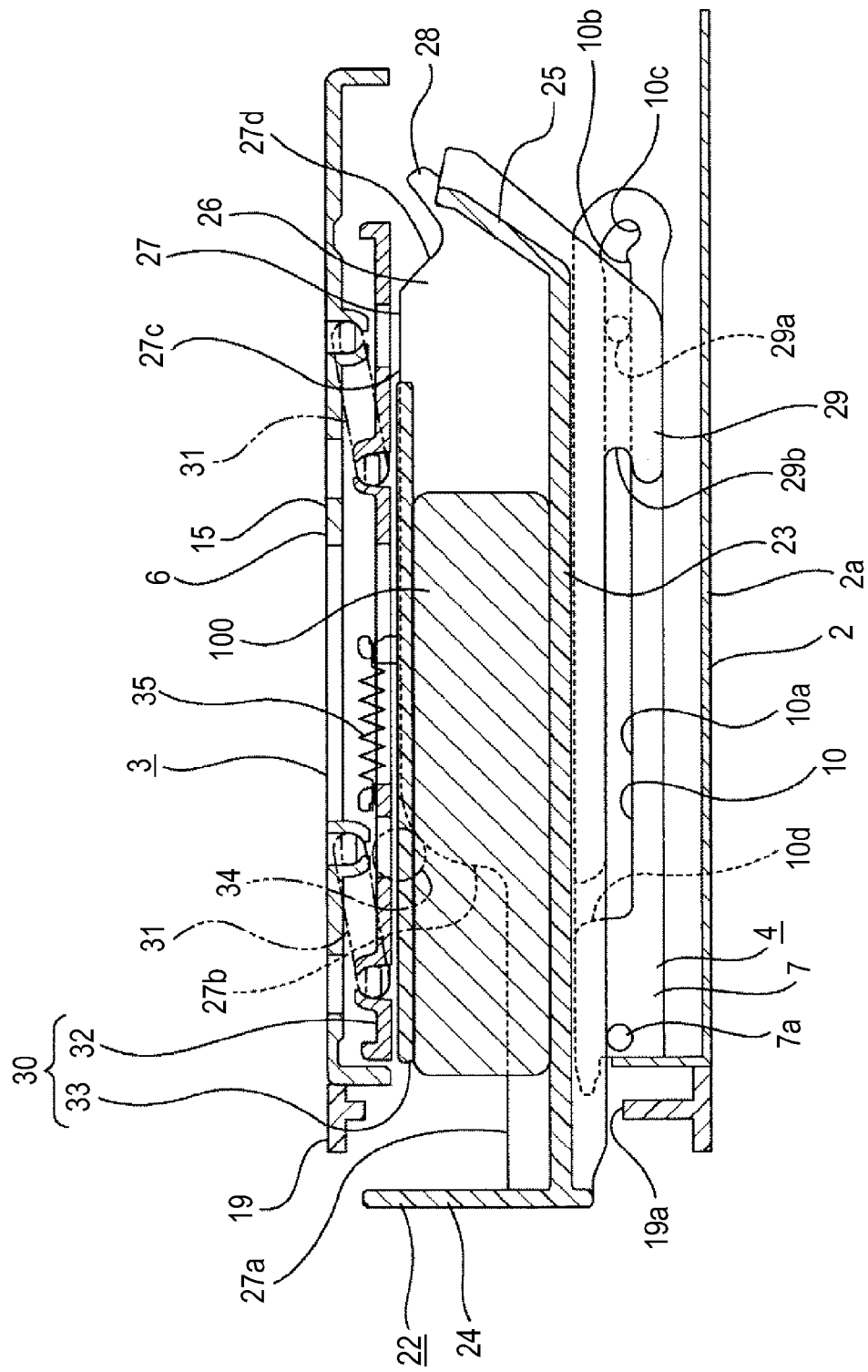
FIG. 42 is a side view illustrating a state in which the storage tray is subsequently moved toward the storing position after the state illustrated in FIG. 41, with a part thereof illustrated as a cross-section.

Subsequently, when the storage tray 22 is moved to the rear side, the rollers 34 and 34 are engaged with the upper end portions of the ascending portions 27b and 27b from the elevation portions 27c and 27c of the sliding cam portions 27 and 27 (see FIG. 42). At this time, the guide pins 29a and 29a of the storage tray 22 are moved with facing the guiding portions 10a and 14a toward the rear side.

Since the rollers 34 and 34 are engaged with the ascending portions 27b and 27b, the pressing body 30 is moved to the lower side by the biasing forces of the bias springs 38 and 38, and accordingly, the slide plate 33 is brought into contact with the upper face of the music reproducing device 100, and the arm members 31 and 31 are rotated.

As the slide plate 33 is brought into contact with the music reproducing device 100, the movement of the pressing body 30 to the lower side is stopped, and the rotation of the arm members 31 and 31 is stopped.

Figure 43:
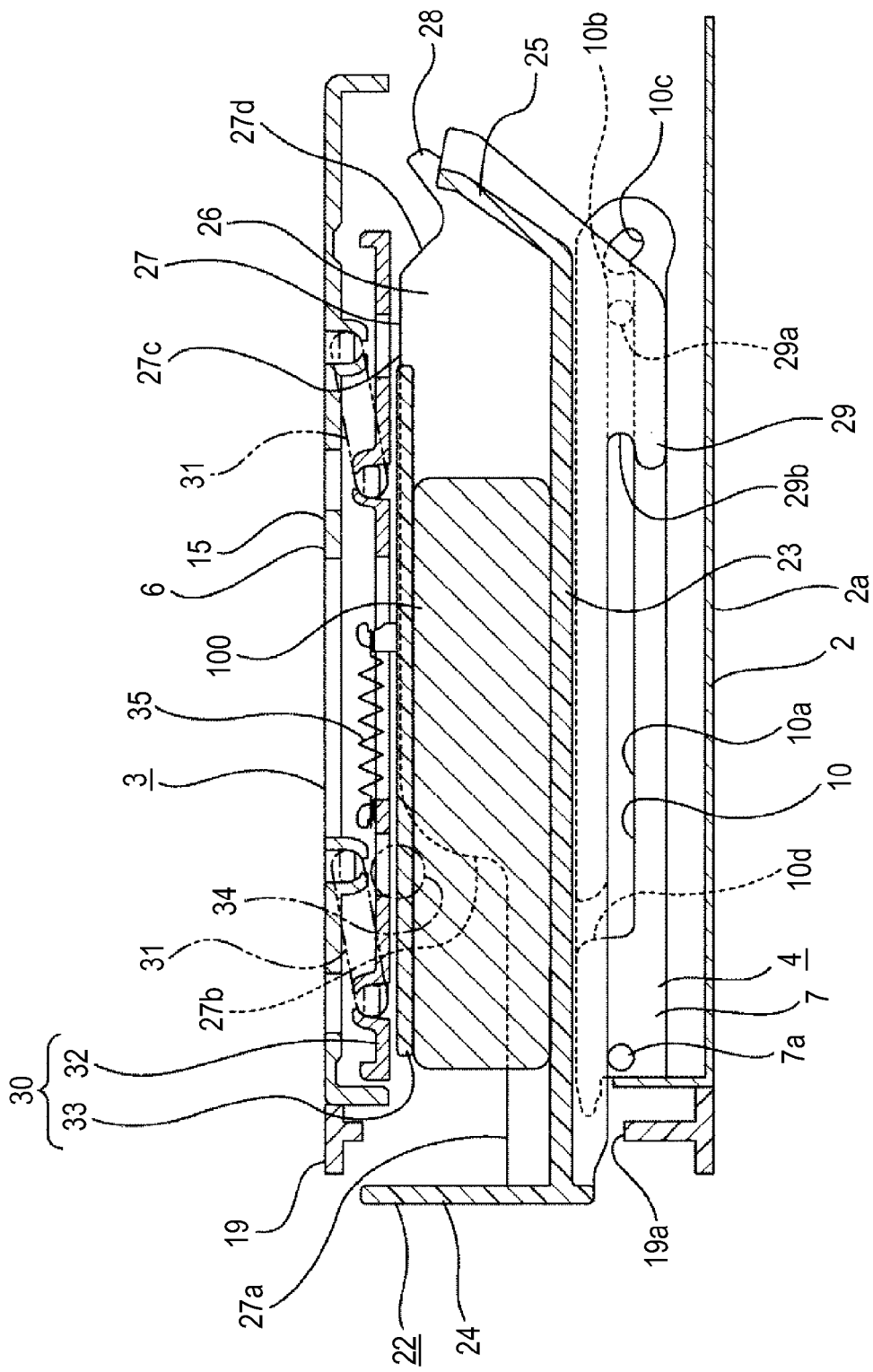
FIG. 43 is a side view illustrating a state in which the storage tray is subsequently moved toward the storing position after the state illustrated in FIG. 42, and the slide plate and the music reproducing device are moved integrally with the storage tray, with a part thereof illustrated as a cross-section.

When the storage tray 22 is moved further to the rear side, the slide plate 33 of the pressing body 30 is brought into contact with the music reproducing device 100 so as to regulate the movement of the pressing body to the lower side, and accordingly, the rollers 34 and 34 are separated from the sliding cam portions 27 and 27 to the front side (see FIG. 43). At this time, the guide pins 29a and 29a of the storage tray 22 are moved while facing the guiding portions 10a and 14a toward the rear side.

The slide plate 33 is biased to the lower side by the basing forces of the bias springs 38 and 38, and accordingly, when the rollers 34 and 34 are separated from the sliding cam portions 27 and 27, the biasing forces of the bias springs 38 and 38 are delivered to the music reproducing device 100 through the slide plate 33, and the music reproducing device 100 is pressed by the slide plate 33 from the upper side.

Although the movement of the slide plate 33 to the lower side is regulated, the slide plate 33 is in the state of being movable to the rear side with respect to the connection plate 32. Accordingly, the slide plate 33 is integrated with the storage tray 22 and the music reproducing device 100 and is moved to the rear side in resistance against the biasing force of the spring member 35 with respect to the connection plate 32.

As described above, according to the in-vehicle audio apparatus 1, the slide plate 33 brought into contact with the music reproducing device 100 is moved to the rear side integrally with the music reproducing device 100 and the storage tray 22, and accordingly, the slide plate 33 is not slid with respect to the music reproducing device 100, whereby scratches or damages of the music reproducing device 100 can be prevented.

In addition, since the slide plate 33 is brought into contact with the upper face of the music reproducing device 100 and is moved to the rear side while the movement thereof in the vertical direction is regulated, regardless of the thickness (the size in the vertical direction) of the music reproducing device inserted into the storage tray 22, the music reproducing device inserted into the storage tray 22 can be pressed by the slide plate 33.

Figure 44:
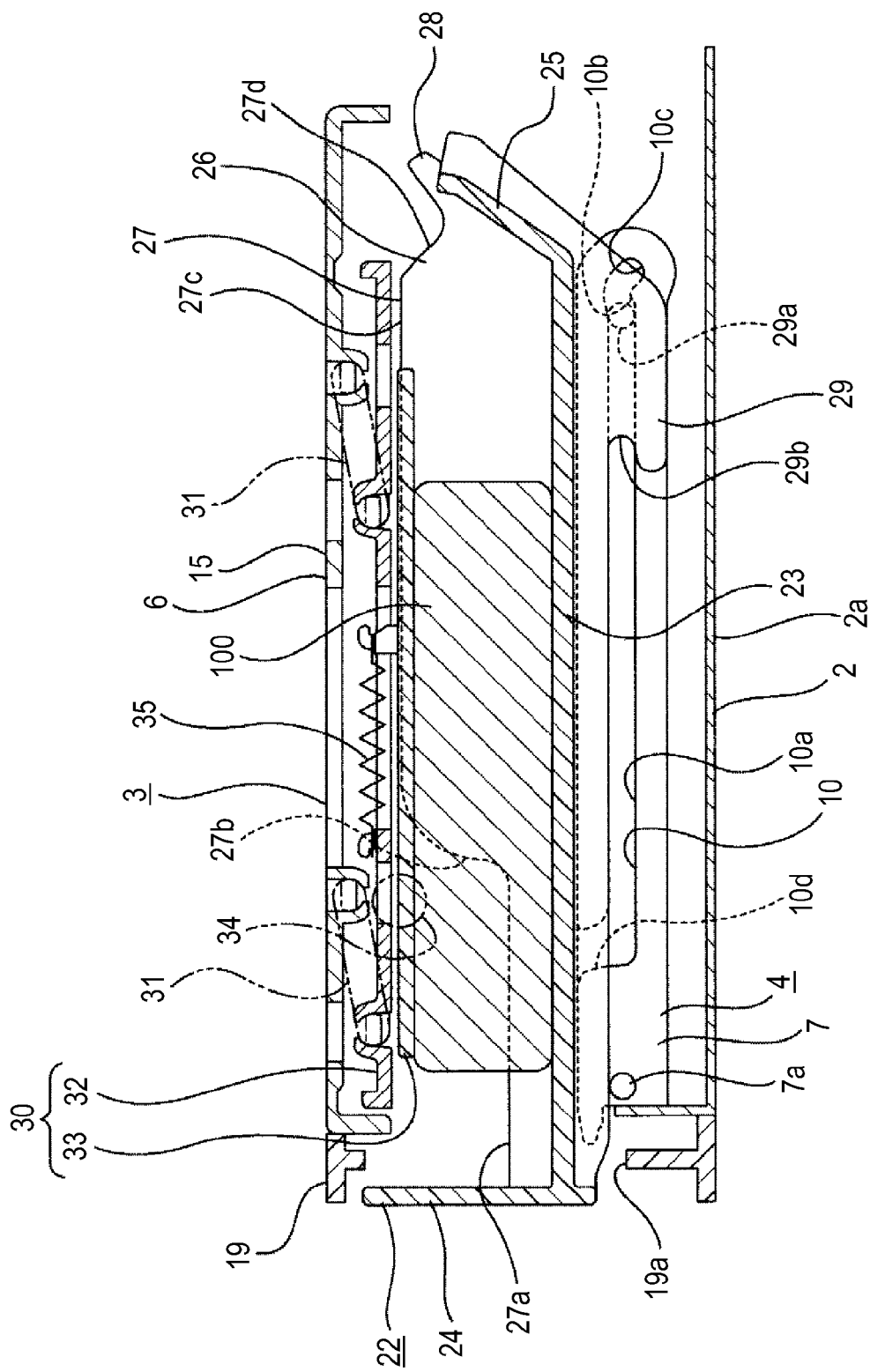
FIG. 44 is a side view illustrating a state in which the storage tray is subsequently moved toward the storing position after the state illustrated in FIG. 43, and the slide plate and the music reproducing device are moved integrally with the storage tray, with a part thereof illustrated as a cross-section.

Subsequently, when the storage tray 22 is moved to the rear side, the slide plate 33 is integrated with the storage tray 22 and the music reproducing device 100 and is moved further to the rear side (see FIG. 44). At this time, the guide pins 29a and 29a of the storage tray 22 is moved further with facing the guiding portions 10a and 14a toward the rear side, and the rollers 34 and 34 are continuously in the state of being separated from the sliding cam portions 27 and 27.

Figure 45:
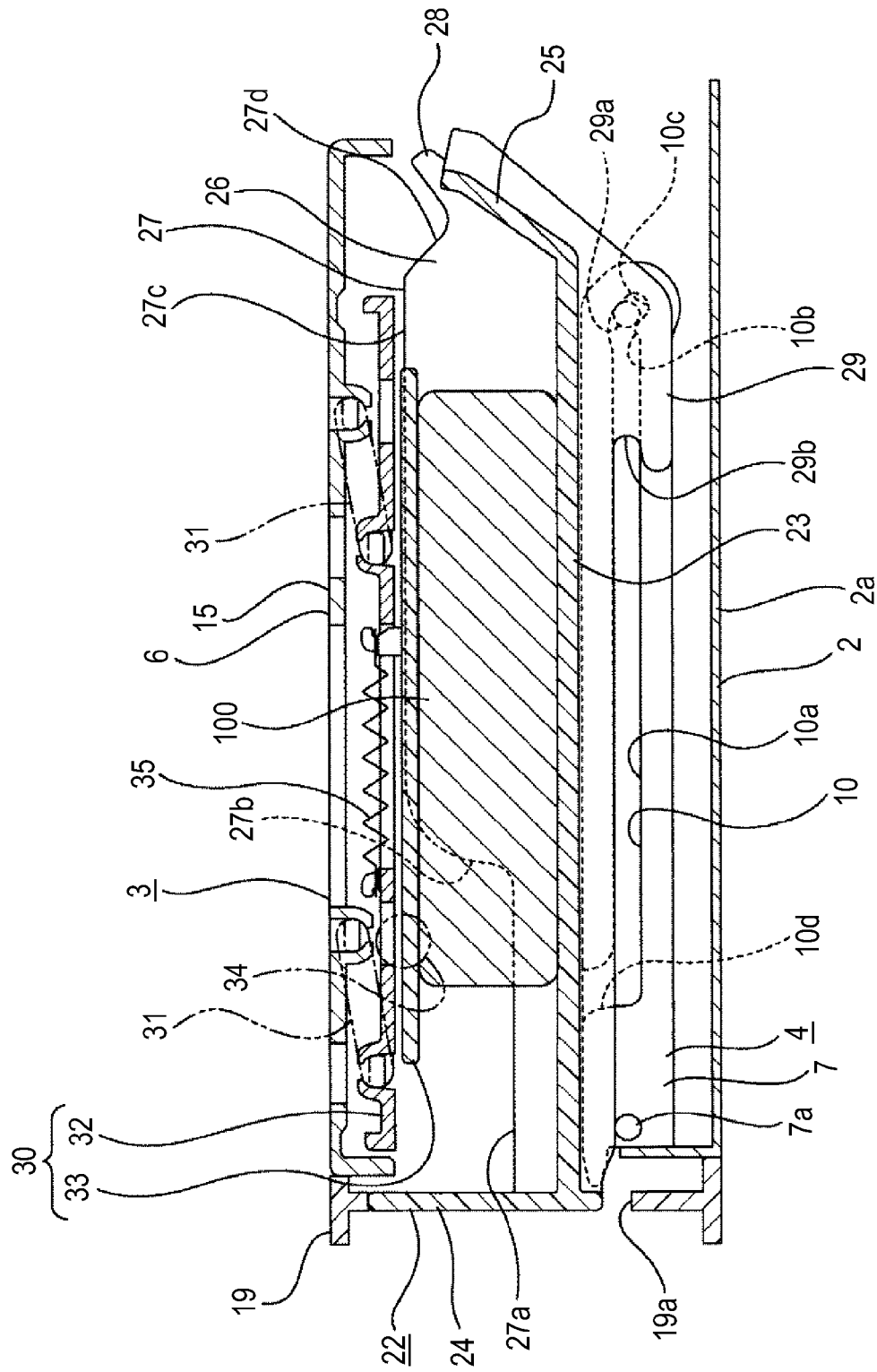
FIG. 45 is a side view illustrating a state in which the storage tray is moved up to the storing position, with a part thereof illustrated as a cross-section.

When the storage tray 22 is mover further to the rear side, the slide plate 33 is integrated with the storage tray 22 and the music reproducing device 100 and is moved further to the rear side, whereby the storage tray 22 arrives at the storing position (see FIG. 45). The guide pins 29a and 29a of the storage tray 22 pass through the displacement portions 10b and 14b from the guiding portions 10a and 14a and are engaged with the holding portions 10c and 14c. At this time, since the guide pins 29a and 29a are engaged with the displacement portions 10b and 14b inclined with respect to the guiding portions 10a and 14a once, the feeling of the storing of the storage tray 22 up to the storing position is delivered to a user's hand as clicking feeling.

In addition, in the guiding portions 10 and 14, the displacement portions 10b and 14b inclined to the upper side with respect to the guiding portions 10a and 14a and the holding portions 10c and 14c that are continuous from the displacement portions 10b and 14b and are inclined to the lower side with respect to the guide portions 10a and 14a are disposed. Accordingly, in the state in which the storage tray is moved to the storing position, for example, when vibration or the like occurs, it is difficult for the guide pins 29a and 29a to be moved to the side of the guiding portions 10a and 14a, and the holding state of the storage tray 22 at the storing position can be stabilized.

At the storing position, the music reproducing device 100 is pressed to the slide plate 33 biased by the biasing forces of the bias springs 38 and 38 from the upper side, the music reproducing device 100 is held inside the storage tray 22 without any backlash.

When the reproduction of music recorded in the music reproducing device 100 or the like is completed, again, the storage tray 22 is drawn out from the storing position and is moved to the front side up to the drawing-out position from the storing position. The operation of the storage tray 22 at the time of moving the storage tray 22 into which the music reproducing device 100 is inserted from the storing position to the drawing-out position is the same as the above-described operation (see FIGS. 25 to 38) except for a part thereof. Accordingly, of the operations represented below when the storage tray 22 into which the music reproducing device 100 is inserted is moved from the storing position to the drawing-out position, only the operations that are different from the above-described operations will be described, and the description of the same operations as those described above will not be presented.

When the storage tray 22 into which the music reproducing device 100 is inserted is moved from the storing position to the drawing-out position, in the middle of the movement, the rollers 34 and 34 are engaged with the upper end portions of the ascending portions 27b and 27b of the sliding cam portions 27 and 27. Then, as the storage tray 22 is moved further to the front side, the rollers 34 and 34 are rotated from the elevation portions 27c and 27c to the position regulating portions 27d and 27d.

Figure 46:
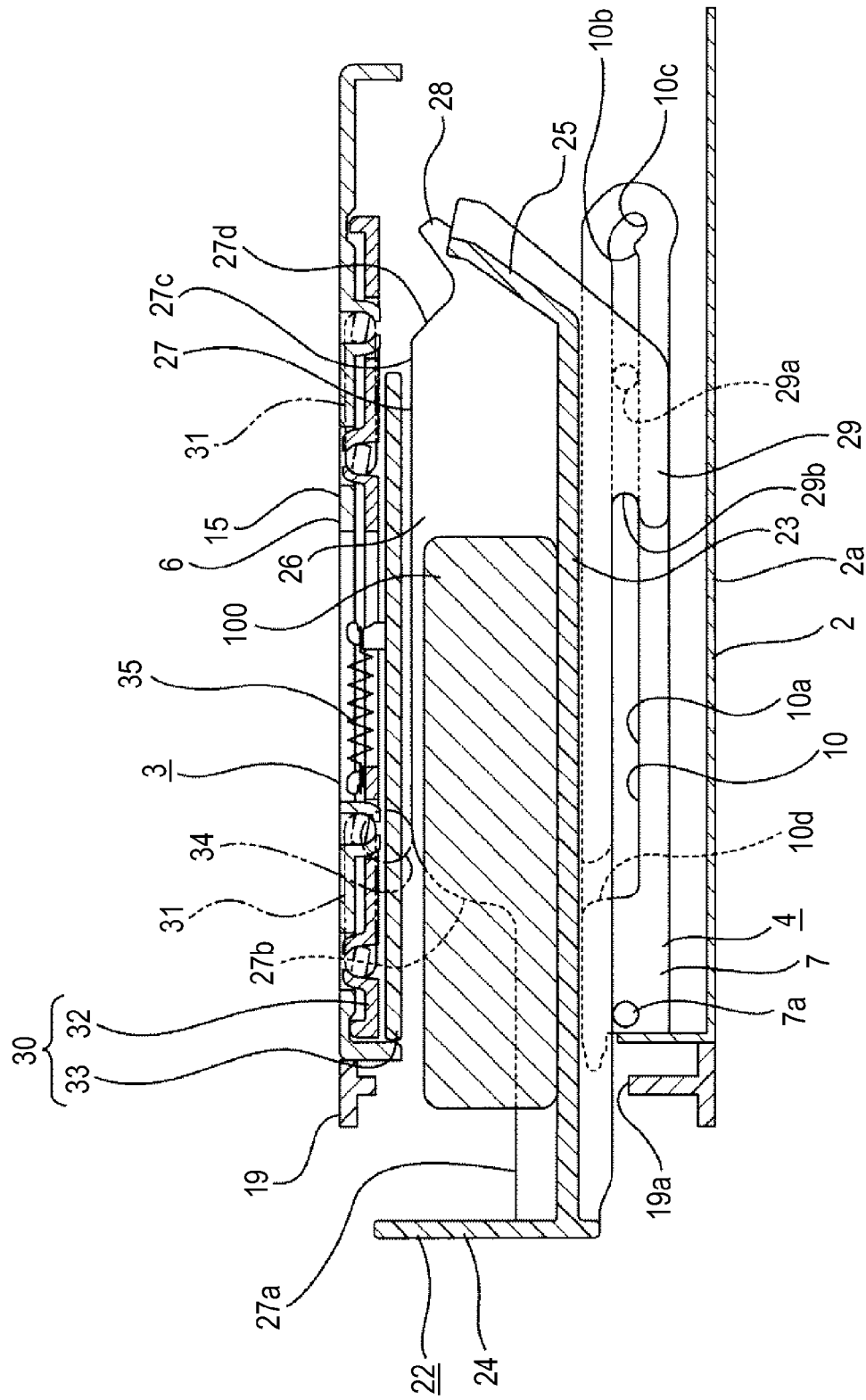
FIG. 46 is a side view illustrating a state in which the storage tray is moved from the storing position toward the drawing-out position, and the slide plate is separated from the music reproducing device, with a part thereof illustrated as a cross-section.

As the rollers 34 and 34 are engaged with the elevation portions 27c and 27c, as illustrated in FIG. 46, the pressing body 30 is moved to the upper-side moving end, and the slide plate 33 is separated from the upper face of the music reproducing device 100, whereby the holding state of the slide plate 33 for the music reproducing device 100 is released.

Accordingly, when the storage tray 22 is moved up to the drawing-out position, the music reproducing device 100 can be easily taken out from the storage tray 22.

In addition, at the drawing-out position, since the storage tray 22 is in the state of being inclined with the front side lowered, a user can easily take out the music reproducing device 100, and the convenience of the in-vehicle audio apparatus 1 can be improved.

When the slide plate 33 is separated from the upper face of the music reproducing device 100 to the upper side, and the holding state of the slide plate 33 for the music reproducing device 100 is released, the slide plate 33 is moved up to the front-side moving end in accordance with the biasing force of the spring member 35.

As above, when a contact between the slide plate 33 and the music reproducing device 100 is released, the slide plate 33 is moved to the front-side moving end in accordance with the biasing force of the spring member 35, and accordingly, in the state in which the storage tray 22 is moved to the drawing-out position, the slide plate 33 is constantly held at the front-side moving end.

Accordingly, when the storage tray 22 in which the music reproducing device 100 is inserted is moved from the drawing-out position toward the storing position, the slide plate 33 is slid to the rear side in the state in which the music reproducing device 100 inserted into the storage tray 22 is constantly pressed, whereby the music reproducing device 100 can be held in a constantly stable state.

Figure 47:
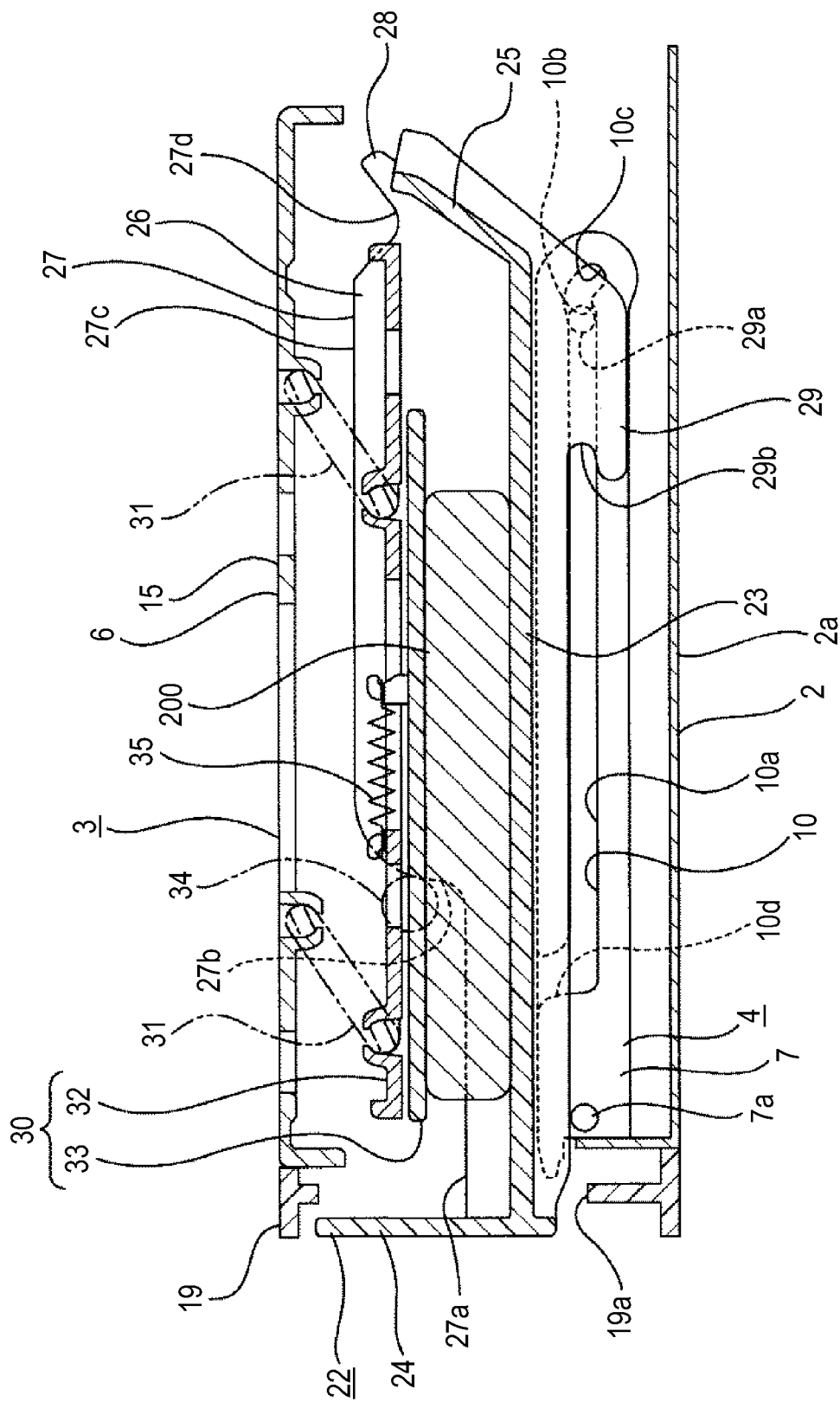
FIG. 47 is a side view illustrating a state in which a thin music reproducing device is pressed by the slide plate, with a part thereof illustrated as a cross-section.
Figure 48:
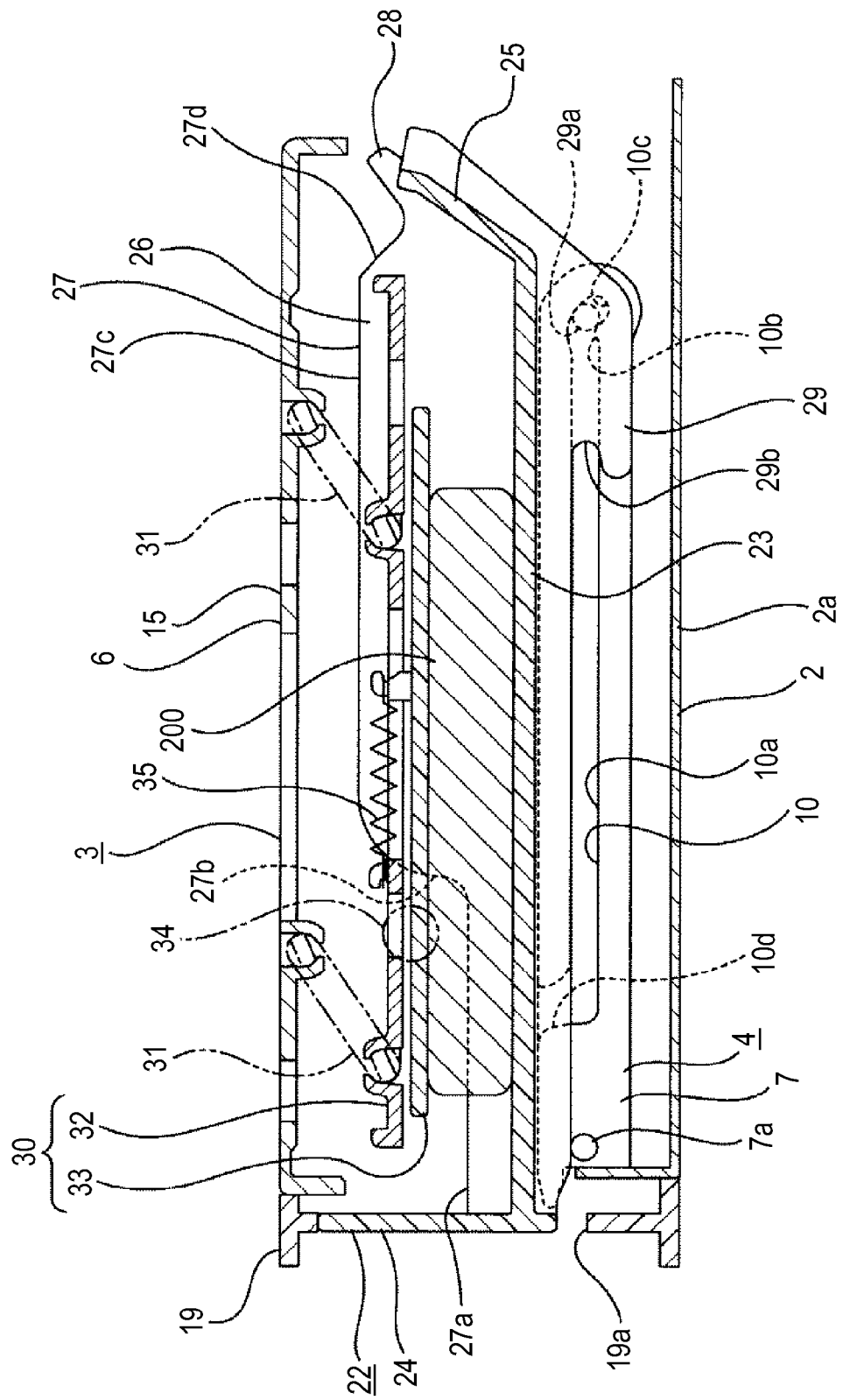
FIG. 48 is a side view illustrating a state in which the storage tray, in which a thin music reproducing device is pressed by the slide plate, is moved up to the storing position, with a part thereof illustrated as a cross-section.

In the above-described in-vehicle audio apparatus 1, a music reproducing device 200 having a thickness, that is, the size in the vertical direction different from that of the music reproducing device 100 can be inserted and held (see FIGS. 47 and 48). The thickness of the music reproducing device 200 is assumed to be smaller than that of the music reproducing device 100.

When the storage tray 22 into which the music reproducing device 200 is inserted is moved from the drawing-out position to the rear side toward the storing position, the rollers 34 and 34 are engaged with the ascending portions 27b and 27b from the elevation portions 27c and 27c of the sliding cam portions 27 and 27, and the pressing body 30 is moved to the lower side in accordance with the biasing forces of the bias springs 38 and 38, whereby the slide plate 33 is brought into contact with the upper face of the music reproducing device 200 (see FIG. 47).

At this time, the amount of movement of the pressing body 30 from the upper-side moving end to the lower side is larger than that in a case where the music reproducing device 100 is pressed.

As the slide plate 33 is brought into contact with the music reproducing device 200, the movement of the pressing body 30 to the lower side is stopped, and the rotation of the arm members 31 and 31 is stopped.

When the storage tray 22 is moved further to the rear side, the slide plate 33 is brought into contact with the music reproducing device 200 so as to regulate the movement to the lower side, and accordingly, the rollers 34 and 34 are separated from the sliding cam portions 27 and 27 to the front side in the pressing body 30.

Since the slide plate 33 is biased to the lower side in accordance with the biasing forces of the bias springs 38 and 38, when the rollers 34 and 34 are separated from the sliding cam portions 27 and 27, the biasing forces of the bias springs 38 and 38 are delivered to the music reproducing device 200 through the slide plate 33, and the music reproducing device 200 is pressed by the slide plate 33 from the upper side.

Although the movement of the slide plate 33 to the lower side is regulated, the slide plate 33 is in the state of being movable to the rear side with respect to the connection plate 32. Accordingly, the slide plate 33 is integrated with the storage tray 22 and the music reproducing device 200 with respect to the connection plate 32 and is moved to the rear side in resistance against the biasing force of the spring member 35.

When the storage tray 22 is moved further to the rear side, the slide plate 33 is integrated with the storage tray 22 and the music reproducing device 200 and is moved further to the rear side, and the storage tray 22 arrives at the storing position (see FIG. 48). At the storing position, since the music reproducing device 200 is pressed from the upper side by the slide plate 33 biased by the biasing forces of the bias springs 38 and 38, the music reproducing device 200 is held inside the storage tray 22 without any backlash.

As described above, in the in-vehicle audio apparatus 1, the amount of movement of the pressing member 30 in the vertical direction changes in accordance with the size of the music reproducing device (100 or 200) inserted into the storage tray 22, and a music reproducing device having any thickness can be pressed by the slide plate 33 so as to be held inside the storage tray 22.

In addition, as described above, in a case where torsion coil springs are used as the bias springs 38 and 38, the biasing forces of the bias springs 38 and 38 change in accordance with the amount of movement of the pressing body 30 from the upper-side moving end to the lower side. In other words, when the amount of movement of the pressing body 30 is small, the biasing forces of the basing springs 38 and 38 are strong, and when the amount of movement of the pressing body 30 is small, the biasing forces of the bias springs 38 and 38 are weakened.

Accordingly, generally, since the weight of a music reproducing device having a large thickness is larger than that of a music reproducing device having a small thickness, by using torsion coil springs as the bias springs 38 and 38, biasing forces according to the weight are applied to the music reproducing device from the bias springs 38 and 38, and the music reproducing device 100 can be maintained in a stable state regardless of the weight thereof.

CONCLUSION

As described above, in the in-vehicle audio apparatus 1, the storage tray 22 that is moved between the drawing-out position and the storing position, the pressing body 30 that is moved in accordance with the moving position of the storage tray 22 in a direction perpendicular to the moving direction of the storage tray 22 and presses the music reproducing devices 100 and 200, and the bias springs 38 and 38 that bias the pressing body 30 are disposed.

Accordingly, a music reproducing device having a different size (thickness) can be held inside the storage tray 22 by pressing it by using the pressing body 30, whereby the range of music reproducing devices that can be inserted into the storage tray 22 is wide so as to improve the versatility.

In addition, the pressing body 30 biased by the bias springs 38 and 38 is moved in the direction perpendicular to the moving direction of the storage tray 22 so as to press the music reproducing devices 100 and 200, and accordingly, the holding state of the music reproducing devices 100 and 200 can be stabilized.

Furthermore, in the in-vehicle audio apparatus 1, a plurality of arm members 31 and 31 are positioned in the moving direction of the storage tray 22 so as to be separated from each other. Accordingly, the movement of the pressing member 30 in the vertical direction is stabilized, and the slide plate 33 can be pressed to the music reproducing devices 100 and 200 with uniform balance, whereby the holding state of the music reproducing devices 100 and 200 can be stabilized.

In addition, since the bias springs 38 and 38 are supported between the upper panel 6 and the arm members 31 and 31, the pressing force of the pressing body 30 for the music reproducing devices 100 and 200 are stabilized, whereby the holding state of the music reproducing devices 100 and 200 can be stabilized.

Furthermore, in the in-vehicle audio apparatus 1, the rollers 34 and 34 supported by the pressing body 30 are engaged with the sliding cam portions 27 and 27 of the storage tray 22 so as to determine the moving position of the pressing member 30, the position of the pressing body 30 with respect to the storage tray 22 can be accurately determined by using a simple mechanism.

In addition, since the sliding cam portions 27 and are formed in the side face portions 26 and 26 of the storage tray 22, the sliding cam portions 27 and 27 do not interfere with the music reproducing devices 100 and 200 inserted into the storage tray 22, and the operation at the time of moving the storage tray 22 can be appropriately performed.

Furthermore, since the rollers 34 and 34 are pressed to the sliding cam portions 27 and 27 in accordance with the biasing forces of the bias springs 38 and 38 that are applied through the connection plate 32, the biasing forces of the bias springs 38 and 38 used for pressing the music reproducing devices 100 and 200 by biasing the pressing body to the lower side are also used as biasing forces for pressing the rollers 34 and 34 to the sliding cam portions 27 and 27. Thus, since springs dedicated for pressing the rollers 34 and 34 to the sliding cam portions 27 and 27 are not necessarily disposed, a decrease in the number of components is achieved, and an appropriate operation of the pressing body 30 can be secured.

In addition, since the rollers 34 and 34 that are rotated in the state of being pressed by the sliding cam portions 27 and 27 are used as cam engaging portions engaged with the sliding cam portions 27 and 27, smooth operations of the storage tray 22 and the pressing body 30 can be secured.

[Present Technology]

The present technology can be configured as follows.

(1) An in-vehicle audio apparatus including: a base body that is arranged in a fixed state; a storage tray that is moved between a drawing-out position and a storing position with respect to the base body and inserts and takes out a music reproducing device at the drawing-out position; a pressing body that is moved in accordance with a moving position of the storage tray in a direction perpendicular to a moving direction of the storage tray and presses the music reproducing device that is inserted into the storage tray when the pressing body is moved to one side; and a bias spring that presses the pressing body to the one side.

(2) The in-vehicle audio apparatus described in (1), wherein a plurality of arm members that are positioned between the base body and the pressing body so as to connect the base body and the pressing body and are operated for the base member is further included, the pressing body is moved in the direction perpendicular to the moving direction of the storage tray in accordance with operations of the plurality of arm members, and the plurality of arm members are positioned so as to be separated from each other in the moving direction of the storage tray.

(3) The in-vehicle audio apparatus described in (2), wherein the plurality of arm members are supported so to be rotatable together with the base member and the pressing body, and the bias spring is supported between the base body and the plurality of arm members.

(4) The in-vehicle audio apparatus described in (2) or (3), wherein the pressing body includes a connection plate that is connected to the base body through the plurality of arm members and a slide plate that can slide in the connection plate in the same direction as the moving direction of the storage tray, the slide plate is brought into contact with the music reproducing device so as to press the music reproducing device when the storage tray is moved, and the slide plate is slid while being integrated with the storage tray that is moved so as to be slid in a state in which the music reproducing device is pressed by the slide plate.

(5) The in-vehicle audio apparatus described in (4), wherein the spring member is supported between the slide plate and the connection plate, and the slide plate is biased by the spring member in a direction toward the drawing-out position in the moving direction of the storage tray.

(6) The in-vehicle audio apparatus described in (5), wherein a pressing protruded portion that presses the pressing body at the drawing-out position is disposed in the storage tray.

(7) The in-vehicle audio apparatus described in any one of (1) to (6), wherein a cam engaging portion is disposed in the pressing body, and a sliding cam portion that is engaged with the cam engaging portion so as to be slidable and determines a moving position of the pressing body when being moved between the storing position and the drawing-out position is disposed in the storage tray.

(8) The in-vehicle audio apparatus described in (7), wherein the storage tray includes a bottom face part in which the music reproducing device is inserted and placed and one pair of side face parts that protrude from both edges of the bottom face part, and the sliding cam portion is disposed in the side face part of the storage tray.

(9) The in-vehicle audio apparatus described in (7) or (8), wherein the cam engaging portion is pressed to the sliding cam portion by the bias spring.

(10) The in-vehicle audio apparatus described in (9), wherein a roller that is rotated in a state of being pressed to the sliding cam portion is disposed as the cam engaging portion.

(11) The in-vehicle audio apparatus described in any one of (1) to (10), wherein the storage tray is moved in forward and backward directions between the drawing-out position and the storing position, and the storage tray is maintained in a state of lowering a front side at the drawing-out position.

(12) The in-vehicle audio apparatus described in (10) or (11), wherein a regulating face is formed in the base body, and a regulation face that is brought into facial contact with the regulating face at the drawing-out position is formed in the storage tray.

(13) The in-vehicle audio apparatus described in (11) or (12), wherein a regulating shaft that maintains the storage tray at the drawing-out position is disposed, and the storage tray is turned with the regulating shaft used as a point of support and is maintained in the state of lowering the front side at the drawing-out position.

(14) The in-vehicle audio apparatus described in (12) or (13), wherein the storage tray includes a bottom face part in which the music reproducing device is inserted and placed and one pair of side face parts that protrude from both edges of the bottom face part, one pair of regulating faces is formed in the base body, and the regulation faces are formed in the one pair of the side face parts respectively.

The specific shapes and structures of each unit or portion represented in the above-described preferred embodiments are merely specific examples in performing an embodiment of the present technology and are not for the purpose of limiting the technical scope of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. An in-vehicle audio apparatus comprising:
    a base body that is arranged in a fixed state;
    a storage tray that is moved between a drawing-out position and a storing position with respect to the base body and inserts and takes out a music reproducing device at the drawing-out position;
    a pressing body that is moved in accordance with a moving position of the storage tray in a direction perpendicular to a moving direction of the storage tray and presses the music reproducing device that is inserted into the storage tray when the pressing body is moved to one side;
    a bias spring that presses the pressing body to the one side; and
    a plurality of arm members that are positioned between the base body and the pressing body so as to connect the base body and the pressing body and are operated for the base body,
    wherein the pressing body is moved in the direction perpendicular to the moving direction of the storage tray in accordance with operations of the plurality of arm members, and
    wherein the plurality of arm members are positioned so as to be separated from each other in the moving direction of the storage tray.

2. The in-vehicle audio apparatus according to claim 1, wherein the plurality of arm members are supported so to be rotatable together with the base body and the pressing body, and
    wherein the bias spring is supported between the base body and the plurality of arm members.

3. The in-vehicle audio apparatus according to claim 1, wherein the pressing body includes a connection plate that is connected to the base body through the plurality of arm members and a slide plate that can slide in the connection plate in the same direction as the moving direction of the storage tray,
    wherein the slide plate is brought into contact with the music reproducing device so as to press the music reproducing device when the storage tray is moved, and
    wherein the slide plate is slid while being integrated with the storage tray that is moved so as to be slid in a state in which the music reproducing device is pressed by the slide plate.

4. The in-vehicle audio apparatus according to claim 3,
wherein the spring member is supported between the slide plate and the connection plate, and
wherein the slide plate is biased by the spring member in a direction toward the drawing-out position in the moving direction of the storage tray.

5. The in-vehicle audio apparatus according to claim 4, wherein a pressing protruded portion that presses the pressing body at the drawing-out position is disposed in the storage tray.

6. The in-vehicle audio apparatus according to claim 1,
wherein the storage tray is moved in forward and backward directions between the drawing-out position and the storing position, and
wherein the storage tray is maintained in a state of lowering a front side at the drawing-out position.

7. The in-vehicle audio apparatus according to claim 6,
wherein a regulating shaft that maintains the storage tray at the drawing-out position is disposed, and
wherein the storage tray is turned with the regulating shaft used as a point of support and is maintained in the state of lowering the front side at the drawing-out position.

8. An in-vehicle audio apparatus comprising:
a base body that is arranged in a fixed state;
a storage tray that is moved between a drawing-out position and a storing position with respect to the base body and inserts and takes out a music reproducing device at the drawing-out position;
a pressing body that is moved in accordance with a moving position of the storage tray in a direction perpendicular to a moving direction of the storage tray and presses the music reproducing device that is inserted into the storage tray when the pressing body is moved to one side; and
a bias spring that presses the pressing body to the one side,
wherein a cam engaging portion is disposed in the pressing body, and
wherein a sliding cam portion that is engaged with the cam engaging portion so as to be slidable and determines a moving position of the pressing body when being moved between the storing position and the drawing-out position is disposed in the storage tray.

9. The in-vehicle audio apparatus according to claim 8,
wherein the storage tray includes a bottom face part in which the music reproducing device is inserted and placed and one pair of side face parts that protrude from both edges of the bottom face part, and
wherein the sliding cam portion is disposed in the side face part of the storage tray.

10. The in-vehicle audio apparatus according to claim 8, wherein the cam engaging portion is pressed to the sliding cam portion by the bias spring.

11. The in-vehicle audio apparatus according to claim 10, wherein a roller that is rotated in a state of being pressed to the sliding cam portion is disposed as the cam engaging portion.

12. The in-vehicle audio apparatus according to claim 11,
wherein a regulating face is formed in the base body, and
wherein a regulation face that is brought into facial contact with the regulating face at the drawing-out position is formed in the storage tray.

13. The in-vehicle audio apparatus according to claim 12,
wherein the storage tray includes a bottom face part in which the music reproducing device is inserted and placed and one pair of side face parts that protrude from both edges of the bottom face part,
wherein one pair of regulating faces is formed in the base body, and
wherein the regulation faces are formed in the one pair of the side face parts respectively.

* * * * *